(12) United States Patent
Baker et al.

(10) Patent No.: US 12,339,099 B1
(45) Date of Patent: Jun. 24, 2025

(54) POINT BLANK DELTA SCOPE RETICLE

(71) Applicants: Jacob D. Baker, Fort Smith, AR (US); John L. Baker, Fort Smith, AR (US)

(72) Inventors: Jacob D. Baker, Fort Smith, AR (US); John L. Baker, Fort Smith, AR (US)

( * ) Notice: Subject to any disclaimer, the term of this patent is extended or adjusted under 35 U.S.C. 154(b) by 0 days.

(21) Appl. No.: 17/974,515

(22) Filed: Oct. 26, 2022

Related U.S. Application Data

(60) Provisional application No. 63/271,794, filed on Oct. 26, 2021.

(51) Int. Cl.
*F41G 1/38* (2006.01)
*G02B 27/32* (2006.01)

(52) U.S. Cl.
CPC ............... *F41G 1/38* (2013.01); *G02B 27/32* (2013.01)

(58) Field of Classification Search
CPC .................................. F41G 1/38; F41G 1/473
See application file for complete search history.

(56) References Cited

U.S. PATENT DOCUMENTS

| | | | |
|---|---|---|---|
| 2006/0026887 A1* | 2/2006 | Verdugo | F41G 1/38 42/130 |
| 2015/0253108 A1* | 9/2015 | Fischer | F41G 3/06 42/122 |
| 2021/0278173 A1* | 9/2021 | Mikroulis | F41G 1/473 |

* cited by examiner

*Primary Examiner* — J. Woodrow Eldred
(74) *Attorney, Agent, or Firm* — Mark A. Pitchford; Eric B. Fugett; Pitchford Fugett, PLLC

(57) ABSTRACT

A point blank delta scope reticle, wherein all range and yardage solutions (horizontal x) may be removed and/or ignored and only the vertical Y component is utlized. A vital zone of a target is viewed as a Y value and a ballistic curve can be calculated that will pass thru the determined Y value. The Y value becomes a constant in all calculations. The constant then yields one or more unique ratios that all ammunition follows since the vertical Y component is the constant. The aiming reticle includes a reticle and one or more subsequent or successive reference marks formed in an aligned fashion between the reticle and a last reference mark, wherein a relative distance between each adjacent pair of the subsequent or successive reference marks decreases as the subsequent or successive reference marks are formed from the reticle to the last of the subsequent or successive reference marks.

10 Claims, 101 Drawing Sheets

| Drop MOA | 1 | 2 | 3 | 4 | 5 | 6 | 7 | 8 | 9 |
|---|---|---|---|---|---|---|---|---|---|
| 100 | 0 | 0 | 0 | 0 | 0 | 0 | 0 | 0 | 0 |
| 280 | -3.3 | -2.8 | -2.7 | -3.2 | -3.8 | -3.2 | -3.3 | -3.9 | -3.4 |
| 290 | -3.5 | -3 | -2.9 | -3.4 | -4.1 | -3.5 | -3.5 | -4.2 | -3.6 |
| 300 | -3.8 | -3.3 | -3.1 | -3.6 | -4.3 | -3.7 | -3.8 | -4.5 | -3.9 |
| 310 | -4.1 | -3.5 | -3.3 | -3.9 | -4.6 | -4 | -4 | -4.8 | -4.1 |
| 320 | -4.3 | -3.7 | -3.6 | -4.1 | -4.9 | -4.2 | -4.3 | -5 | -4.4 |
| 330 | -4.6 | -4 | -3.8 | -4.4 | -5.1 | -4.5 | -4.5 | -5.3 | -4.6 |
| 340 | -4.9 | -4.2 | -4 | -4.7 | -5.4 | -4.7 | -4.8 | -5.6 | -4.9 |
| 350 | -5.1 | -4.4 | -4.3 | -4.9 | -5.7 | -5 | -5 | -6 | -5.2 |
| 360 | -5.4 | -4.7 | -4.5 | -5.2 | -6 | -5.3 | -5.3 | -6.3 | -5.4 |
| 500 | -9.8 | -8.7 | -8.6 | -9.4 | -10.4 | -9.4 | -9.4 | -11.1 | -9.5 |
| 510 | -10.2 | -9 | -8.9 | -9.8 | -10.7 | -9.7 | -9.7 | -11.5 | -9.9 |
| 520 | -10.5 | -9.3 | -9.3 | -10.1 | -11 | -10.1 | -10 | -11.9 | -10.2 |
| 530 | -10.9 | -9.6 | -9.6 | -10.5 | -11.4 | -10.4 | -10.4 | -12.3 | -10.5 |
| 540 | -11.3 | -10 | -10 | -10.8 | -11.7 | -10.7 | -10.7 | -12.7 | -10.8 |
| 550 | -11.6 | -10.3 | -10.3 | -11.2 | -12.1 | -11.1 | -11 | -13.1 | -11.2 |
| 560 | -12 | -10.7 | -10.7 | -11.6 | -12.4 | -11.4 | -11.4 | -13.5 | -11.5 |
| 570 | -12.4 | -11 | -11.1 | -11.9 | -12.8 | -11.8 | -11.7 | -13.9 | -11.9 |
| 580 | -12.8 | -11.4 | -12 | -12.3 | -13.1 | -12.2 | -12 | -14.3 | -12.2 |
| 590 | -13.2 | -11.8 | -11.9 | -12.7 | -13.5 | -12.5 | -12.4 | -14.7 | -12.6 |

| Drop MOA | 1 | 2 | 3 | 4 | 5 | 6 | 7 | 8 | 9 |
|---|---|---|---|---|---|---|---|---|---|
| 100 | 0 | 0 | 0 | 0 | 0 | 0 | 0 | 0 | 0 |
| 280 | -3.3 | -2.8 | -2.7 | -3.2 | -3.8 | -3.2 | -3.3 | -3.9 | -3.4 |
| 290 | -3.5 | -3 | -2.9 | -3.4 | -4.1 | -3.5 | -3.5 | -4.2 | -3.6 |
| 300 | -3.8 | -3.3 | -3.1 | -3.6 | -4.3 | -3.7 | -3.8 | -4.5 | -3.9 |
| 310 | -4.1 | -3.5 | -3.3 | -3.9 | -4.6 | -4 | -4 | -4.8 | -4.1 |
| 320 | -4.3 | -3.7 | -3.6 | -4.1 | -4.9 | -4.2 | -4.3 | -5 | -4.4 |
| 330 | -4.6 | -4 | -3.8 | -4.4 | -5.1 | -4.5 | -4.5 | -5.3 | -4.6 |
| 340 | -4.9 | -4.2 | -4 | -4.7 | -5.4 | -4.7 | -4.8 | -5.6 | -4.9 |
| 350 | -5.1 | -4.4 | -4.3 | -4.9 | -5.7 | -5 | -5 | -6 | -5.2 |
| 360 | -5.4 | -4.7 | -4.5 | -5.2 | -6 | -5.3 | -5.3 | -6.3 | -5.4 |
| 500 | -9.8 | -8.7 | -8.6 | -9.4 | -10.4 | -9.4 | -9.4 | -11.1 | -9.5 |
| 510 | -10.2 | -9 | -8.9 | -9.8 | -10.7 | -9.7 | -9.7 | -11.5 | -9.9 |
| 520 | -10.5 | -9.3 | -9.3 | -10.1 | -11 | -10.1 | -10 | -11.9 | -10.2 |
| 530 | -10.9 | -9.6 | -9.6 | -10.5 | -11.4 | -10.4 | -10.4 | -12.3 | -10.5 |
| 540 | -11.3 | -10 | -10 | -10.8 | -11.7 | -10.7 | -10.7 | -12.7 | -10.8 |
| 550 | -11.6 | -10.3 | -10.3 | -11.2 | -12.1 | -11.1 | -11 | -13.1 | -11.2 |
| 560 | -12 | -10.7 | -10.7 | -11.6 | -12.4 | -11.4 | -11.4 | -13.5 | -11.5 |
| 570 | -12.4 | -11 | -11.1 | -11.9 | -12.8 | -11.8 | -11.7 | -13.9 | -11.9 |
| 580 | -12.8 | -11.4 | -12 | -12.3 | -13.1 | -12.2 | -12 | -14.3 | -12.2 |
| 590 | -13.2 | -11.8 | -11.9 | -12.7 | -13.5 | -12.5 | -12.4 | -14.7 | -12.6 |

*Fig. 1*

Cartridge Brand

| | | | | |
|---|---|---|---|---|
| 1 | FED | Fusion | 0.243 | 95g |
| 2 | HOR | Superforman | 0.243 | 95g |
| 3 | HOR | Full Boar | 0.243 | 80g |
| 4 | FED | Vital Shock | 0.243 | 95g |
| 5 | HOR | Match | 6.5 Cree | 140g |
| 6 | HOR | Amer White | 6.5 Cree | 129g |
| 7 | FED | Match | 6.5 Cree | 120g |
| 8 | FED | Fusion | 6.5 Cree | 140g |
| 9 | FED | Vital Shock | 6.5 Cree | 120g |

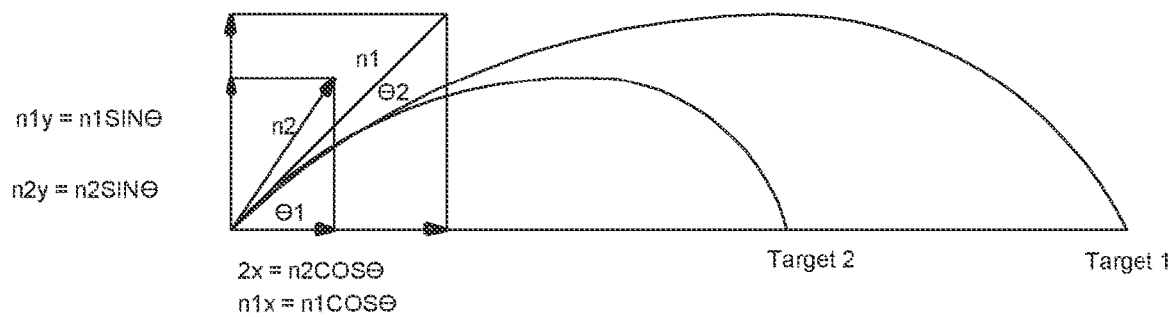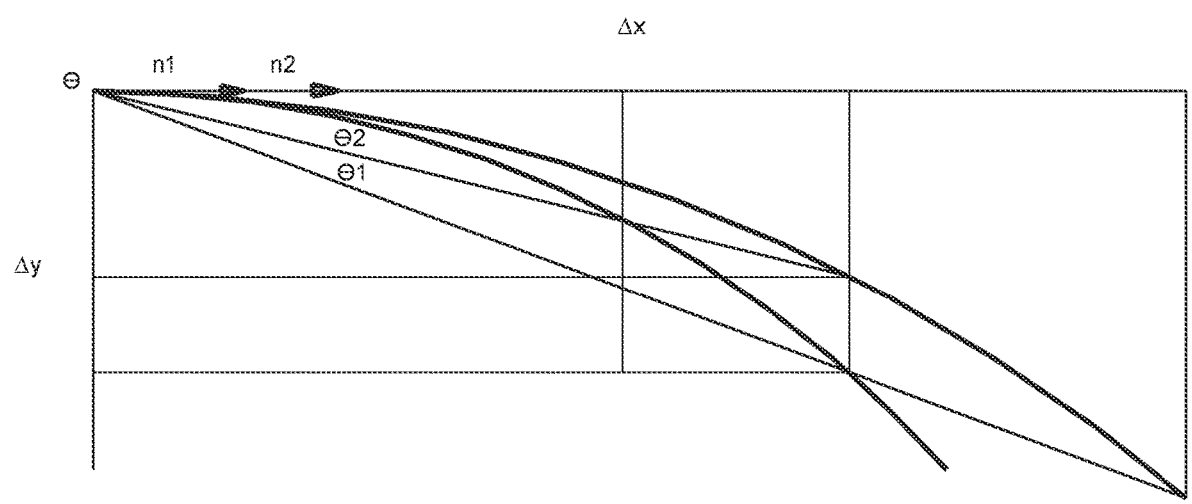
Fig. 40

| Gravity Time (s) | Drop (ft) | Inches | MOA | MIL | Deg |
|---|---|---|---|---|---|
| 1 | 32.2 | 386.4 | 369.05 | 107.35 | 6.44 |
| 2 | 64.4 | 772.8 | 738.11 | 214.71 | 12.88 |
| 3 | 96.6 | 1159.2 | 1107.16 | 322.06 | 19.32 |
| 4 | 128.8 | 1545.6 | 1476.22 | 429.41 | 25.76 |
| 5 | 161 | 1932 | 1845.27 | 536.77 | 32.2 |
| 6 | 193.2 | 2318.4 | 2214.33 | 644.12 | 38.64 |
| 7 | 225.4 | 2704.8 | 2583.38 | 751.47 | 45.08 |
| 8 | 257.6 | 3091.2 | 2952.44 | 858.83 | 51.52 |
| 9 | 289.8 | 3477.6 | 3321.49 | 966.18 | 57.96 |
| 9.3 | 299.46 | 3593.52 | 3432.21 | 998.39 | 59.892 |

*Fig. 41*

| Y-Intervals | Y-Drop | MR MOA | Difference | BDC' MOA | Difference | Y-Drop |
|---|---|---|---|---|---|---|
| 0 | | 0 | | 0 | | |
| 10 | 10 | -3.2 | 3.2 | -1.6 | 1.6 | -4.0 |
| 10 | 20 | -5.2 | 2.0 | -3.3 | 1.7 | -10.4 |
| 10 | 30 | -6.9 | 1.7 | -5.3 | 2.0 | -20.3 |
| 10 | 40 | -8.5 | 1.6 | -8.5 | 3.2 | -40.2 |

*Fig. 45*

| Meters | Drop Inch | MOA |
|---|---|---|
| 324 | -18 | -4.9 |
| 326 | -18.4 | -4.9 |
| 328 | -18.8 | -5 |
| 330 | -19.2 | -5.1 |
| 332 | -19.6 | -5.1 |
| 334 | -19.9 | -5.2 |
| 336 | -20.3 | -5.3 |
| 338 | -20.7 | -5.4 |
| 340 | -21.2 | -5.4 |
| 342 | -21.6 | -5.5 |
| 344 | -22 | -5.6 |
| | Ave = | 5.3 |
| | Range = | 4 |

*Fig. 46*

| Meters | Drop Inch | MOA |
|---|---|---|
| 404 | -37.1 | -8 |
| 406 | -37.7 | -8.1 |
| 408 | -38.3 | -8.2 |
| 410 | -39 | -8.3 |
| 412 | -39.6 | -8.4 |
| 414 | -40.2 | -8.5 |
| 416 | -40.8 | -8.6 |
| 418 | -41.5 | -8.7 |
| 420 | -42.1 | -8.8 |
| 422 | -42.8 | -8.8 |
| 424 | -43.4 | -8.9 |
|  | Ave = | 8.5 |
|  | Range = | 6 |

*Fig. 47*

| Meters | Drop Inch | MOA |
|---|---|---|
| 458 | -55.7 | -10.6 |
| 460 | -56.5 | -10.7 |
| 462 | -57.3 | -10.8 |
| 464 | -58.1 | -10.9 |
| 466 | -58.9 | -11 |
| 468 | -59.7 | -11.1 |
| 470 | -60.6 | -11.3 |
| 472 | -61.4 | -11.4 |
| 474 | -62.3 | -11.5 |
| 476 | -63.1 | -11.6 |
| 478 | -64 | -11.7 |
|  | Ave = | 11 |
|  | Range = | 8 |

*Fig. 48*

| Meters | Drop Inch | MOA |
|---|---|---|
| 294 | -17.8 | -5.3 |
| 296 | -18.1 | -5.4 |
| 298 | -18.5 | -5.4 |
| 300 | -18.9 | -5.5 |
| 302 | -19.3 | -5.6 |
| 304 | -19.8 | -5.7 |
| 306 | -20.2 | -5.8 |
| 308 | -20.6 | -5.8 |
| 310 | -21 | -5.9 |
| 312 | -21.4 | -6 |
| 314 | -21.9 | -6.1 |
| | Ave = | -5.7 |
| | Range = | 4 |

*Fig. 49*

| Meters | Drop Inch | MOA |
|---|---|---|
| 372 | -36.9 | -8.7 |
| 374 | -37.6 | -8.8 |
| 376 | -38.2 | -8.9 |
| 378 | -38.8 | -9 |
| 380 | -39.4 | -9.1 |
| 382 | -40.1 | -9.2 |
| 384 | -40.7 | -9.3 |
| 386 | -41.3 | -9.4 |
| 388 | -42 | -9.5 |
| 390 | -42.7 | -9.6 |
| 392 | -43.3 | -9.7 |
| | Ave = | -9.2 |
| | Range = | 6.4 |

*Fig. 50*

| Meters | Drop Inch | MOA |
|---|---|---|
| 426 | -55.7 | -11.4 |
| 428 | -56.5 | -11.5 |
| 430 | -57.3 | -11.6 |
| 432 | -58.1 | -11.7 |
| 434 | -58.9 | -11.9 |
| 436 | -59.8 | -12 |
| 438 | -60.6 | -12.1 |
| 440 | -61.4 | -12.2 |
| 442 | -62.3 | -12.3 |
| 444 | -63.1 | -12.4 |
| 446 | -64 | -12.5 |
|  | Ave = | -12 |
|  | Range = | 8.2 |

*Fig. 51*

| Meters | Drop Inch | MOA |
|---|---|---|
| 350 | -18 | -4.5 |
| 352 | -18.4 | -4.6 |
| 354 | -18.9 | -4.7 |
| 356 | -19.3 | -4.7 |
| 358 | -19.7 | -4.8 |
| 360 | -20.1 | -4.9 |
| 362 | -20.6 | -5 |
| 364 | -21 | -5 |
| 366 | -21.5 | -5.1 |
| 368 | -21.9 | -5.2 |
| 370 | -22.4 | -5.3 |
| 372 | -22.8 | -5.4 |
|  | Ave = | -5 |
|  | Range = | 4.8 |

*Fig. 52*

| Meters | Drop Inch | MOA |
|---|---|---|
| 424 | -37.1 | -7.6 |
| 426 | -37.7 | -7.7 |
| 428 | -38.3 | -7.8 |
| 430 | -39 | -7.9 |
| 432 | -39.6 | -8 |
| 434 | -40.3 | -8.1 |
| 436 | -41 | -8.2 |
| 438 | -41.7 | -8.3 |
| 440 | -42.3 | -8.4 |
| 442 | -43 | -8.5 |
| 444 | -43.7 | -8.6 |
| 446 | -44.4 | -8.7 |
| | Ave = | -8.2 |
| | Range = | 7 |

*Fig. 53*

| Meters | Drop Inch | MOA |
|---|---|---|
| 476 | -56 | -10.3 |
| 478 | -56.8 | -10.4 |
| 480 | -57.7 | -10.5 |
| 482 | -58.5 | -10.6 |
| 484 | -59.4 | -10.7 |
| 486 | -60.2 | -10.8 |
| 488 | -61.1 | -10.9 |
| 490 | -62 | -11.1 |
| 492 | -62.9 | -11.2 |
| 494 | -63.8 | -11.3 |
| 496 | -64.7 | -11.4 |
| | Ave = | -10.8 |
| | Range = | 9 |

*Fig. 54*

| Meters | Drop Inch | MOA |
|---|---|---|
| 330 | -17.9 | -4.7 |
| 332 | -18.3 | -4.8 |
| 334 | -18.8 | -4.9 |
| 336 | -19.2 | -5 |
| 338 | -19.7 | -5.1 |
| 340 | -20.1 | -5.2 |
| 342 | -20.6 | -5.3 |
| 344 | -21.1 | -5.4 |
| 346 | -21.6 | -5.4 |
| 348 | -22 | -5.5 |
| 350 | -22.5 | -5.6 |
| | Ave = | -5.2 |
| | Range = | 5 |

*Fig. 55*

| Meters | Drop Inch | MOA |
|---|---|---|
| 400 | -36.8 | -8 |
| 402 | -37.4 | -8.1 |
| 404 | -38.1 | -8.2 |
| 406 | -38.8 | -8.3 |
| 408 | -39.4 | -8.4 |
| 410 | -40.1 | -8.5 |
| 412 | -40.8 | -8.7 |
| 414 | -41.5 | -8.8 |
| 416 | -42.2 | -8.9 |
| 418 | -42.9 | -9 |
| 420 | -43.7 | -9.1 |
| | Ave = | -8.5 |
| | Range = | 7 |

*Fig. 56*

| Meters | Drop Inch | MOA |
|---|---|---|
| 450 | -55.3 | -10.7 |
| 452 | -56.2 | -10.8 |
| 454 | -57 | -11 |
| 456 | -57.9 | -11.1 |
| 458 | -58.7 | -11.2 |
| 460 | -59.6 | -11.3 |
| 462 | -60.5 | -11.4 |
| 464 | -61.4 | -11.5 |
| 466 | -62.3 | -11.7 |
| 468 | -63.2 | -11.8 |
| 470 | -64.1 | -11.9 |
|  | Ave = | -11.3 |
|  | Range = | 9 |

*Fig. 57*

| Target | 30 | 100 | | | |
|---|---|---|---|---|---|
| Size | 1 | 1 | | | |
| PBY1 | 1 | 1 | - | SD Range= | 0 |
| PBY2 | 0.6598 | 0.638 | - | SD Range= | 0.0154 |
| PBY3 | 0.5019 | 0.498 | - | SD Range= | 0.0027 |

| | PBY1 | PBY2 | PBY3 | | | |
|---|---|---|---|---|---|---|
| | 1 | 0.6598 | 0.5019 | | | |
| | 1 | 0.638 | 0.498 | | | |
| Ave | 1 | 0.6489 | 0.5 | | | |
| Max | 1 | 0.6598 | 0.5019 | | | |
| Min | 1 | 0.638 | 0.498 | | | |
| Range | 0 | 0.0218 | 0.0039 | - | SD Range= | 0.0116 |
| SD | 0 | 0.0154 | 0.0027 | | | |
| 3SD | 0 | 0.0462 | 0.0082 | | | |

*Fig. 60*

| Velocity - Range 2200fps to 4800sps | | | |
|---|---|---|---|
| 10inch target, 168gr MK | | | |
| Velocity | 1150 | 2200 | 3000 |
| Target Size | 1 | 1 | 1 |
| PBY2 | 0.613 | 0.638 | 0.629 |
| PBY3 | 0.465 | 0.482 | 0.468 |
| PBY4 | 0.373 | 0.400 | 0.401 |

| Velocity | PBY2 | PBY3 | PBY4 |
|---|---|---|---|
| 1150 | 0.613 | 0.465 | 0.373 |
| 2200 | 0.638 | 0.482 | 0.400 |
| 3000 | 0.629 | 0.468 | 0.401 |
| 4800 | 0.629 | 0.472 | 0.390 |
| Ave | 0.627 | 0.472 | 0.391 |
| Max | 0.638 | 0.482 | 0.401 |
| Min | 0.627 | 0.468 | 0.390 |
| Range | 0.011 | 0.014 | 0.011 |

| 10" Tall Target | 1.068 | 1.398 | 1.126 |
|---|---|---|---|
| | PBY2 | PBY3 | PBY4 |
| | 1.068 | 2.466 | 3.592 |

| Range Error1 SD | | 1 | 0.7 | 0.6 | % Error |
|---|---|---|---|---|---|
| Range Error 3 SD | | 3.1 | 2.1 | 1.9 | % Error |
| 1 SD Error | 3.114 | 2.144 | 1.879 | Inches at PBY value | |
| 3 SD Error | 3.114 | 5.259 | 7.137 | Inches additive PBY | |

*Fig. 61*

| Summaries of Ratios found for each PBY | | | | |
|---|---|---|---|---|
| Inputs | PBY1 | PBY2 | PBY3 | PBY4 |
| Size of Target | 1 | 0.65 | 0.50 | |
| Velocity | 1 | 0.63 | 0.47 | 0.39 |
| BC | 1 | 0.63 | 0.49 | 0.40 |
| | Ave | 0.64 | 0.49 | 0.40 |
| | Max | 0.65 | 0.50 | 0.40 |
| | Min | 0.63 | 0.47 | 0.39 |
| | Range | 0.02 | 0.03 | 0.01 |
| | SD | 0.01 | 0.01 | 0.01 |
| | 3SD | 0.04 | 0.04 | 0.02 |

| | | | |
|---|---|---|---|
| Inches Error 1SD 30" Target | 0.37 | 0.43 | 0.18 |
| Inches Error 3SD 30" Target | 1.11 | 1.28 | 0.53 |
| Additive Error 3SD 30" Target | 1.11 | 2.38 | 2.91 |
| Inches Error 1 SD 100" Target | 1.23 | 1.42 | 0.59 |
| Inches Error 3SD 100" Target | 3.69 | 4.26 | 1.77 |
| Additive Error 3SD 100" Target | 3.69 | 7.94 | 9.71 |

*Fig. 62*

| Summaries of Statistical Ranges per category | | | |
|---|---|---|---|
| | Size of target | velocity | BC |
| 1 | 0.058 | 0.021 | 0.046 |
| 1 | 0.066 | 0.036 | 0.049 |
| 1 | 0.062 | 0.031 | 0.064 |
| Ave | 0.062 | 0.029 | 0.053 |
| Max | 0.066 | 0.036 | 0.064 |
| Min | 0.058 | 0.021 | 0.046 |
| Range | 0.008 | 0.015 | 0.018 |
| SD | 0.004 | 0.008 | 0.01 |
| 3SD | 0.012 | 0.023 | 0.029 |

| Summaries of SD per Category | | | |
|---|---|---|---|
| | Size of target | velocity | BC |
| 1 | 0.026 | 0.01 | 0.024 |
| 1 | 0.027 | 0.015 | 0.027 |
| 1 | 0.026 | 0.018 | 0.035 |
| Ave | 0.026 | 0.014 | 0.029 |
| Max | 0.027 | 0.018 | 0.035 |
| Min | 0.026 | 0.01 | 0.024 |
| Range | 0.001 | 0.008 | 0.011 |
| SD | 0.001 | 0.004 | 0.006 |
| 3SD | 0.002 | 0.012 | 0.017 |

*Fig. 63*

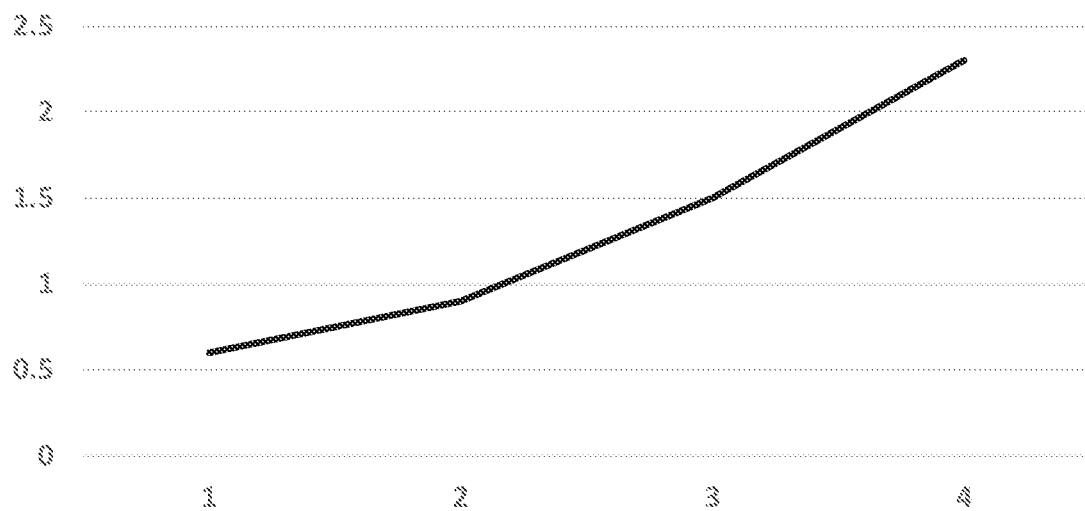
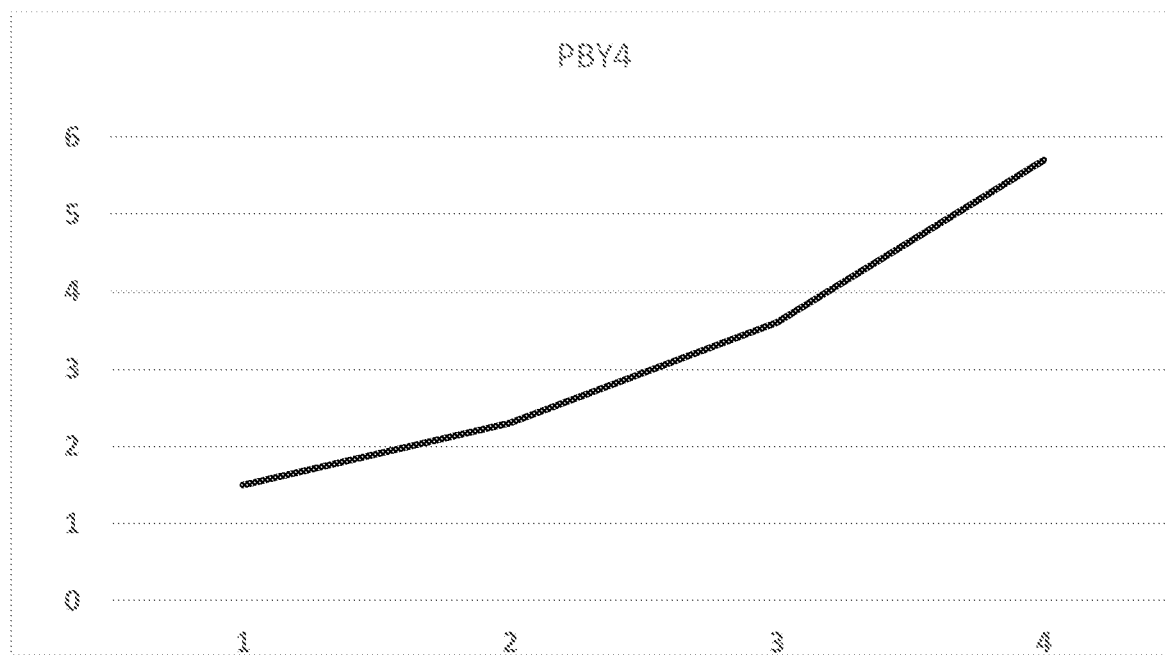
Fig. 66

| Variable Target Height | |  |  |
|---|---|---|---|
| Trajectory | | | |
| Input Data | | | |
| Manufacturer: | Sierra | Description: | HPBT MatchKing™ |
| Caliber: | 0.308 in | Weight: | 168.0 gr |
| Ballistic Coefficients: | 0.405 [0-1600], 0.424 [1600-2100], 0.447 [2100-2600], 0.462 [2600-5000] G1 (ASM) | | |
| Muzzle Velocity: | 3000.0 ft/s | Distance to Chronograph: | 10.0 ft |
| Sight Height: | 2.00 in | Sight Offset: | 0.00 in |
| Zero Height: | 0.00 in | Zero Offset: | 0.00 in |
| Windage: | 0.000 MOA | Elevation: | 0.000 MOA |
| Line Of Sight Angle: | 0.0 deg | Cant Angle: | 0.0 deg |
| Wind Speed: | 10.0 mph | Wind Angle: | 90.0 deg |
| Target Speed: | 0.0 mph | Target Angle: | 90.0 deg |
| Target Height: | 5.0 in | | |
| Temperature: | 59.0 °F | Pressure: | 29.92 in Hg |
| Humidity: | 0% | Altitude: | 1000.0 ft |
| Vital Zone Radius: | 5.0 in | | |
| Column 1 Units: | 1.00 in | Column 2 Units: | 1.00 MOA |
| Output Data | | | |
| Elevation: | 3.860 MOA | Windage: | 0.000 MOA |
| Atmospheric Density: | 0.07375 lb/ft³ | Speed of Sound: | 1116.4 ft/s |
| Maximum PBR: | 335 m | Maximum PBR Zero: | 286 m |
| Range of Maximum Height: | 160 m | Energy at Maximum PBR: | 1950.8 ft·lbs |
| Sectional Density: | 0.253 lb/in² | | |

*Fig. 67*

| Calculated Table \| 5-Inch Target |||||||||
|---|---|---|---|---|---|---|---|---|
| Yards | MOA | MIL | Yards | MOA | MIL | Yards | MOA | MIL |
| 100 | 0 | 0 | | | | | | |
| 105 | 0 | 0 | 185 | -2.5 | -0.3 | 270 | -9.5 | -0.9 |
| 110 | -0.1 | 0 | 190 | -2.8 | -0.4 | 275 | -10.1 | -0.9 |
| 115 | -0.1 | 0 | 195 | -3.1 | -0.4 | 280 | -10.7 | -1 |
| 120 | -0.2 | 0 | 200 | -3.4 | -0.4 | 285 | -11.3 | -1 |
| 125 | -0.3 | -0.1 | 205 | -3.7 | -0.5 | 290 | -11.9 | -1 |
| 130 | -0.4 | -0.1 | 210 | -4.1 | -0.5 | 295 | -12.6 | -1.1 |
| 135 | -0.5 | -0.1 | 215 | -4.4 | -0.5 | 300 | -13.2 | -1.1 |
| 140 | -0.7 | -0.1 | 220 | -4.8 | -0.6 | 305 | -13.9 | -1.2 |
| 145 | -0.8 | -0.1 | 225 | -5.2 | -0.6 | 310 | -14.6 | -1.2 |
| 150 | -1 | -0.2 | 230 | -5.6 | -0.6 | 315 | -15.3 | -1.2 |
| 155 | -1.1 | -0.2 | 235 | -6.1 | -0.7 | 320 | -16.1 | -1.3 |
| 160 | -1.3 | -0.2 | 245 | -7 | -0.7 | 325 | -16.8 | -1.3 |
| 165 | -1.5 | -0.2 | 250 | -7.4 | -0.8 | 330 | -17.6 | -1.4 |
| 170 | -1.8 | -0.3 | 255 | -7.9 | -0.8 | 335 | -18.4 | -1.4 |
| 175 | -2 | -0.3 | 260 | -8.5 | -0.8 | 340 | -19.2 | -1.4 |
| 180 | -2.3 | -0.3 | 265 | -9 | -0.9 | 345 | -20.0 | -1.5 |

End of 5-2.5

*Fig. 68*

| BC Range .11 to 2.0 G1 | | | | |
|---|---|---|---|---|
| BC Value | 0.110 | 0.500 | 0.700 | 2.000 |
|  | 1.000 | 1.000 | 1.000 | 1.000 |
| PBY1 | 0.593 | 0.649 | 0.641 | 0.627 |
| PBY2 | 0.447 | 0.497 | 0.503 | 0.491 |
| PBY3 | 0.360 | 0.421 | 0.411 | 0.405 |

|  | PBY1 | PBY2 | PBY3 |
|---|---|---|---|
| BC 0.110 | 0.593 | 0.447 | 0.360 |
| BC 0.500 | 0.649 | 0.497 | 0.421 |
| BC 0.700 | 0.641 | 0.503 | 0.411 |
| BC 2.000 | 0.627 | 0.491 | 0.405 |
| Ave | 0.628 | 0.485 | 0.399 |
| Max | 0.649 | 0.503 | 0.421 |
| Min | 0.593 | 0.447 | 0.360 |
| Range | 0.056 | 0.056 | 0.061 |
| SD | 0.025 | 0.025 | 0.027 |
| 3SD | 0.075 | 0.076 | 0.081 |

*Fig. 74*

| Trajectory | | | |
|---|---|---|---|
| Input Data | | | |
| Manufacturer: | Berger | Description: | Match |
| Caliber: | 0.308 in | Weight: | 155.0 gr |
| Ballistic Coefficient: | 0.453 G1 | | |
| Muzzle Velocity: | 3000.0 ft/s | Distance to | 10.0 ft |
| Sight Height: | 0.01 in | Sight Offset: | 0.00 in |
| Zero Height: | 0.00 in | Zero Offset: | 0.00 in |
| Windage: | 0.000 MOA | Elevation: | 0.000 mil |
| Line Of Sight Angle: | 0.0 deg | Cant Angle: | 0.0 deg |
| Wind Speed: | 10.0 mph | Wind Angle: | 90.0 deg |
| Target Speed: | 10.0 mph | Target Angle: | 90.0 deg |
| Target Height: | 2.0 in | | |
| Temperature: | 59.0 °F | Pressure: | 29.92 in Hg |
| Humidity: | 0% | Altitude: | 0.0 ft |
| Vital Zone Radius: | 30.0 in | | |
| Std. Atmosphere at Altitude: | No | Pressure is Corrected: | Yes |
| Zero at Max. Point Blank Range: | No | Target Relative Drops: | Yes |
| Mark Sound Barrier Crossing: | No | Include Extra Rows: | No |
| Column 1 Units: | 1.00 in | Column 2 Units: | 1.00 mil |
| Output Data | | | |
| Elevation: | 0.260 mil | Windage: | 0.000 MOA |
| Atmospheric Density: | 0.07647 lb/ft$^3$ | Speed of Sound: | 1116.4 ft/s |
| Maximum PBR: | 658 m | Maximum PBR Zero: | 563 m |
| Range of Maximum Height: | 305 m | Energy at Maximum | 964.1 ft•lbs |
| Sectional Density: | 0.233 lb/in$^2$ | | |

*Fig. 87*

| Calculated Table | | | | | |
|---|---|---|---|---|---|
| Range (M) | Drop (In) | Drop (MIL) | Velocity (ft/s) | Mach | Time (s) |
| 50 | -0.1 | 0 | 2889.3 | 2.588 | 0.05 |
| 75 | -0.6 | -0.2 | 2831.5 | 2.536 | 0.08 |
| 100 | -1.4 | -0.4 | 2774.4 | 2.485 | 0.11 |
| 125 | -2.6 | -0.5 | 2718.1 | 2.435 | 0.14 |
| 150 | -4.1 | -0.7 | 2662.5 | 2.385 | 0.17 |
| 175 | -6 | -0.9 | 2607.6 | 2.336 | 0.2 |
| 200 | -8.2 | -1 | 2553.4 | 2.287 | 0.23 |
| 225 | -10.9 | -1.2 | 2499.8 | 2.239 | 0.26 |
| 250 | -14 | -1.4 | 2446.9 | 2.192 | 0.3 |
| 275 | -17.5 | -1.6 | 2394.6 | 2.145 | 0.33 |
| 300 | -21.4 | -1.8 | 2342.9 | 2.099 | 0.37 |
| 325 | -25.9 | -2 | 2291.9 | 2.053 | 0.4 |
| 350 | -30.8 | -2.2 | 2241.5 | 2.008 | 0.44 |
| 375 | -36.2 | -2.5 | 2191.6 | 1.963 | 0.48 |
| 400 | -42.2 | -2.7 | 2142.4 | 1.919 | 0.51 |
| 425 | -48.8 | -2.9 | 2093.8 | 1.875 | 0.55 |
| 450 | -55.9 | -3.2 | 2045.9 | 1.833 | 0.59 |
| 475 | -63.7 | -3.4 | 1998.6 | 1.79 | 0.63 |

*Fig. 88*

| T1 | 0.722 |
|---|---|
| T2 | 0.764 |
| T3 | 0.780 |
| T4 | 0.727 |
| T5 | 0.772 |
| Ave= | 0.753 |
| Max = | 0.780 |
| Min = | 0.722 |
| Range = | 0.058 |
| SD= | 0.027 |
| 3SD= | 0.080 |

| T1 | 0.631 |
|---|---|
| T2 | 0.664 |
| T3 | 0.697 |
| T4 | 0.637 |
| T5 | 0.671 |
| Ave= | 0.660 |
| Max = | 0.697 |
| Min = | 0.631 |
| Range = | 0.066 |
| SD= | 0.027 |
| 3SD= | 0.081 |

| T1 | 0.590 |
|---|---|
| T2 | 0.620 |
| T3 | 0.649 |
| T4 | 0.586 |
| T5 | 0.620 |
| Ave= | 0.613 |
| Max = | 0.649 |
| Min = | 0.586 |
| Range = | 0.063 |
| SD= | 0.026 |
| 3SD= | 0.077 |

*Fig. 89*

| Summaries of Ratios found for each PBY | | | | |
|---|---|---|---|---|
| | PBY1 | PBY2 | PBY3 | BY4 |
| Size of Target | 1 | 0.753 | 0.66 | 0.613 |
| Velocity | 1 | 0.773 | 0.673 | 0.628 |
| BC | 1 | 0.772 | 0.679 | 0.629 |
| Ave | | 0.766 | 0.671 | 0.623 |
| Max | | 0.773 | 0.679 | 0.629 |
| Min | | 0.753 | 0.66 | 0.613 |
| Range | | 0.02 | 0.019 | 0.016 |
| SD | | 0.011 | 0.01 | 0.009 |
| 3SD | | 0.034 | 0.029 | 0.027 |

*Fig. 90*

| Summaries of statistical Ranges per category | | | |
|---|---|---|---|
| | Size of target | Velocity | BC |
| 1 | 0.058 | 0.021 | 0.046 |
| 1 | 0.066 | 0.036 | 0.049 |
| 1 | 0.062 | 0.031 | 0.064 |
| Ave | 0.062 | 0.029 | 0.053 |
| Max | 0.066 | 0.036 | 0.064 |
| Min | 0.058 | 0.021 | 0.046 |
| Range | 0.008 | 0.015 | 0.018 |
| SD | 0.004 | 0.008 | 0.01 |
| 3SD | 0.012 | 0.023 | 0.029 |

*Fig. 91*

|   | Size of Target | Velocity | BC    | Ave   | SD     |
|---|----------------|----------|-------|-------|--------|
| 1 | 0.058          | 0.021    | 0.046 | 0.042 | 0.0189 |
| 1 | 0.066          | 0.036    | 0.049 | 0.05  | 0.0150 |
| 1 | 0.062          | 0.031    | 0.064 | 0.052 | 0.0185 |
| Ave   | 0.062      | 0.029    | 0.053 |       |        |
| Max   | 0.066      | 0.036    | 0.064 |       |        |
| Min   | 0.058      | 0.021    | 0.046 |       |        |
| Range | 0.008      | 0.015    | 0.018 |       |        |
| SD    | 0.004      | 0.008    | 0.01  |       |        |
| 3SD   | 0.012      | 0.023    | 0.029 |       |        |

*Fig. 92*

| BC   | 0.110 | 0.500 | 0.700 |   |          |   |       |
|------|-------|-------|-------|---|----------|---|-------|
| PBY1 | 0.593 | 0.649 | 0.641 | - | SD Range | = | 0.030 |
| PBY2 | 0.447 | 0.497 | 0.503 | - | SD Range | = | 0.030 |
| PBY3 | 0.360 | 0.421 | 0.411 | - | SD Range | = | 0.033 |

|          | PBY1  | PBY2  | PBY3  |   |           |   |       |
|----------|-------|-------|-------|---|-----------|---|-------|
| BC 0.110 | 0.593 | 0.447 | 0.360 |   |           |   |       |
| BC 0.500 | 0.649 | 0.497 | 0.421 |   |           |   |       |
| BC 0.700 | 0.641 | 0.503 | 0.411 |   |           |   |       |
| Ave      | 0.628 | 0.482 | 0.398 |   |           |   |       |
| Max      | 0.649 | 0.503 | 0.421 |   |           |   |       |
| Min      | 0.593 | 0.447 | 0.360 |   |           |   |       |
| Range    | 0.056 | 0.056 | 0.061 |   |           |   |       |
| SD       | 0.031 | 0.030 | 0.033 | - | SD Range  | = | 0.003 |
| 3SD      | 0.091 | 0.091 | 0.098 | - | 3SD Range | = | 0.006 |

*Fig. 93*

| BC 1 | BC 2 | Delta | Factor Result |
|---|---|---|---|
| 1.7 | 0.284 | 1.416 | 0.109 |
| 1.7 | 0.453 | 1.247 | 0.096 |
| 1.7 | 0.757 | 0.943 | 0.032 |
| 0.757 | 0.284 | 0.473 | 0.127 |
| 0.757 | 0.453 | 0.304 | 0.082 |
| 0.453 | 0.284 | 0.169 | 0.207 |

| Upper Line | | Delta | |
|---|---|---|---|
| Lower Line | | Factor Result | |
| 1 | 1.7 | to | 0.284 |
| 2 | 1.7 | to | 0.453 |
| 3 | 1.7 | to | 0.757 |
| 4 | 0.757 | to | 0.284 |
| 5 | 0.757 | to | 0.453 |
| 6 | 0.453 | to | 0.284 |

| BC 1 | BC 2 | Delta | Factor Result |
|---|---|---|---|
| 0.453 | 0.284 | 0.169 | 0.207 |
| 0.757 | 0.284 | 0.473 | 0.127 |
| 1.700 | 0.284 | 1.416 | 0.109 |
| 1.700 | 0.453 | 1.247 | 0.096 |
| 0.757 | 0.453 | 0.304 | 0.082 |
| 1.700 | 0.757 | 0.943 | 0.032 |

| BC 1 | BC2 | Delta | Factor Result |
|---|---|---|---|
| 0.453 | 0.284 | 0.169 | 0.207 |
| 0.757 | 0.453 | 0.304 | 0.082 |
| 1.700 | 0.757 | 0.943 | 0.032 |

| | Upper Line | | Factor Result | |
|---|---|---|---|---|
| | Lower Line | | Delta | |
| Series | BC 1 | BC 2 | Delta | Factor Result |
| 1 | 0.453 | 0.284 | 0.169 | 0.207 |
| 2 | 0.757 | 0.453 | 0.304 | 0.082 |
| 3 | 1.700 | 0.757 | 0.943 | 0.032 |

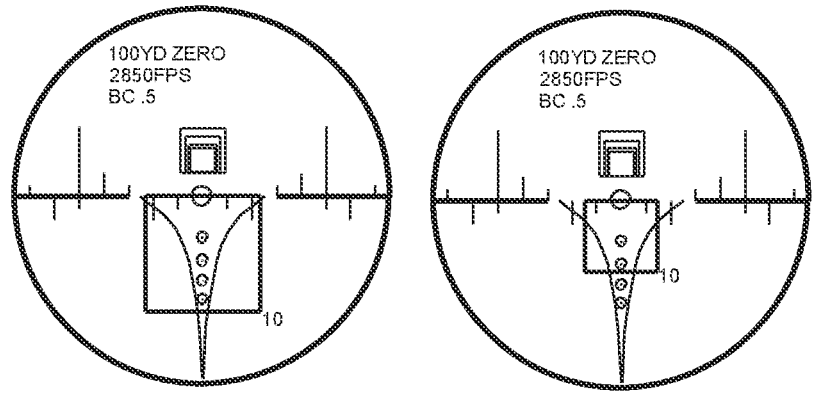
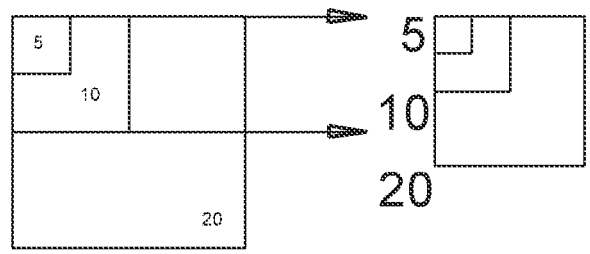
*Fig. 103*
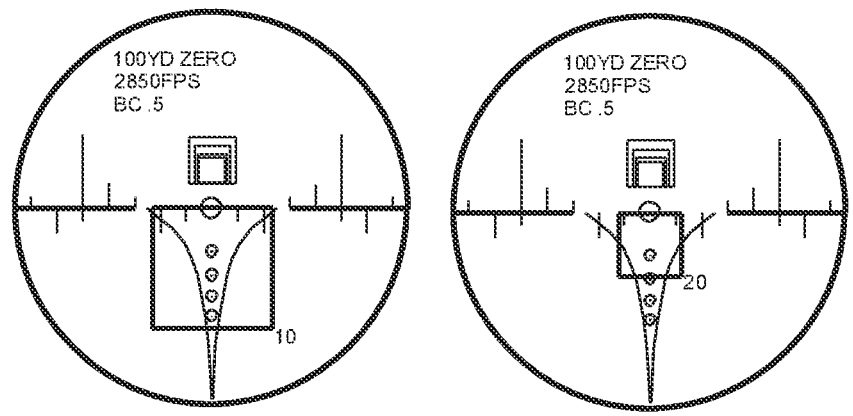
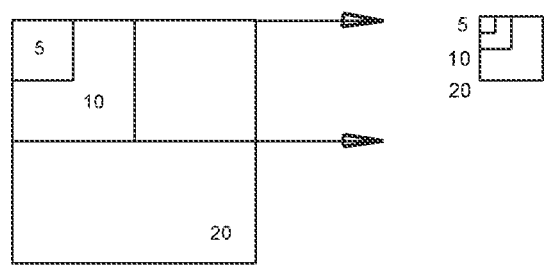
*Fig. 104*

WIND RIGHT TO LEFT- BULLET LIFTS/JUMP UP
WIND LEFT TO RIGHT- BULLET SINKS/JUMPS DOWN

POINT BLANK DELTA SCOPE RETICLE

CROSS-REFERENCE TO RELATED APPLICATIONS

This patent application claims the benefit of U.S. Patent Application Ser. No. 63/271,794, filed Oct. 26, 2021, the disclosure of which is incorporated herein in its entirety by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of reticles and targeting devices. More specifically, the present disclosure relates to a point blank delta scope reticle.

2. Description of Related Art

It is generally known to use an optic, including a reticle to enhance the ability to identify a target and aim a firearm or other projectile firing or discharging device. Typical reticles include at least one central aiming mark.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

A reticle system that does not use moa, mil, BDC, or any form of equal distant spaced stadia. The current noted forms rely at minimum on distance and a corresponding angle to create a firing solution. The current forms need extensive training, and, most importantly, do not embody a max point-blank methodology to extended ranges. This reticle concept uses physics and correlation of bullet drop as a constant to vertical distance as its underline principle to create a firing solution. Multiple formats are included. Significant figures are shown (reticle 7, FIG. 86, reticle 41.

The systems and/or methods of the present disclosure provide a reticle for a scope or other optical device based on a series of equations.

The systems and/or methods of the present disclosure realize applying constants, functions, or averages may simplify ballistic calculations in multiple planes.

The systems and/or methods of the present disclosure realize applying constants, functions, or averages to ballistic calculations may yield linear relationships that may be identified as constants, functions, or averages.

The systems and/or methods of the present disclosure realize linear relationships may be identified as constants, functions, or averages and can be applied to ballistic equations.

The systems and/or methods of the present disclosure realize linear relationships may be described as ratios.

The systems and/or methods in the present disclosure realize equations, formulas, and/or independent values may be identified when describing ratios and/or relationships.

The systems and/or methods of the present disclosure realize the application of constants, functions, or averages over given segments, vectors, such as gravity, and time rule ballistic results.

The systems and/or methods of the present disclosure realize these equations, modes, and relationships may further be used to describe and define unique systems and/or methods, such as a reticle or an optical device.

The systems and/or methods of the present disclosure may be a direct function of target size that may be independent of target distance and where the target size may not determine a range. No other known reticle or aiming device uses target size that may be independent of target distance and where the target size may not determine a range in ballistic computation.

The systems and/or methods of the present disclosure may be a direct function of target size that may be independent of target distance and where the target size may not determine a range to describe elevation and holds. No other reticle or aiming device uses target size that may be independent of target distance and where the target size may not determine a range to describe elevation and holds in this application.

The systems and/or methods of the present disclosure may utilize target size that may be independent of target distance and where the target size may not determine a range. The utilization of a target's size versus dependence on determining target distance to describe elevation and holds is totally unique. No reticle or ballistic calculator directly solves for an elevation or hold using a target's size. Elevation and holds are standardly calculated according to a horizontal target distance.

The systems and/or methods of the present disclosure may utilize target size that may be independent of target distance and where the target size may not determine a range to describe elevation and holds. The utilization of a target's size versus dependence on correlating a target's size to specific distance to describe an elevation and holds is totally unique. No reticle or ballistic calculator directly solves for an elevation or hold using a target's size. Elevation and holds are standardly calculated according to a horizontal target distance.

The systems and/or methods of the present disclosure may correlate elevation and holds directly to target size. No other known reticle or aiming device directly correlates elevation and holds to a target size.

The systems and/or methods of the present disclosure may be a direct function of vectors. No other reticle or aiming device actively realizes vectors to describe ballistic computation.

The systems and/or methods of the present disclosure may be a direct function of time. No other reticle or aiming device uses time to compute a ballistic output. Time is often the result of the ballistic calculation and not a fundamental component to describe its solution.

The systems and/or methods of the present disclosure may be a direct function of vectors in coordination with time. No other reticle or aiming device evaluates vectors over some time interval (t) to describe ballistic output to define an elevation or hold.

The systems and/or methods of the present disclosure display solutions and aim points that do not match any other known reticle. The solutions and aim points described in the systems and/or methods of the present disclosure may appear upside down compared to all other reticles.

Outputs for the systems and/or methods of the present disclosure for a given hold may be driven by target size. Outputs are not driven by range, ballistic coefficients, bore heights, or velocity. Other reticles and ballistic solvers fundamentally use these variables in calculations for the correct output.

The systems and/or methods of the present disclosure may be applied to develop a reticle or an optical device that covers most/all known ammunition or projectiles. The following specifications are exemplary:
a. Velocity: 1150-4800 feet per second (fps)
b. Bullet Compensation (BC): 11 to 2.0G1
c. Target size-approximately golf ball to building sizes.
d. Bullet weights-open
e. Line of Sight+/−60 deg minimum
f. Density Altitude shifts
g. Subsonic profiles The systems and/or methods of the present disclosure realize no gaps when one or multiple parameters are applied or altered in firing solutions. Other reticles and ballistic solvers fail when one or multiple parameters are changed, yielding a firing solution with large gaps where the output cannot be applied.

The systems and/or methods of the present disclosure may optionally be applied to a single power scope, multi-power scope, prisms, lenses, lens offsets, mirror offsets, angular offsets, reticle offsets, angle offsets, and electronically.

The systems and/or methods of the present disclosure may optionally be applied as a standalone device, mechanism, component, reticle, optic, or the like.

The systems and/or methods of the present disclosure may optionally be applied to current equipment or optics as an accessory.

The systems and/or methods of the present disclosure may optionally be instilled in conjunction with current equipment, optics, stadia marks, and the like.

The systems and/or methods of the present disclosure may optionally be instilled in current equipment, optics, stadia marks, and the like.

The systems and/or methods of the present disclosure may be applied to any aerial, land, naval platform, equipment, and or vehicle firing projectiles.

The systems and/or methods in the present disclosure realize real-world values, calculations, and scales.

The systems and/or methods in the present disclosure realize a series of mathematical and statistical proofs using real-world values, calculations, and scales.

The systems and/or methods in the present disclosure realize unique applications from linear relationships and/or ratios may be identified using a series of mathematical and statistical proofs to describe ballistics.

The systems and/or methods in the present disclosure realize unique applications from linear relationships and/or ratios using with real-world values, calculations, and scales.

The systems and/or methods in the present disclosure realize the application of ratios to describe target size.

The systems and/or methods in the present disclosure realize ratios may be used to describe ballistics and create reticles, optics, mechanisms, or optical accessories.

The systems and/or methods in the present disclosure realize ratios may be used to describe to describe ballistics in way of elevation and holds.

The systems and/or methods in the present disclosure realize vectors may be used to describe ballistics and create reticles, optics, mechanisms, or optical accessories.

The systems and/or methods in the present disclosure realize vectors may be used to describe to describe ballistics in way of elevation and holds.

The systems and/or methods in the present disclosure realize unique reticles, optics, mechanisms, or optical accessories may be created when vectors are evaluated against constants, functions, or averages in ballistics equations.

The systems and/or methods in the present disclosure realize vectors when evaluated against constants, functions, or averages in ballistics equations may be used to describe ballistics in way of elevation and holds.

The systems and/or methods in the present disclosure realize descriptions, drawings, figures, tables, proofs, calculations, ratios, analyses, and the like to demonstrate real-world examples of the systems and/or methods in the present disclosure in function and application as a ballistic solution to create a reticle, optic, mechanism, optical accessory, solver, or the like. These are exemplary and should not be construed as limiting the systems and/or methods of application.

The systems and/or methods in the present disclosure realize multiple planes with there being an "x" horizontal plane that may be used to describe target distance, a "y" vertical plane that may be used to describe bullet drop or target height, a "z" level plane that may be used to describe target width or wind, and a "r" rotational plane that may be used to describe spin drift or the like. Titles and descriptions for each plane are provided solely for exemplary purposes and should not be construed as limiting.

Outputs can be obtained from and not limited to:
a) Electronic means-ballistic solver: specialized and standard,
b) Booklet,
c) Wheel type data,
d) Directly printed on the reticle,
e) Electronically generated reticles,
f) Electronically generated and displayed solutions,
g) Turrets,
h) Marked turrets,
i) Specialized turrets,
j) Direct dial with current scopes and optical devices,
k) Prisms of all types, styles, combinations, and placement in the main optic and as an add on,
l) Mirror and reflective surfaces,
m) Adjustable rails,
n) Adjustable bases,
o) Adjustable rings,
p) Trunnion mounts and pivot points,
q) Angular protractor bodies, r) Sine plate mechanism devices, s) Indexing head or rotating device.

It should be noted that though a lists of outputs and adjustments are presented, they are not limited to the noted items, and it should be understood a person skilled in the arts could devise versions, combinations, or new technologies that apply the systems and/or methods of the present disclosure.

The systems and/or methods of the present disclosure realize training for ballistic calculation, compensation, application, and may be drastically reduced.

The systems and/or methods of the present disclosure realize a vertical cone of fire for short range engagements to a cone of fire that could be 1,000 s of meters distant with no overlap or gaps.

The systems and/or methods of the present disclosure realize multiple targets could be engaged at different ranges with little to no adjustment and potentially no overlap or gaps; the primary issue with all other aiming devices.

The systems and/or methods of the present disclosure realize other patents, reticles, optics, Stadia and the like are presented in Minute of Angle ("MOA"), Milliradian ("Mil"), Bullet Drop Compensator ("BDC") that work at a specific angle or more specifically a specific range with a specific cartridge at a specific velocity. All existing reticles set vital areas at convenient yardages like 100, 200, 300, 400, etc. yds, excluding the fact these distances have little to no connection to target size and an actual point-blank vital zone shot, a distance where simply aiming center of the target will effectively guarantee a hit for the rise or fall of the projectile will not exceed the vertical size of the target. The first zone might be correct, but each point thereafter are based on a specific, whole value distance. Ballistic curves based on these values will leave blank areas or gaps, where a hold will not effectively guarantee a hit, because the rise or fall of a projectile will exceed the vertical size of the target at that specific distance. A phenomenon commonly identified in multiple reviewed patents where the term "matched with like ballistics" is used repeatedly.

The systems and/or methods of the present disclosure realize the application of constants, functions, or averages to ballistic equations may usher unique solutions that overcome many of the limits and shortcomings of current standards and methods.

The systems and/or methods of the present disclosure realize the application of constants, functions, or averages to ballistic equations may usher unique solutions where reticles, stadia, dots, and the like may describe real numbers with decimals versus whole numbers when the application of constants, functions, or averages to ballistic equations are used to create reticles, stadia, dots, and the like and correlated to a target distance. For example, where a BDC sets vital areas at convenient yardages like 100, 200, 300, 400, etc. yds, the proposed systems and/or methods of the present disclosure may yield an exemplary reticle where stadia distances represent 0, 323, 587, 639, etc. yds or 0, 323.56, 587.43, 639.27, etc. yds., distances that may not be a multiple of 10 or 100.

The systems and/or methods in the present disclosure realize the aforementioned claims may be applied to multiple planes.

Section 2: Displaying the Problem

FIG. 1 is a chart, the numbers 1-9 represent various ammunition types.

In FIG. 1 the numbers highlighted in bold are resulting moa drop values for a given range.

In FIG. 2 the ammunition representatives are listed. Please note the large grain weight variance presented.

If we look at ammunition type 1, we see that it fits a 4.3-moa drop at 320 yds. However, ammunition type 8 is 290 yds and ammunition type 3 is 350 yds. This is a 60-yd total spread. If we look at ammunition type 1, we see that it fits a 11.5-moa drop at 550 yds. However, ammunition type 8 is 510 yds and ammunition type 3 is 580 yds. This is a 70 yd total spread.

Obviously, any optic that displays a range or moa/mil output cannot be universal.

Without specific ammunition knowledge, a range driven optic is useless unless the target is at the required range so the Point of Aim ("POA") will match the intended Point of Impact ("POI"). In this example, it is important to note that range has nothing to do with the size of the target. Outside this range, POA will not match POI, and engagement will likely result in missing the target all together.

Solving this continually changing POA to POI for different ranges, ballistic coefficients, bore heights, velocities, and other variables cannot be solved with a reticle that works in horizontal range. It cannot be solved with a reticle that uses standard spaced stadia. It cannot be solved with a reticle that runs to an angle solving for horizontal distance. This is due to the fact every ammunition type will need its own solution with current reticles or current aiming optical devices.

The systems and/or methods of the present disclosure solves the noted limitations for engagement across very broad terms of application. If requirements fall outside of a standard optic, the reticle or system of the present disclosure can be scaled up or down, which will then operate to the same application standards.

In various exemplary, nonlimiting embodiments, the systems and/or methods of the present disclosure separately and optionally provide a Master Reticle. The Master Reticle universally works with any round and as simple as select a target size and velocity then magnify to configure your optic. Instead of requiring targets to be at a precise range with a specific cartridge, scale the Master Reticle to the size of your target and determine whether the target falls within a range to get hits; that simple. The Master Reticle assumes a true mathematical approach using gravity as a constant to describe how bullets fall in respect to time, not distance, effectively aggregating standard variables to constants and eliminating ballistic complexity to just a few inputs.

BRIEF DESCRIPTION OF THE SEVERAL VIEWS OF THE DRAWINGS

As required, detailed exemplary embodiments of the present disclosure are disclosed herein; however, it is to be understood that the disclosed embodiments are merely exemplary of the present disclosure that may be embodied in various and alternative forms, within the scope of the present disclosure. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present disclosure.

The exemplary embodiments of the present disclosure will be described in detail, with reference to the following figures, wherein like reference numerals refer to like parts throughout the several views, and wherein:

FIG. 1 is a chart the numbers 1-9 represent various ammunition types;

FIG. 40 Illustrates issue inherent with a standard moa or mil dot reticle;

FIG. 41 Illustrates a table of Gravity in seconds and resulting drops of an object in ft, moa, milradians, and deg;

FIG. 45 Illustrates a table using a MR with velocity v' in velocity range v;

FIG. 46 is a table Illustrating the application of constants with real-world ballistics;

FIG. 47 is a table Illustrating the application of constants with real-world ballistics;

FIG. 48 is a table Illustrating the application of constants with real-world ballistics;

FIG. 49 is a table Illustrating the application of constants with real-world ballistics;

FIG. 50 is a table Illustrating the application of constants with real-world ballistics;

FIG. 51 is a table Illustrating the application of constants with real-world ballistics;

FIG. 52 is a table Illustrating the application of constants with real-world ballistics;

FIG. 53 is a table Illustrating the application of constants with real-world ballistics;

FIG. 54 is a table Illustrating the application of constants with real-world ballistics;

FIG. 55 is a table Illustrating the application of constants with real-world ballistics;

FIG. 56 is a table Illustrating the application of constants with real-world ballistics;

FIG. 57 is a table Illustrating the application of constants with real-world ballistics;

FIG. 60 Illustrates comparing two extremes of target size;

FIG. 61 is a table Illustrating summaries of ratios found for PBY values;

FIG. 62 is a table Illustrating summaries of ratios found for PBY values;

FIG. 63 is a table Illustrating summaries of statistical ranges per category;

FIG. 66 Illustrates the plotting of the single variable target size;

FIG. 67 is a table Illustrating a representative output from JBM Ballistics;

FIG. 68 is a table Illustrating the output derived from calculations in FIG. 67;

FIG. 74 is a table Illustrating a comparison of ballistic coefficients;

FIG. 87 is a table Illustrating ballistic outputs;
FIG. 88 is a table Illustrating ballistic outputs;
FIG. 89 is a table Illustrating the summary PBY2;
FIG. 90 is a table Illustrating summary comparisons;
FIG. 91 is a table Illustrating summary comparisons;
FIG. 92 Illustrates a comparison table;
FIG. 93 is a table Illustrating PBY summaries of BC input values;
FIG. 103 Illustrates a representative reticle comparison;
FIG. 104 Illustrates a representative reticle comparison.

DETAILED DESCRIPTION OF EXEMPLARY EMBODIMENTS OF THE PRESENT DISCLOSURE

Section 3: References and Methods

Prior Art Reticles:
 Prior art designs are all designed to be range finding;
 Prior art designs fail to identify relationships between size, velocity, bullet compensation;
 Prior art designs fail to use a point point-blank range rule; and
 Prior art designs use values that are derived to identify a point in space with no direct value associated with target size.

There are a number of reasons why known reticles fail to provide a reticle as shown and described in the present disclosure. Some of which include:

1) Reticle Design—The distance between reference marks or points in standard Ranging reticles or horizontal distance-based reticles will increase in spacing. The systems and/or methods of the preset disclosure will result in the largest spacing between a relative center or top dot and a next nearest dot, followed by two closer pair then a final dot that is spaced closer than the other 3 spots.

Figures 2, 3:
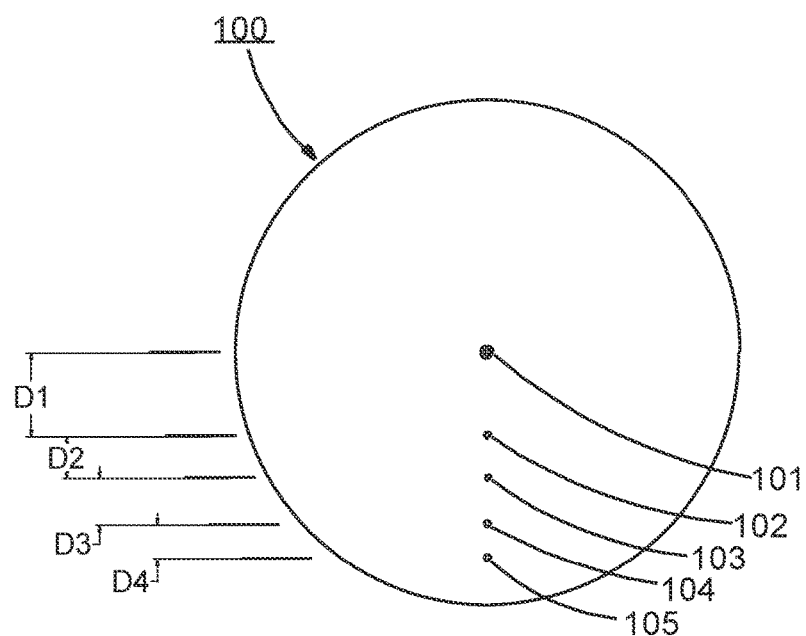
FIG. 2 is a chart listing ammunition representatives.
FIG. 3 Illustrates Typical Field of View.
Figure 100:
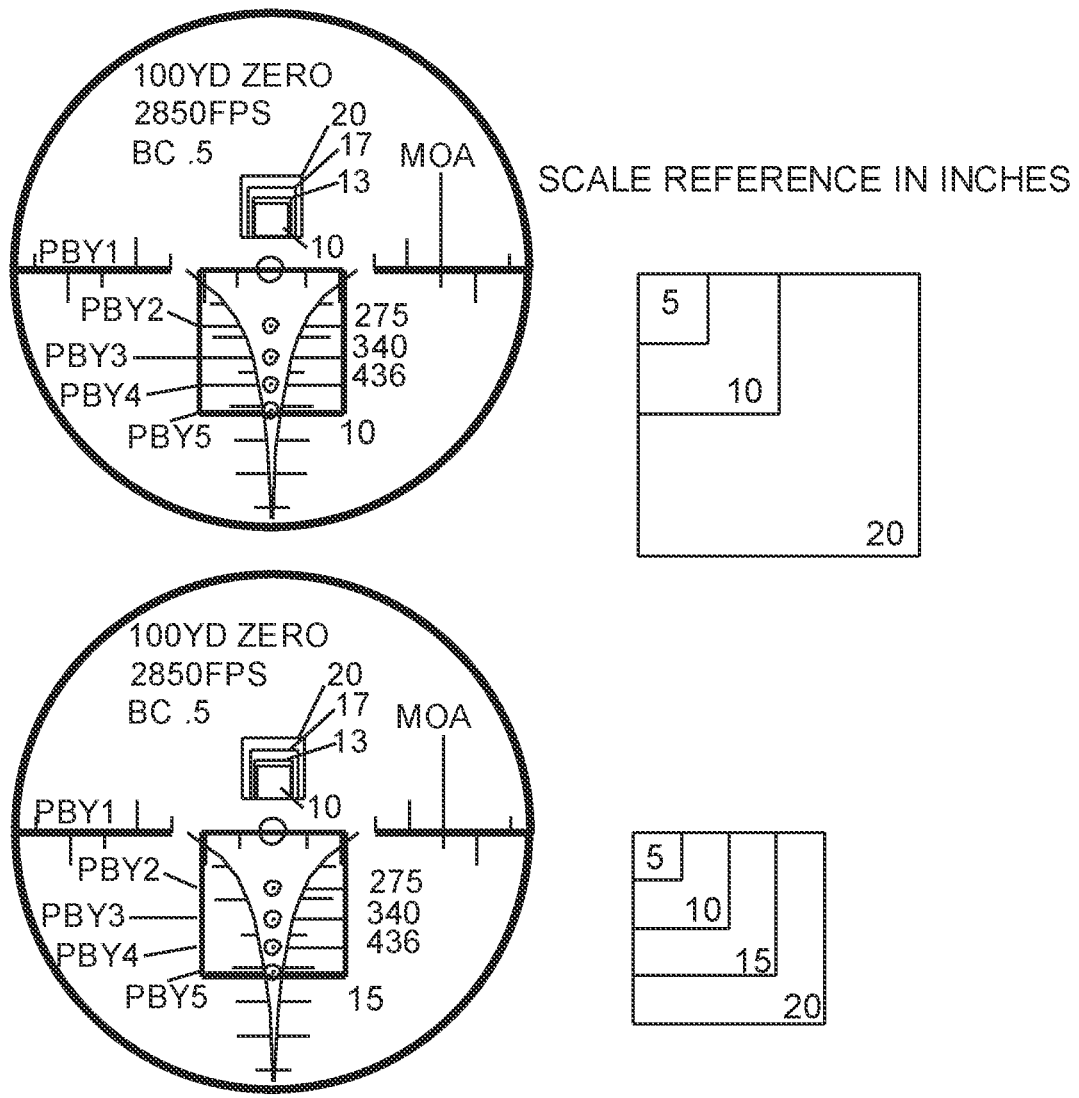
FIG. 100 Illustrates a representative reticle comparison.

FIG. 3 shows a reticle 100, includes points 101, 102, 103, 104, 105. In various exemplary embodiments each point 101-105 can be represented by an etched dot, rectangle, circle, octagon, triangle and any shape could be used in place of the dot. FIG. 2 shows a reticle 100, which includes details, 106, 107, 108, and 109. These details note a ratio value between each point 101,102,103,104. The values would be 1.00, 0.635, 0.485, 0.395. This is a relative constant. The examples shown here in FIG. 100 is solely for exemplary purpose and should not limit the integration or application of the systems and/or methods in this present disclosure.

Figure 8:
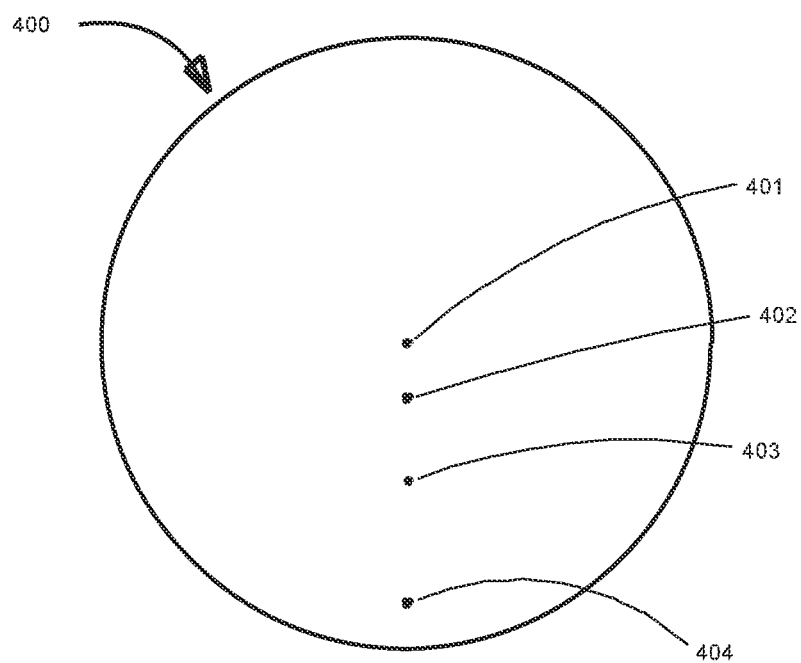
FIG. 8 Illustrates a representative reticle.

FIG. 8 shows reticle detail 201, 202, 203, 204, and 205 represents an abbreviation for a stacked point blank value. The separation of 201 to 202 would represent a height value of 40 inches (example). 202 to 203 would represent the next 40 inch height value. This is repeated through 203 to 204 and 204 to 205 and further as needed and is not restricted within this scope. PBY is used as a simple abbreviation for representation only and communication purposes.

2) Magnification—Other patents describe reticles, optics, and the like where magnification is used to compensate. However, they use ammunition groups that fit a range-a limit—where the patent explicitly demonstrates why the range/yardage can only be paired with like ammunition. The systems and/or methods of the present disclosure are based on a vertical calculation which sets all ammunition on a ratio or similar curve.

3) Variables Compensation—The systems and/or methods of the present disclosure are the only systems and/or methods that reviews, correlates, and describes target size, velocity, BC, incline, subsonic, altitude density with a solution, and where one reticle could be used to compensate for all of these variables that comparatively drive new POA/POI values with horizontal target distance methods. Other patents will discuss one or at the most two components, but not all of them. To note, again, all other known and existing systems and methods are based on range.

4) Exact Ranges-All other known and existing systems and methods select a whole value number for range, often a multiple of 100, like 300 yds or 400 yds or 500 m or 600 m. Arbitrary values that are not directly associated with target size. The systems and/or methods of the present disclosure directly correlates target size to elevation and holds.

Section 4: Implementation of a Y-Constant

If we remove and ignore all range and yardage solutions (horizontal x), and focus on a vertical Y component we can look at the vital zone of the target as a Y value, a ballistic curve can be solved passing thru the noted Y value. Thus, The Y value effectively becomes a constant in all calculations. Applying a Y constant yields a couple of unique ratios that all ammunition follow.

Where range is a continuous ruler in the horizontal, we can apply a vertical ruler to the Y component. If the y-component ruler uses a Y=10 a first aim point is set at 10. If we continue the ruler and second aim point is set at 20, then 30, and so forth, each of these points will have the bullet pass thru them. However, since they are no longer range/horizontal dependent, all ammunition will follow the Y component; where all will have to pass thru Y=10, Y=20, Y=30, Y=40 and so forth (stacked results). Since the Y values are a constant, the ballistic curve of the ammunition can now be applied to that constant. A solution for literally all ammunition types, target sizes, BC, Density altitude can now be realized with one reticle and where target size, the Y-component is the driving variable.

Applying the systems and/or methods of a constant y-component to real-world ammunition types, target sizes, BCs, velocities, density altitudes, and the like yielded the capability of simply changing the magnification value of the reticle allows a person to run a wide variety of ammunitions, target size, BC, Density altitude, effectively scaling the system to fit all scenarios. For example:

Larger the target: Lower the magnification Smaller the target: Increase the magnification Higher Velocity: increase magnification Lower velocity: lower magnification Higher BC: increase magnification Lower BC; decrease magnification Subsonic: decrease magnification All the above are a linear scale when based on a Y component. None of the above are a linear scale when based on a X component (range).

A majority of engagements take place within 800 yds. Applying the systems and/or methods of the present disclosure with y-component constants realizes that Critical zones of a typical target (animal or military personnel) can be described as a series of stacked or point-blank ("PB") results. Applying the systems and/or methods of a constant y-component to real-world ammunition types, target sizes, BCs, velocities, density altitudes, and the like yielded stacked results in the 800 yd engagement can occur within five stacked results. It should be recognized that after 5 stacked, vertical critical zones, bullet path changes rapidly and the BC of the round becomes ever more important and more complex in its results.

For simplicity, the term PBY will used to describe vertical-based calculations and to prove application with real-world ammunitions, target sizes, BCs, velocities, density altitudes, and the like. However, it is important to note a PBLi is applicable if applying ballistic or equational constants, functions, or averages to other planes, such as x (horizontal), y (vertical), z (left to right), and rotational.

As used herein, the uppercase Delta symbol (Li) is used to represent the change between values.

Section 5: Definitions

Each PBY value is assigned a whole number. Starting with PBY1=zero point of the platform. PBY2 is one vital zone height below the end of PBY1. This is repeated for each PBY to be solved for.

Battle PBY-point blank zone to cover a vertical target Multi PBY-PBY1, PBY2, PBY3, PBY4, PBY5 etc. Multiple subsequent or stacked vertical zones with no overlap.

F1—First plane reticle scope-reticle varies linearly with magnification. F2—Second plane reticle scope.-reticle does not change size with magnification.

G1 and G7—Ballistic coefficient family identifier

Target Height-Height of the target. Using the example of a 20-inch-tall target we would refer to the first 20" zone as PBY1.

Adding a second 20" Target Height=20+20=40 total. PBY2 starts at the point PBY1 ended.

Adding a third 20" Target Height=20+20+20=60 total. PB3 starts at the point PBY2 ended.

Adding a fourth 20" Target Height=20+20+20+20=80" total. PBY4 starts at the point PBY3 ended.

Critical ZoneNital Zone—is typically % of the target height or the radius of the original target height. In normal cases this is one radius above bore line axis and one radius below bore line axis.

The stadia may optionally be represented by stadia marks, stadia lines, or other symbols or devices on a reticle.

Section 6: PBY Vs Other Reticles

We can calculate a reticle were PBY1 is a +/− half vital zone or a PBY1 that is totally a minus vital zone. In either case, the results are linear. Different ratios may be applied. For example, A ratio can be applied for PBY1=+/−½ vital zone and a different ratio can be applied for PBY1=−1 vital zone, a true value for PBY1. However, at PBY2 the critical zone equals the sight height with all the value being a negative starting at one radius below the PBY1 value.

Example:

Target height=20"

Vital zone will be one radius above bore axis at +10" and one radius below bore axis at −10".

The resulting 20" value is PBY1 which is equal to your sight in range. If you sight in at 100 yds, for example, that is your PBY1. It should be remembered to take full advantage of an optimal PBY1, the range could be, for example, 378 yds, or 215 yds, or 184 yds. Numbers that will unlikely be a multiple of 100 or some other whole value.

A reticle or system can be designed using a nice, neat number like a multiple of 2100, but PBY1 will not be optimal.

At the end of PBY1, PBY2 starts and its Target Height and Vital Zone are the same number and are all negative after and below PBY1, PBY2, PBY3-4-5 etc. are all a negative value with no positive bullet displacement.

In all cases it describes a hold value that guarantees a hit on a known size target through a known starting and ending range. The range (or the x horizontal distance) is a result of the Y vertical component and becomes a second variable described by a ballistic program for reference. In other words, the vertical distance drives results.

For Bullet Drop Compensation ("BDC") reticles, horizontal ranges drive results. A first point-blank range could potentially be described, but as shown earlier in Section 2, the results could produce errors in 10 s of yards distances and missing the target all together.

Figure 7:
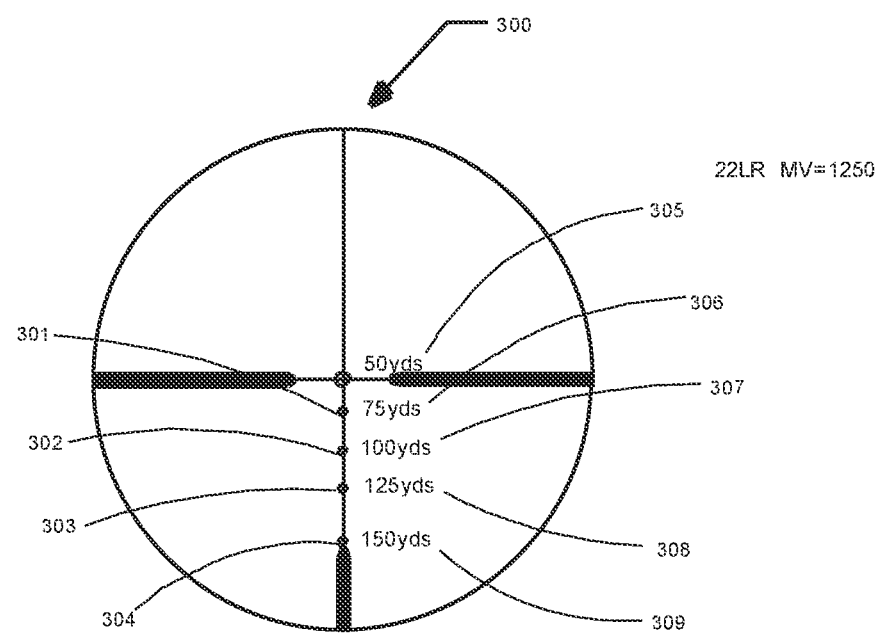
FIG. 7 Illustrates Representative BDC reticle.

In FIG. 7 is a standard example of a Bullet Drop Compensating Reticle (Nikon Pro Staff Rimfire II). It is for a 0.22 Long Rifle with a muzzle velocity of 1600 fps.

The details of FIG. 7 shares the detail of FIG. 3 for a retical field of view representation and a center point. However new dots represented by 301,302, 303, and 304 show this reticles hold points. The figures 305,306,307,308 and 309 represent yardage values that are found as a result of velocity of the round. In the case of this representative BDC reticle the distance described by 305-309 are arbitrary in form. They have no attachment to an actual field target.

If we change the velocity to any other number the reticle no longer functions. If we change to a 300 Norma shooting a 230 gr round at 3000 fps with a BC.7—it is totally useless. It cannot be reconfigured by any means to work with another round.

Unlike a BDC, the systems and/or methods of the present disclosure are not round specific, size specific, BC specific, velocity specific, and the like.

Unlike a standard reticle and turret, stadia, BDC etc. this system can be instantly reconfigured to deal with nearly all ammunition and gun types. This statement also includes performance of ammunition well beyond current standards such as velocities of 4800 fps.

Systems to date have been based on a horizontal range (think of an extreme—long range artillery fire). Grids are used (along with GPS) to establish location. Long, short, left right are typical calls. All current small arms ballistic computers provide a moa or mil offset based on the range the target.

This system provides, in simplistic terms, range is based on target size.

In all cases it describes a hold value that guarantees a hit on a known size target through a known series of vertically stacked vital areas.

If this process is repeated starting with the ending range of the first critical zone a second critical zone that stacks in relation to the first PBY1 creates the second critical zone PBY2. Stacking a third critical zone creates the third PBY3. This could be repeated multiple times throughout the bullets trajectory. Thereby producing a complete coverage of a target using vertical components with no gaps in between the stacked vertical, critical zones. Most fired rounds may be described within four to five stacked critical zones using low power optics before the vertical component produces such a small shift the reticle is rendered unusable without higher magnification. If higher magnification is used the trajectory of the bullet will also produce limits at some range based on the size of a target.

The real world uses vertical components measure horizontal distances. For example, an ultra-long-range sniper may use a vertical object, such as a building, to measure the range of a target at the same distance to obtain a solution-then the target is engaged. The horizontal world for a vital zone depends on a target being at a specific range. That range does not guarantee a hit if the target falls between designated points like the systems and/or methods of the present disclosure. When viewing through a typical rifle scope a "long" becomes a judgement of depth of field and ability to determine a distance and then reconverting into a vertical moa or mil adjustment. Rifle scopes are not built to establish distance. It could be argued that shooters "mil" a target for height to determine distance but that becomes nearly impossible as range increases and the angle of the target approaches zero, a vertical miss at 3000 yds of 1-moa could be a hundred yards of distance.

If we calculate the arc that a round will rise and fall (or just fall) a first critical zone PBY1 (object nullified), a first critical zone is described. Some call this first zone a Point-Blank Range value, or max point-blank range value.

Figure 25:
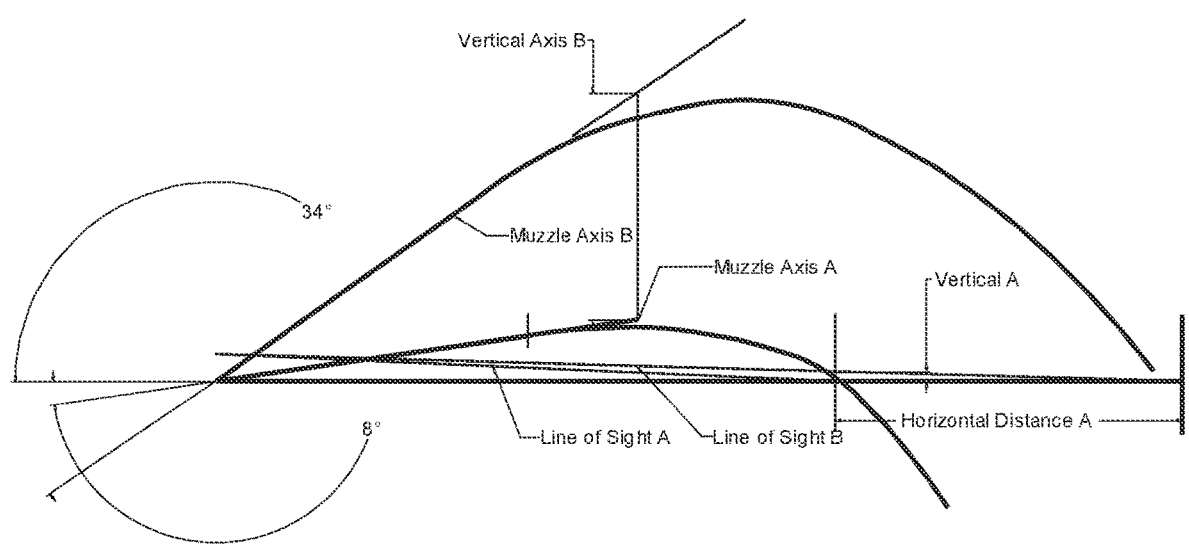
FIG. 25 Illustrates basic components of a ballistic solution.

In FIG. 25 we describe basic components of a ballistic solution.

1) Vertical A component can be measured relatively easily in an optic.
2) Vertical A component can be compared easily.
3) Horizontal Distance A cannot be easily measured within an optic.
4) Horizontal Distance A typically needs a range finder to determine a firing solution.
5) A firing solution can be memorized for a given condition: however, change the condition. Size, velocity, BC and quickly the solution becomes unknown.
6) A firing solution for Horizontal A soon needs a ballistic computer.

Section 7: Application of Ballistic Constants and Vectors to Describe a Reticle

The systems and/or methods of the present disclosure uniquely realize the application of the following exemplary equations, vectors, concepts, and constants to solve ballistics:

Gravity is a universal attractive force between all matter.

Objects on Earth experience gravity (g) as an acceleration toward the center of the Earth.

This acceleration may be assumed as a 9.81 m/s2 constant.

$$g=\sim 9.81 \text{ m/s2}$$

Thus, a free-falling object experiences an acceleration that pulls the object toward the center of the Earth at 9.81 m/s2.

Any object with mass (m) that is accelerating (a), the rate velocity (v) changes per unit of time (t), has force (F). Thus, a free-falling object has a downward force.

$$F=m(v/t)$$

$$F=ma$$

The force pulling the object downward toward the center of the Earth will be resisted by a negative force (FD) generated by air resistance, also known as drag.

Drag is determined by the density of fluid (ρ), velocity (v), drag coefficient (CD) affected by Reynolds number, and cross-sectional area (A).

$$FD=(\rho v2CDA)/2$$

An object that moves (or falls) from point 1 (P1) to point 2 (P2) at some velocity (v) over time (t) can be represented by an arrow connecting P1 to P2 to indicate the direction and distance moved.

$$P1 \square P2 \text{ or } A \square B$$

The representation of motion as an arrow with direction and magnitude (length of the arrow) is a vector.

Vectors may describe velocity, acceleration, force, and thus an object's energy in any plane.

For example, a free-falling object with a downward force of 10 Newtons may be represented by a downward pointing vector 10 units long. If an upward force of 10 Newtons represented by an upward pointing vector 10 units long is applied to the same free-falling object, summing the two Y-component vectors in the above example (+10−10=0) yields a stationary object.

A free-falling object that has both vertical and horizontal motion may be regarded as a projectile and may be represented by its X-Y component vectors.

The X-component vector of a projectile describes its horizontal motion. The Ycomponent vector of a projectile describes its vertical motion.

Vector X=horizontal motion

Vector Y=vertical motion

Horizontal and vertical vectors act independent of each other because they operate on different planes. Therefore, the equations and variable components that describe projectile motion in x-y planes act independent of each other.

Figure 26:
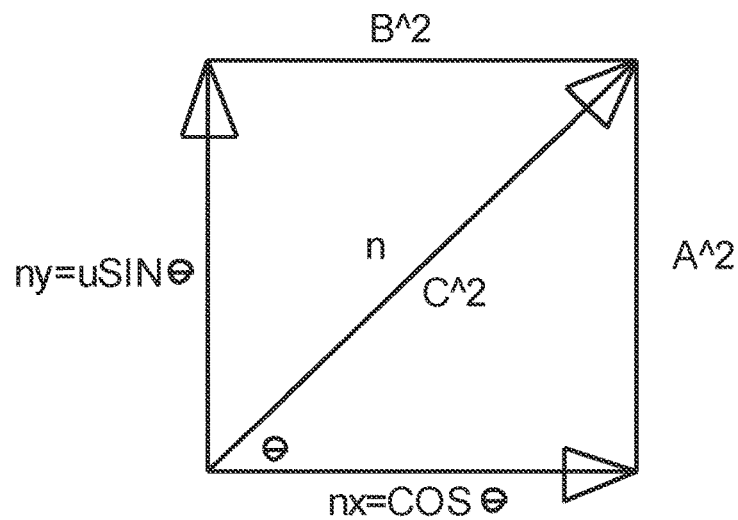
FIG. 26 Illustrates X-Y component vectors of a projectile's motion.

The X-Y component vectors, FIG. 26, of a projectile's motion is calculated by the COS and SIN of the objects angle (Θ) of motion, respectively, or by Pythagorean theorem.

$$A^2+B^2=C^2$$

$$B=nx=n \text{ COS } \Theta$$

$$A=nY=n \text{ SIN } \Theta$$

$$ny^2+nx^2=n^2$$

$$(n \text{ SIN } \Theta)^2+(n \text{ COS } \Theta)^2=n^2$$

FIG. 26

Thus, the equation to describe horizontal projectile motion, or the distance the projectile moves in the x-plane, may be described as the multiple of its velocity vector xcomponent (Vox) by time (D=RT) with respect to (any) change in its velocity in respect to time (acceleration).

Distance=rate×time $D=rt$ $X=V0x\ t$ $\Delta X=V0x\ t+$acceleration $\Delta x=x-x0=v0x\ t+(aX\ t2)/2$ Variables, such as acceleration (a), may be assumed as an average or a function with one or multiple constants over interval (I) or solved as an integral in respect to (I) for non-constants.

The equation to describe vertical projectile motion, or the distance the projectile moves in the y-plane, may be described as the multiple of its velocity vector ycomponent (Voy) and time (D=RT) with respect to change in velocity in respect to time (acceleration).

Figure 27:
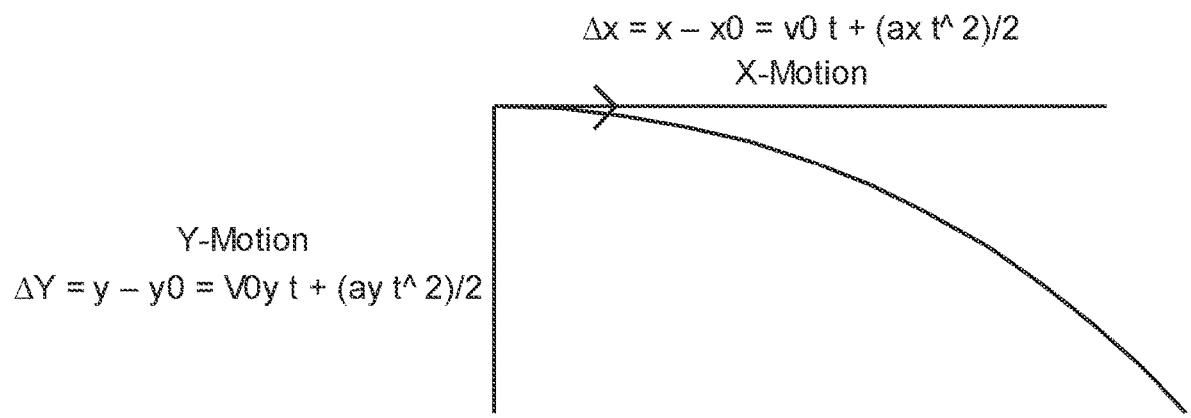
FIG. 27 Illustrates vertical projectile motion.

Distance=rate×time $D=rt$ $Y=V0y\ t$ $\Delta Y=V0y\ t+$acceleration $\Delta y=y-y0=V0y\ t+(ay\ t2)/2$ These components are displayed in FIG. 27.

Variables, such as acceleration (a), may be assumed as an average or a function with one or multiple constants over interval (I) or solved as an integral in respect to (I) for non-constants.

An object's energy (E), or the work done by some force over distance Δx and Δy, described by the Law of Conservation of Mechanical Energy may be used to solve projectile motion variables where one or multiple constants are measured, calculated, or assumed over some interval (I) or as an integral for non-constants with respect to (I).

Energy$(E)$=Kinetic$(K)$+Potential$(U)$=[constant]

$E=\frac{1}{2}mv2+mg\Delta y$

Assuming constant x-y acceleration, projectile equations yield a parabolic curve.

Figure 28:
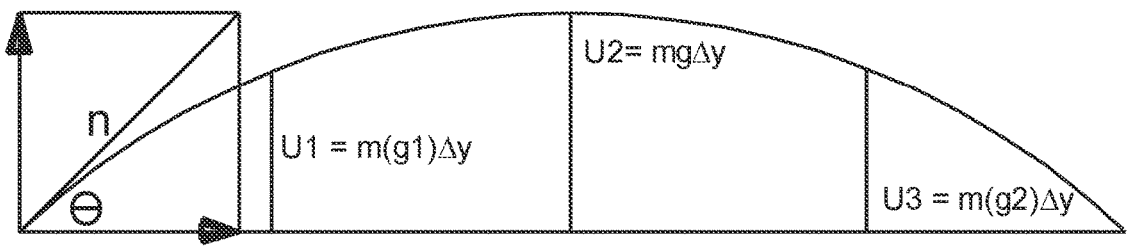
FIG. 28 Illustrates a parabolic curve of a projectile.

Parabolic Curve FIG. 28

$V0y=0$

Parabolic Curve 2

$V0x=n$ $V0y=n$

FIG. 28

Drag, a function of an object's velocity, is a force that decelerates an object over time (t), yielding a non-parabolic curve.

Applying x-y component drag functions to equations that describe projectile motion yield a ballistic curve, the motion of a projectile under the influence of gravity and friction (assuming the projectile does not exhibit a structure or surface that provides lift). X-Y acceleration vector components (ax or ay) may be assumed as average or function with one or multiple constants over interval (I) or solved as an integral in respect to (I) for non-constants, such as acceleration.

$FDx=(\rho v1 \times 2CDA)/2$ $FDy=(\rho v1y2CDA)/2$

Figure 29:
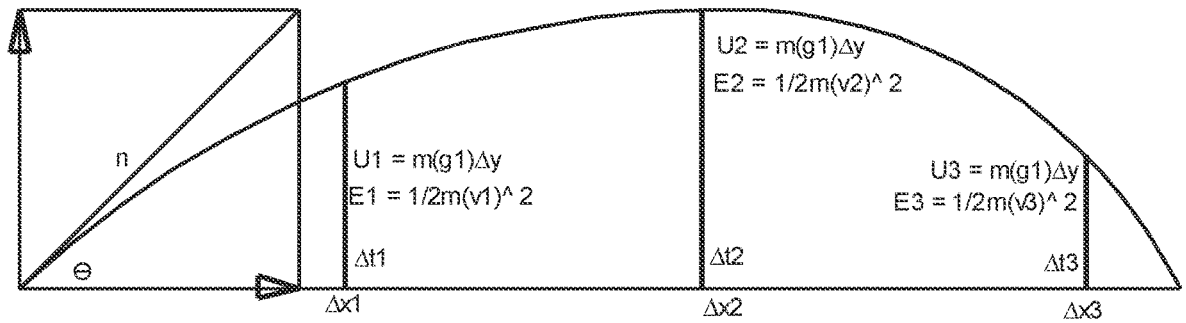
FIG. 29 Illustrates a ballistic curve.

Ballistic Curve FIG. 29

A projectile, such as a bullet fired from a rifle, follows a ballistic curve.

This curve will describe the bullet's position in respect to time (t) and distance (Δx), but this curve is difficult to calculate even with electronic assistance due to the number of complex variables that define a ballistic curve.

Ballistic calculators often solve angle Θ for a bullet with an initial muzzle velocity of v01 to hit a target at Δx distance.

Figure 30:
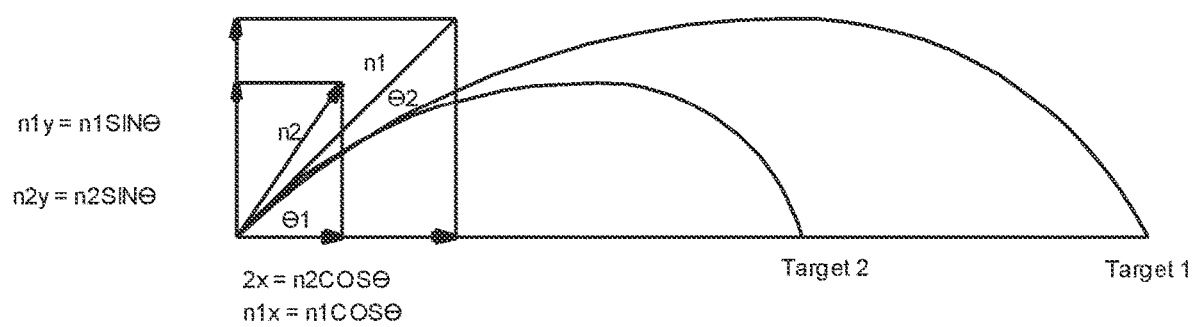
FIG. 30 Illustrates a ballistic curve.

Ballistic Curve 2 FIG. 30

FIG. 30

Angle Θ defines a bullet's subsequent x-y velocity vector components that will describe its motion in horizontal and vertical planes.

Angel Θ may be described in degrees, but optics commonly use minutes of angle (MOA) and milliradians (MIL), a more precise unit of measure to describe degrees.

Angel Θ is often used to describe the distance a bullet drops as a minute of angle or milliradian, versus a linear length, due to the fact the distance a bullet drops changes with respect to distance (Δx), which is affected by a non-linear velocity (v).

$TAN\ \Theta=\Delta y/\Delta x$ $\Theta=TAN-1(\Delta y/\Delta x)$

Figure 31:
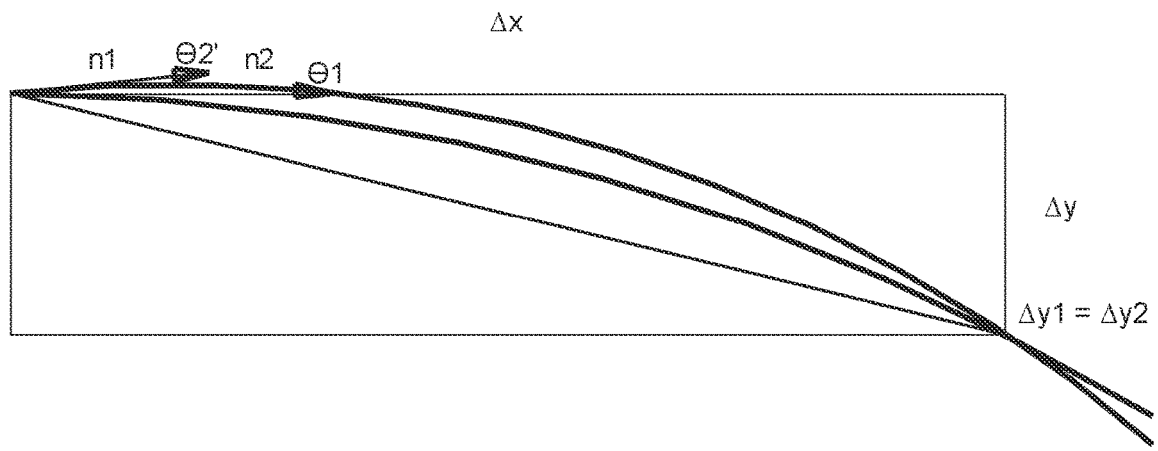
FIG. 31 Illustrates a ballistic curve.

Thus, using FIG. 31, optics use angel Θ as a linear constant in relationship to Δx for at Δx distance, Δy changes with respect to Δx. Or a Δx function drives the result for Δy.

$\Delta y=h(\Theta)\Theta=g(\Delta x)$ $\Delta x=f(v)$ $\Delta y=h(g(f(v)))\square\Delta y=h(g(\Delta x))$

TRIG TRIANGLES 1

ΔY FUNCTION OF ΔX

FIG. 31

Figure 32:
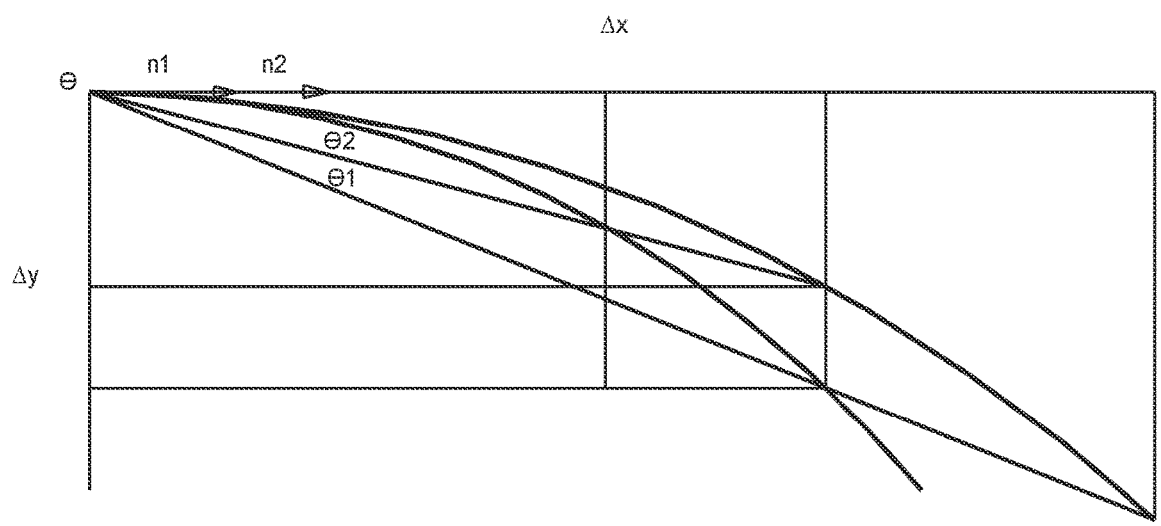
FIG. 32 Illustrates a ballistic curve.

In FIG. 32, displaying ΔY FUNCTION OF Θ

ΔY FUNCTION OF Θ

Θ FUNCTION OF ΔX

FIG. 32

Figure 33:
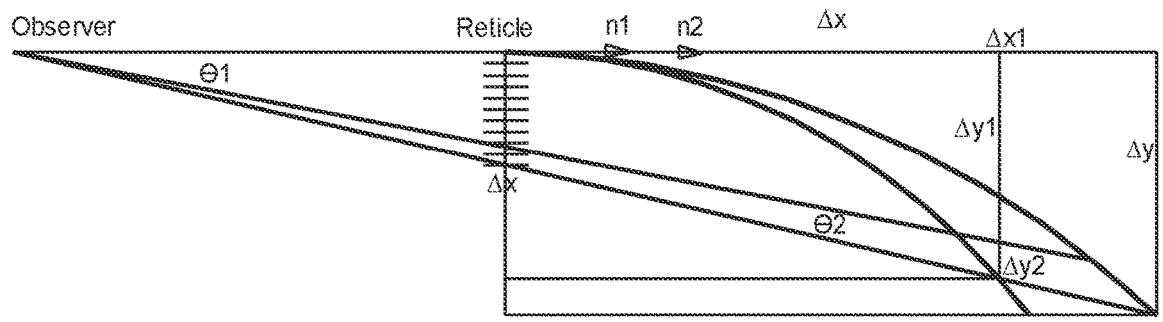
FIG. 33 Illustrates a ballistic curve.

A ballistic solver may calculate a bullet will drop 10-MOA at Δx. Thus, a shooter may dial 10-MOA by turning the scope's elevation turret 10-clicks, assuming each click represents 1-MOA, FIG. 33, or use the scope's internal reticle, effectively a ruler with a series of reference marks, to hold 10-MOA.

FIG. 33

Figure 34:
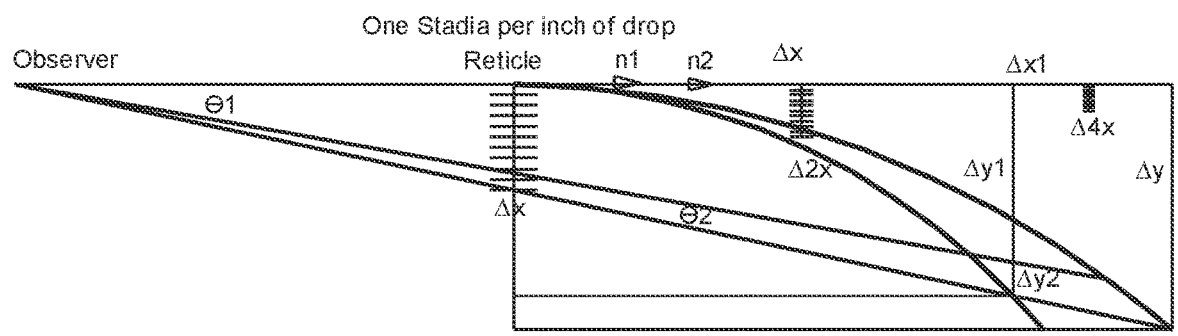
FIG. 34 Illustrates a ballistic curve.

If optics were configured so each click or reticle stadia represented 1-inch of bullet drop, FIG. 34, the precise location of each click or stadia will vary according to range Δx, because the limit describing, for example, 10-inches of bullet drop approaches Θ(0) as distance increases to infinity.

lim $\Delta x\square\infty$ for $\Theta=TAN-1(\Delta y/\Delta x)$ $\Theta=TAN-1(10/\infty)=0$

FIG. 34

Therefore, an optic configured to dial bullet drop (Δy) as a linear distance at Δx could only be used at Δx.

Some optics incorporate a ballistic drop compensator (BDC), a specialized reticle or turret that indicates how far a bullet will drop over specific Δx distances, so instead of using a ballistic calculator to solve angle Θ at each Δx, reference marks are already provided to exact the Θ value at each Δx.

For example, instead of a reticle having 25 stadia lines, each equating to 1-MOA, a BDC reticle may have only 5 stadia lines, equaling 2.8, 5.9, 10.3, 16.2, and 24.7 MOA. Furthermore, angel Θ may not equate to a set Δy interval. For example, 2.8, 5.9, Further Issues exist with current reticles in the form of the basic geometries of a current built reticle and or solvers.

Figure 35:
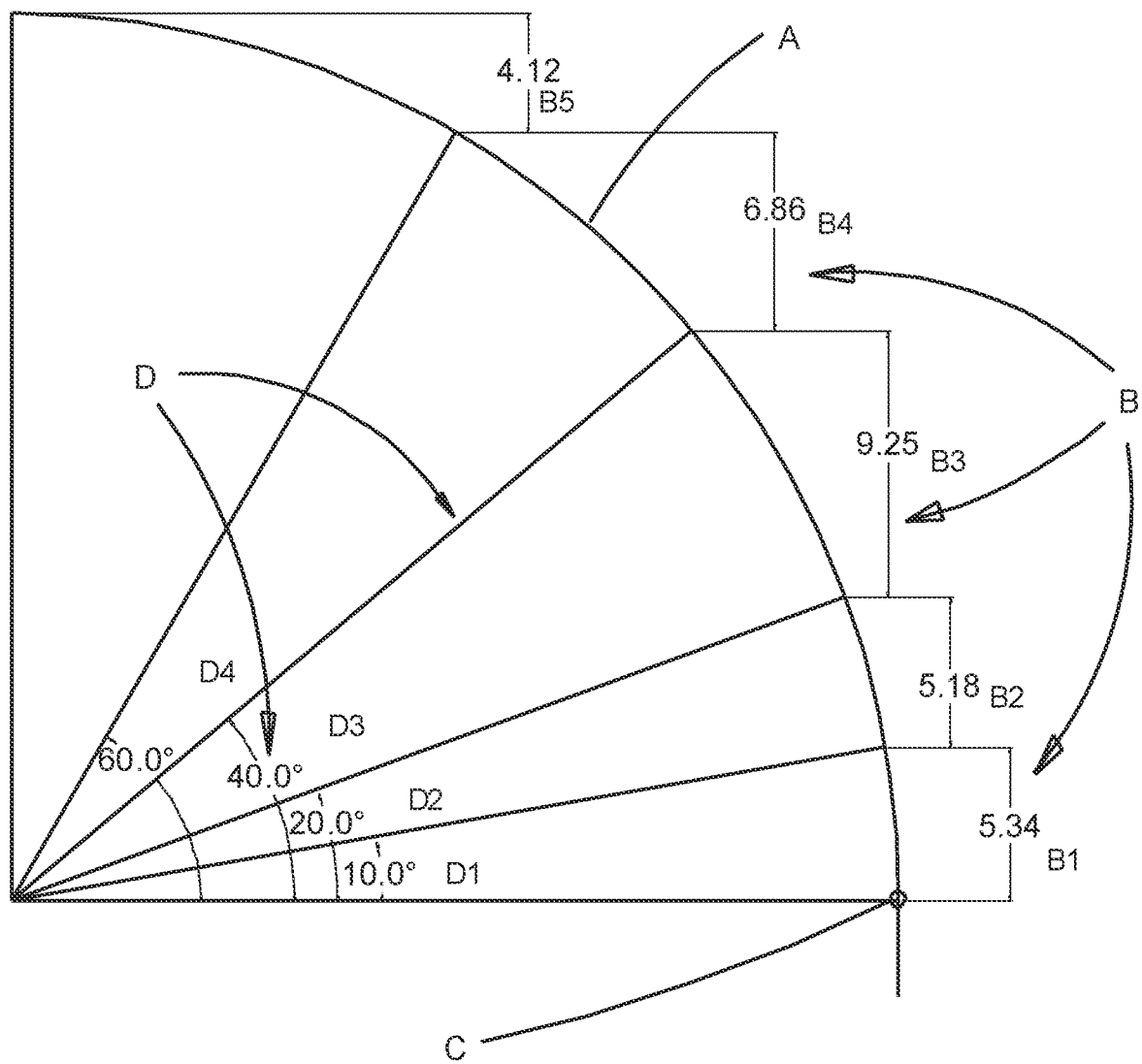
FIG. 35 Illustrates non linear movement of bullet drop as compared to an angular dimension.

In FIG. 35 we show the non linear movement of y (bullet drop) as compared to an angular dimension. This graph is based on a radius to obtain a solution. By making a reticle in which the angular drop (moa or mil) is constant gravity and time are no longer linear as graphed.

Detail A describes the radius of the circle in which all calculations are referenced. Detail C is the target distance from platform. This dictates Detail A. Detail B shows the constantly changing vertical values as applied to Detail A as angles Detail D are applied.

FIG. 36

Figure 36:
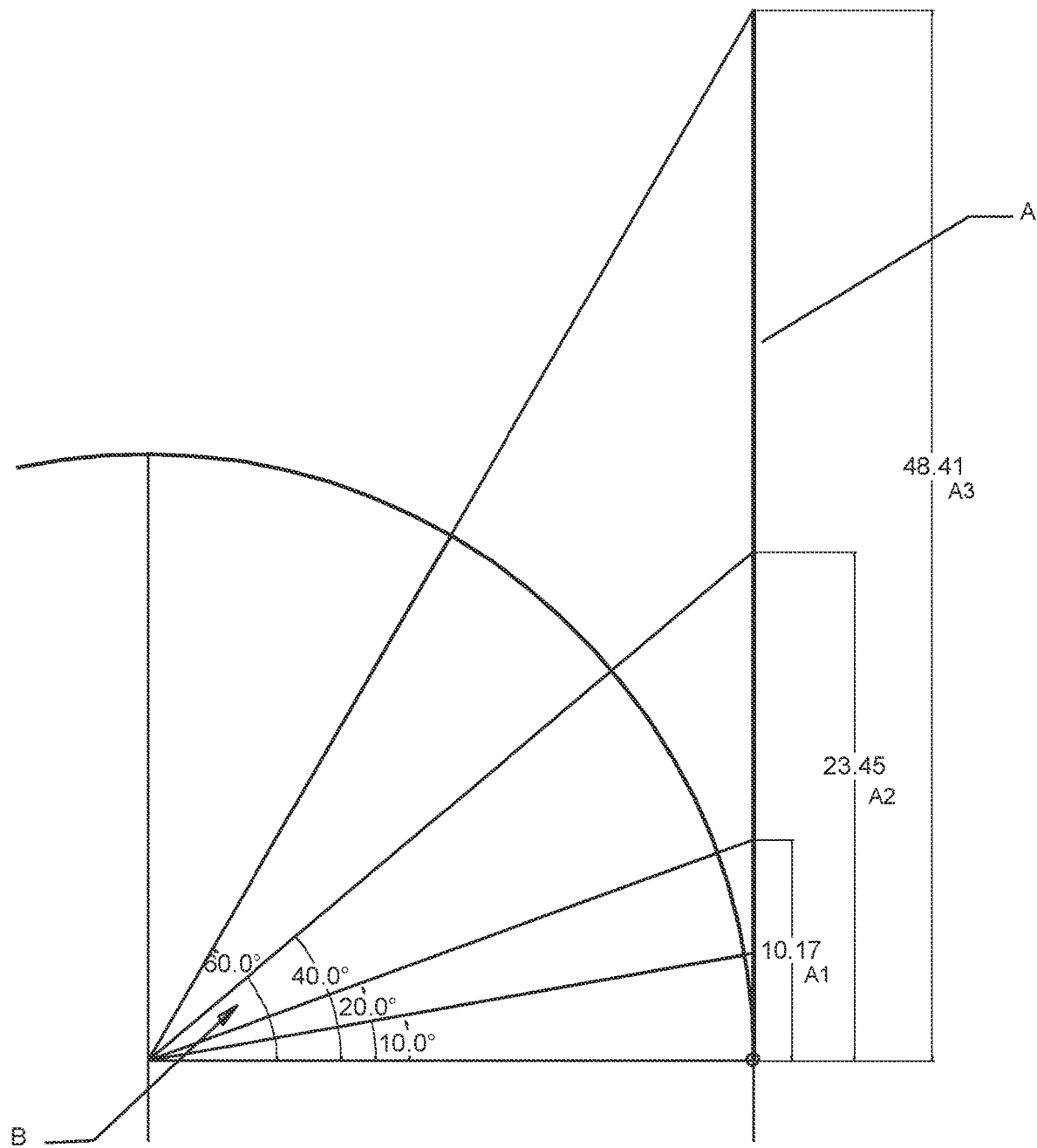
FIG. 36 Illustrates non linear movement of bullet drop as compared to an angular dimension using a vertical line.

In this graph we repeat the exercise in FIG. 36 but we use a vertical line, Detail A which is the vertical line formed by the distance to the target, as the constant. Detail B represents the angle being applied to the solution. As can be seen the Y values are increasing as the angle increases. With gravity being constant the values in time will also increase. In this case we are plotting fractional seconds in FIG. 36.

FIG. 37

Figure 37:
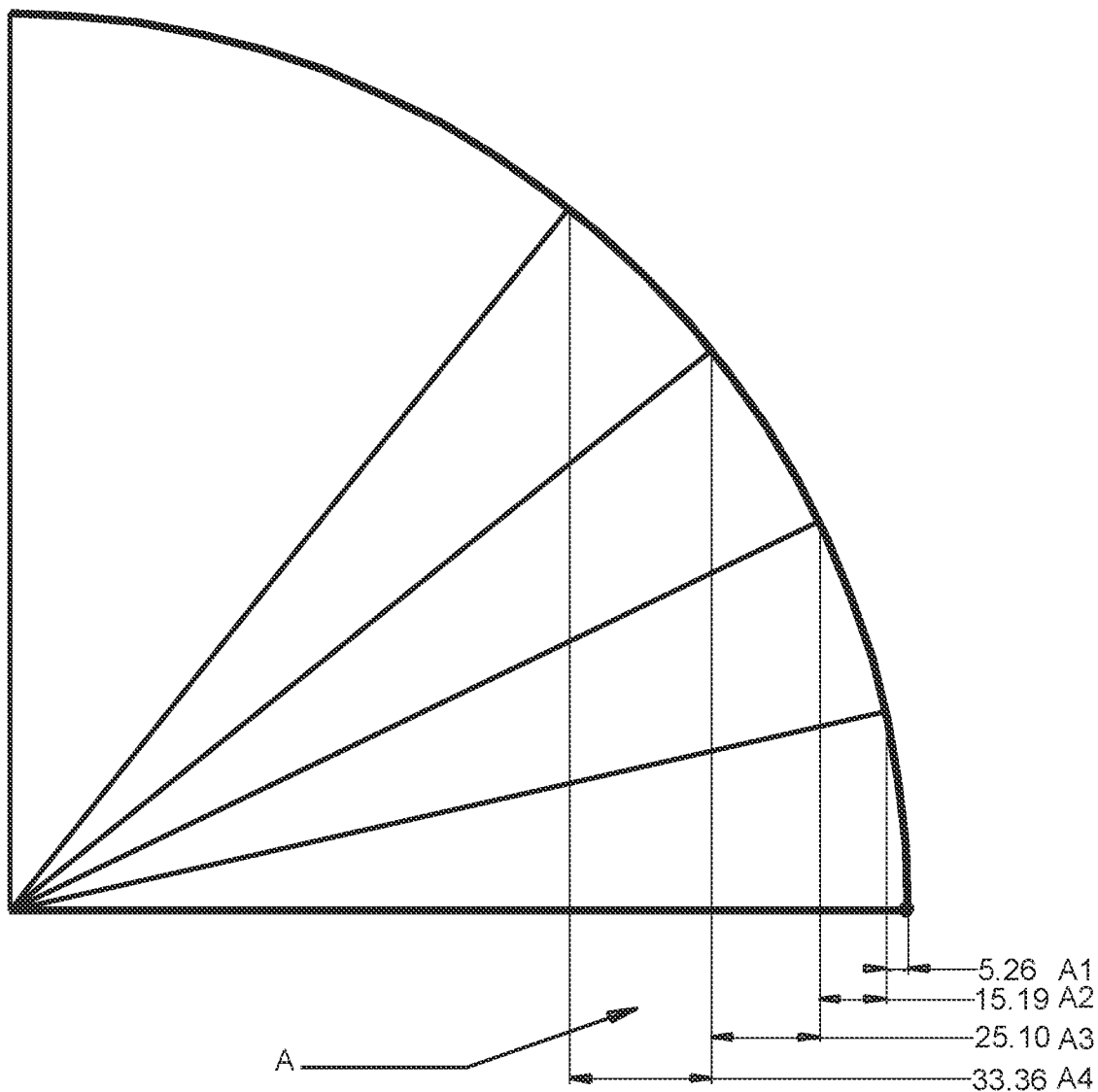
FIG. 37 Illustrates resulting x values against an inputted angle.

In FIG. 37 we are plotting resulting x values, Detail A, against an inputted angle. As can be seen in FIG. 35, FIG. 36 and FIG. 37 no apparent linear value appears. This makes ballistics as we know them an at least three (distance, angle and velocity) variable input to obtain an output.

To further note: this exercise shows that a standard reticle set at equal distant stadia could possibly introduce error into the system as ranges increase or angle is increased. This can easily be demonstrated with the use of a sag formula:

$$Z = SQRRT(radius^2 + offset \ y^2)$$

Figure 38:
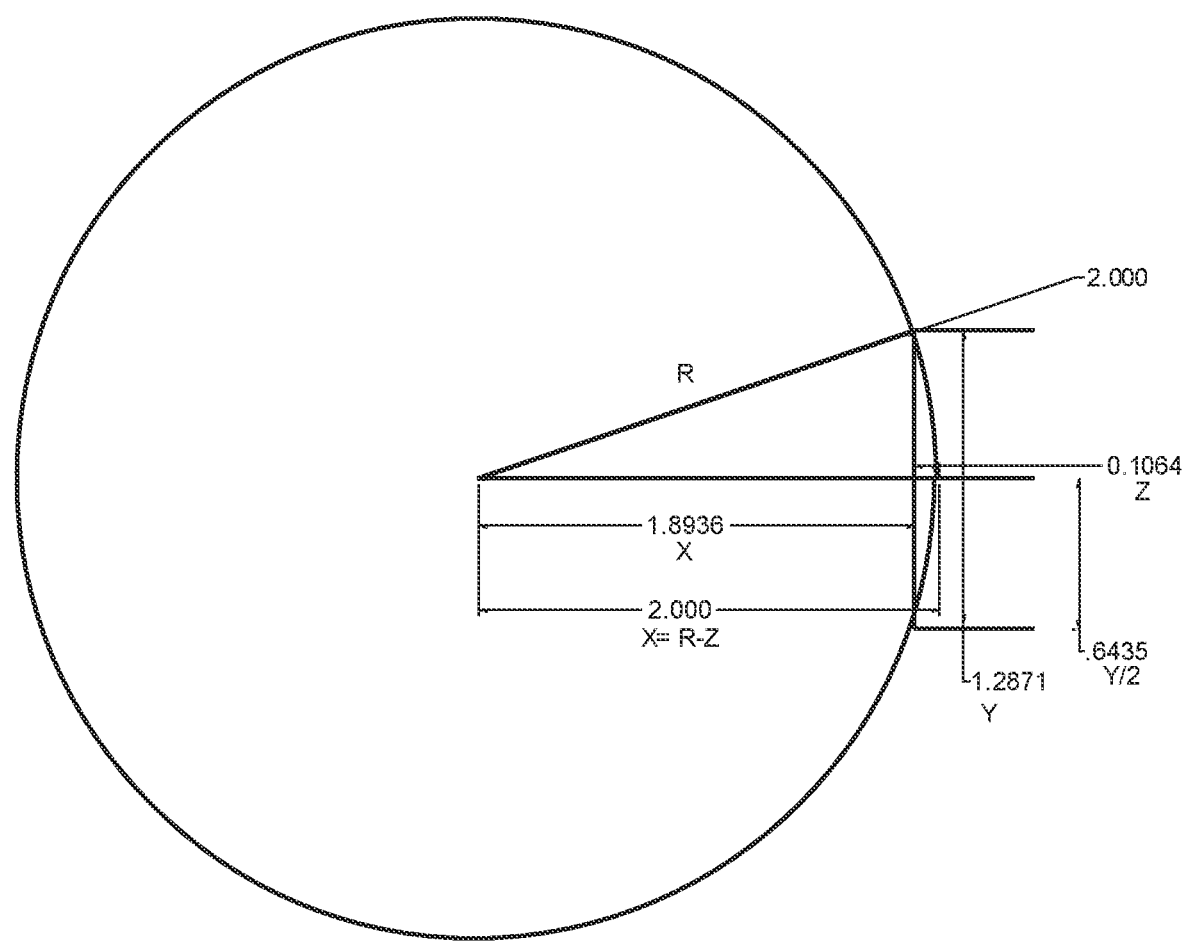
FIG. 38 Illustrates the application and schematics of standard circle formulas to the basic firing solution.

FIG. 38 demonstrates the application and schematics of standard circle formulas to the basic firing solution.

Figure 39:
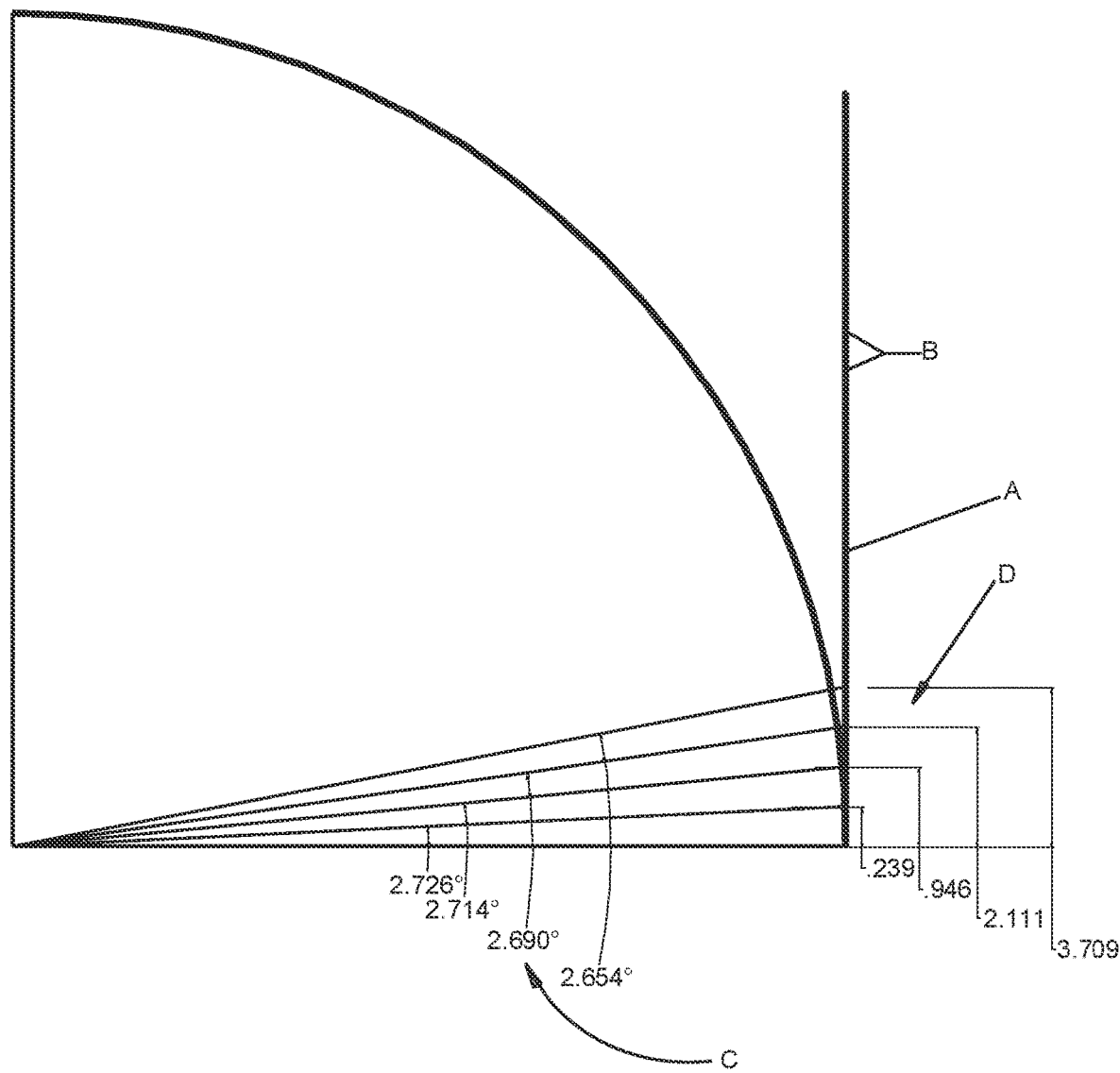
FIG. 39 Illustrates potential errors current systems.

In FIG. 39 we show the potential errors current systems. Detail A shows the vertical line formed by a target. Detail B indicates equa distant points. In this case values of 10 are plotted vertically. Detail C shows the actual changing angle which demonstrates the actual angle is not linear. Detail D shows the change in x values as the equa distant points are added. In this case an error in distance is introduced. These errors potentially increase dramatically with distance and angle. Looking at Detail C specifically and viewing a flat plane at distance, vertical differences approach zero as the horizon moves out from a starting position. This is the reason long and shorts are called for artillery or naval gunnery. You do not view how low you are vertically, and compensate the amount of offset measured in the reticle to establish a firing solution. A viewed vertical error as measured on a reticle might be seen as 1 moa. However, the impact is short by 100 yds for example. The solution might require 12 moa of increased value added to the solution to create a hit. Time of flight and gravity reticles and calculations allow for short, mid and long range solutions.

In FIG. 40 displayed earlier we further describe the issue inherent with a standard moa or mil dot reticle. Using equa distant points at some point in the trajectory the added vertical requirement to engage a distant target has a resulting continuing reduction in added range.

At some point engagements become long and shorts versus highs and lows. A gravity reticle does not have this weakness.

FIG. 41 shows a table of Gravity in seconds and resulting drops of an object in ft, moa, milradians, and deg. In this case gravity is the constant and heights and angles become the variable.

Figure 42:
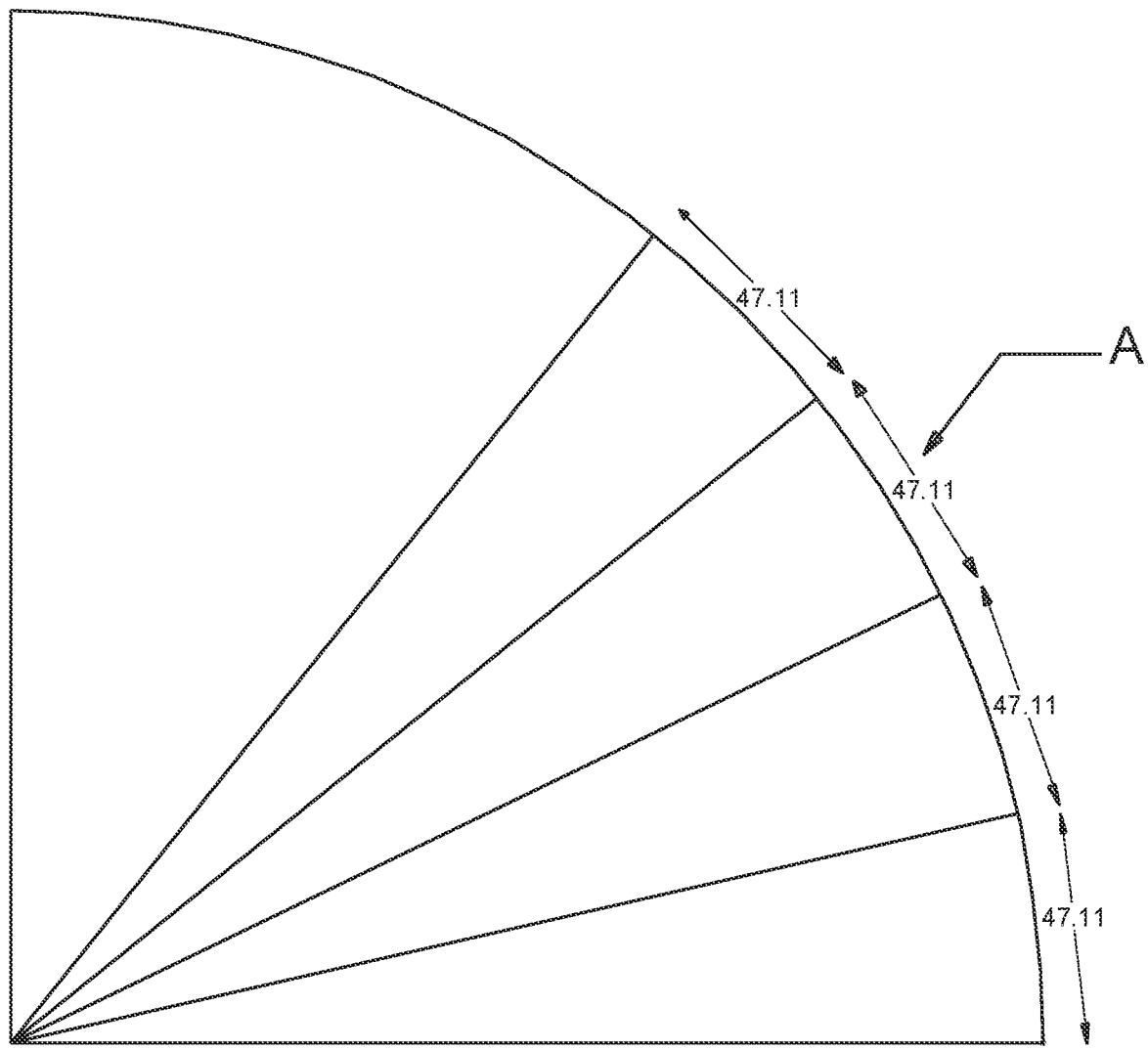
FIG. 42 Illustrates gravity inputted in 0.2 sec intervals.

In FIG. 42 gravity has been inputted in 0.2 sec intervals. As can be seen the solution now has a linear aspect not available to current calculations and reticles. The constant became the cord lengths. Applying a constant in the form of gravitational acceleration will allow any bullet to track an exact known resulting path. Once one value is plotted as a resulting drop, all other values are known. As compared to a standard input of angle, FIG. 35, which also results in a cord constant on the circle, it is not used in ballistic calculations and the vertical component used in current calculations yields a changing value or changing variable.

10.3, 16.2, and 24.7-MOA equal 2, 9, 21, 37, and 58 inches of bullet drop at Δx ranges of 100, 200, 300, 400, and 500 yds, respectively.

Thus, reference marks correspond to an increasing angle Θ as the rate the bullet drops in Δy increases are in respect to Δx.

BDC reticles are caliber, cartridge, grain weight, barrel length, and zero specific due to the fact its reference marks directly correlate to that projectile's velocity, acceleration, force, and energy at each Δx. Therefore, any change in the projectile's mass or drag coefficient may affect its acceleration, velocity, force, and energy as described by projectile motion and the Law of Conservation of Mechanical Energy equations, and thus require new angel Θ reference marks that will equate to new Δy values.

FIG. 8

Slow Velocity

Figure 9:
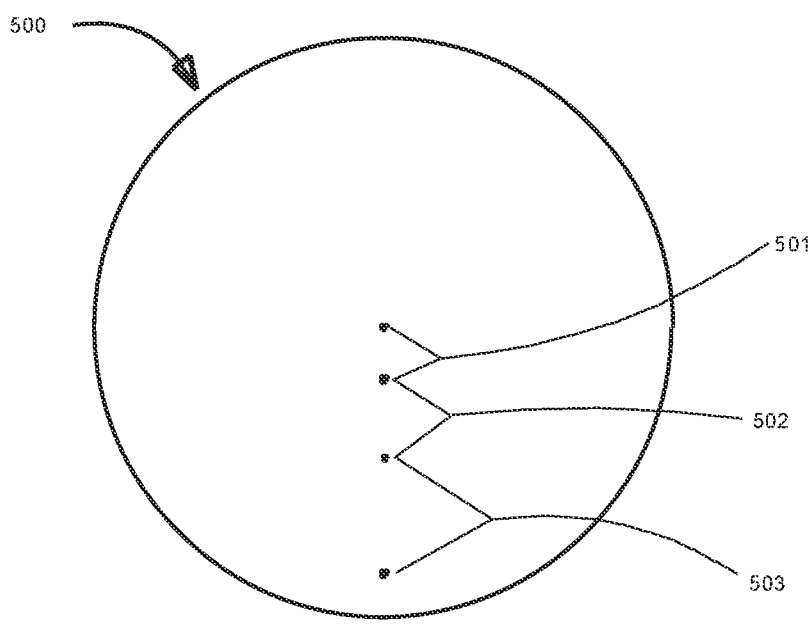
FIG. 9 Illustrates a representative reticle.

Detail shown in shown in FIG. 8 and FIG. 9 notes the detail of points, represented by 401,402,403, and 404. FIG. 9 has the same representative points but also includes spacings detail 501,502, and 503. In all BDC reticles, changing the velocity and placing an arbitrary distance into place will change the positions and spacings of 501-503, and any such continued solved for combination. There is no constant or ratio. Velocity is arbitrary and distance is arbitrary. The BDC also leaves an unsurmountable issue in place: vertical zones that cannot be engaged without guessing or experience.

High Velocity

Though FIG. 8 and FIG. 9 are named High Velocity and Low Velocity and upon first glance appear to be the same, they are not. The values outputted by a current ballistic program will produce different holds based on velocity and distance. For every change in velocity or distance the dots shown in FIG. 3 will also change true position in the reticle and the relative position of the dots to one another will also change. This is due to the fact two variables are the inputs.

While optics, ballistic calculators, and BDC optics work to assist shooters to precisely engage long-range targets at some Δx, these instruments are often complex and require extensive training, intellect, skill, and experience to operate for ballistics, the science describing the motion of projectiles, is extraordinarily complex with many non-linear variables used to precisely solve for Δx.

The fact projectile motion can be described by vectors where x-component vectors define its horizontal motion and y-component vectors define its vertical motion, independent of each other, the same principle can be applied both mechanically and optically to optics for they may integrate mechanical and/or optical means of reference that applies an average or one or multiple functions of projectile motion with one or multiple constants over interval (I) or solved as an integral in respect to (I) for nonconstants to describe linear Δx or Δy distances.

For example, a Δy distance may be solved applying a function that describes vertical motion as a constant since all objects, such as a bullet, accelerates toward the center of the Earth, regardless of mass and angle Θ, at the same rate in respect to time (t), which may be assumed at 9.81 m/s2, or as a function describing y-component vectors calculated with one or multiple constants over interval (I) or as an integral in respect to (I) for non-constants, such as air resistance. In this embodiment, Δy and angle Θ may be solved as constants with a changing Δx distance in relation to velocity (v).

Figure 43:
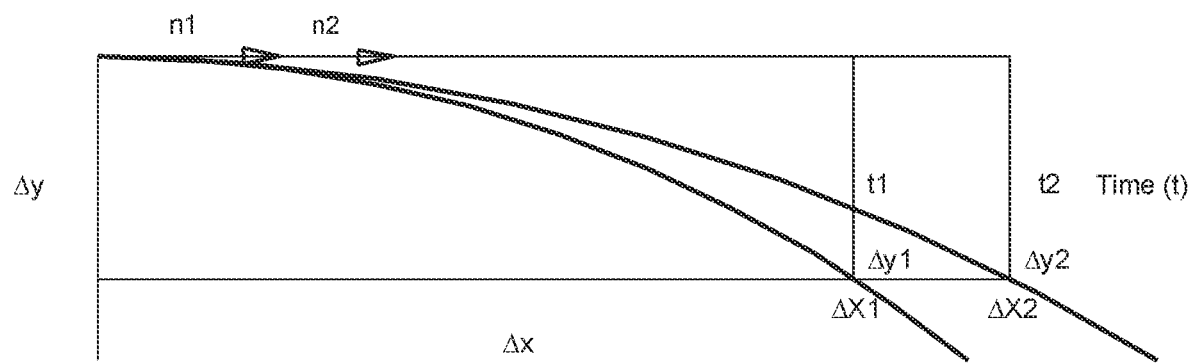
FIG. 43 Illustrates a chart of Gravity in respect to time.
Figure 44:
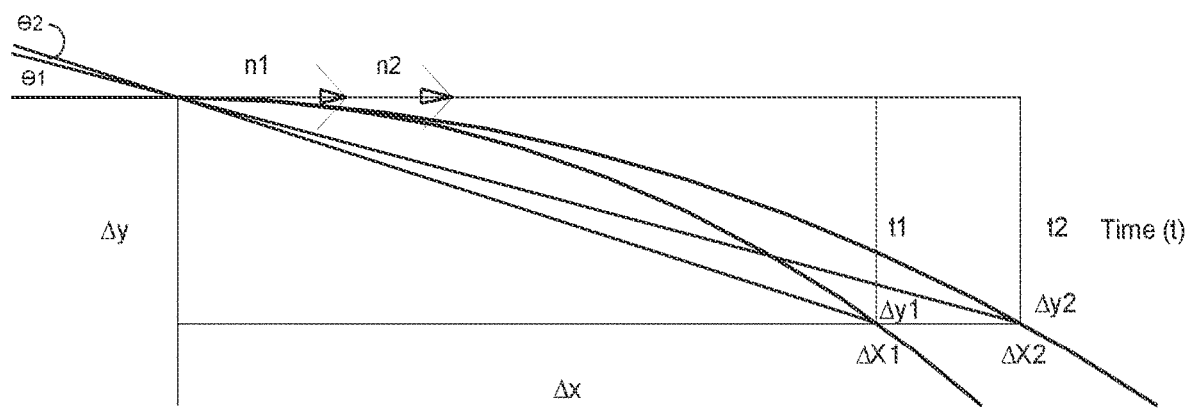
FIG. 44 Illustrates a chart of velocity in respect to time $\Delta Y$.

Gravity Constant in Respect to Time Shown in FIG. 43

FIG. 43 Furthermore, a Δy distance may be solved applying a function that describes horizontal motion with one or multiple constants solved over interval (I) or as an integral in respect to interval (I), such as velocity in respect to Δx (RT=D) to calculate time (t). Time (t) may then be used to solve the projectile's vertical motion with some (g) constant to solve for angle Θ. In this embodiment, velocity (v) and distance Δy and angle Θ may be solved as constants with changing Δx distance.

FIG. 44

Velocity in Respect to Time and Δy

Assuming one or multiple constants over interval (I) or solved as an integral in respect to (I) for non-constants in one plane may be used to solved components in another plane in projectile motion.

Thus, optics may now use angel Θ as a linear constant in relationship to a Δy, and at Δy distance, Δx changes with respect to Δy. Or a Δy function drives the result for Δx.

$$\Delta x = i(v)v = h(t)t = g(a)$$

$$\Delta y = f(a)$$

$$\Delta x = i(h(g(f(a)))) \square \Delta x = i(h(g(\Delta y)))$$

Instead of calculating angle Θ at some Δx constant and where Δy is effectively measured as an angel in minutes of angle or milliradians, due to the fact the distance a bullet drops changes with respect to distance (Δx), which is affected by a non-linear velocity (v), using projectile motion equations enables optics to solve for a Δy constant that corresponds to an angle Θ and Δx. Applying projectile motion equations and x-y vectors to apply an average or functions with one or multiple constants over interval (I) or solved as an integral in respect to (I) for non-constants to solve for some Δy constant in some Δy interval may significantly simply the complexity of ballistics.

For example, evaluating 5.56, 7.62, and 6.5 with a 100 zero with a constant Δy of −40 and −80 inches may result in the following reticle reticle 3. It is obviously different from a standard BDC reticle because in this example the distance between reference marks decreases versus increases from center reticle to bottom.

Figure 10:
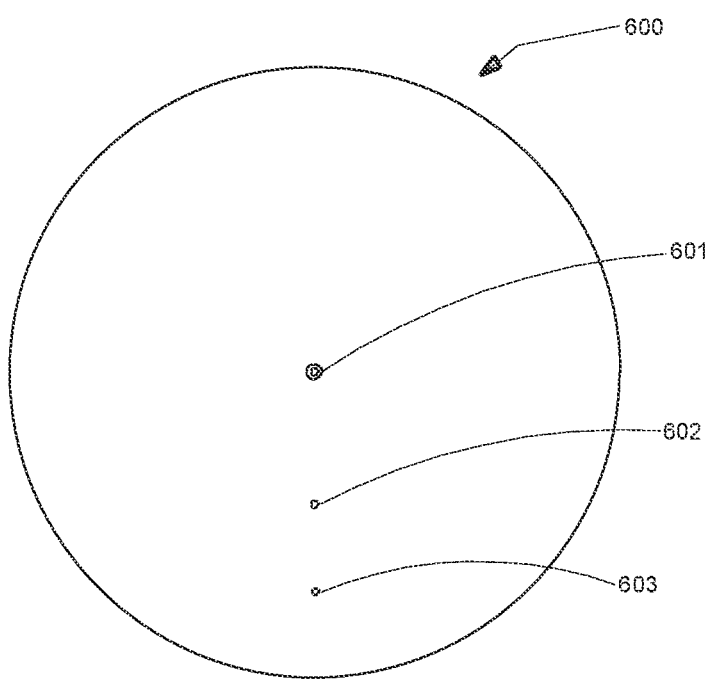
FIG. 10 Illustrates a representative reticle.

While defining different calibers and inputs the image of FIG. 10 the rules described in FIG. 3 are in place. As noted in FIG. 3. Constants are being used and ratios as constants are being used. The next series of FIG. and examples are proofs that the technology represented in this filing are sound and true.

Figure 4:
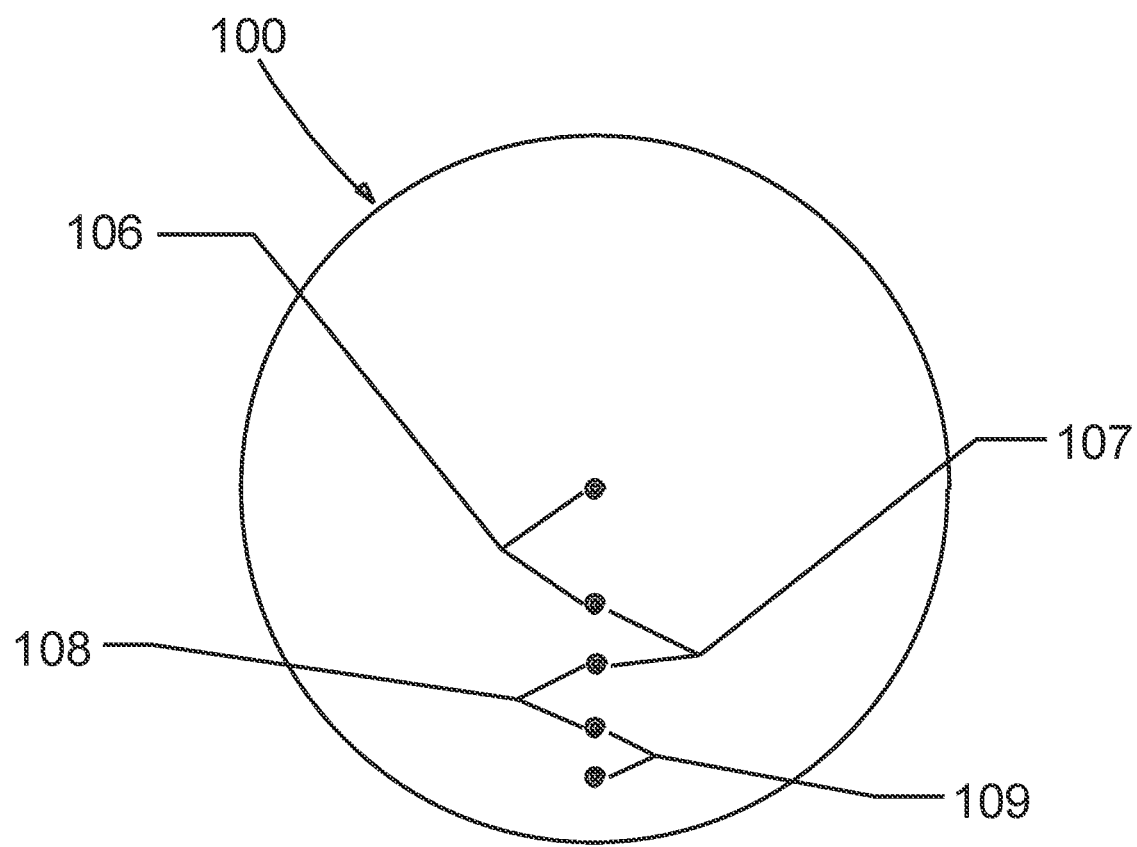
FIG. 4 Continuing Shows specific ratio spacing.
Figure 5:
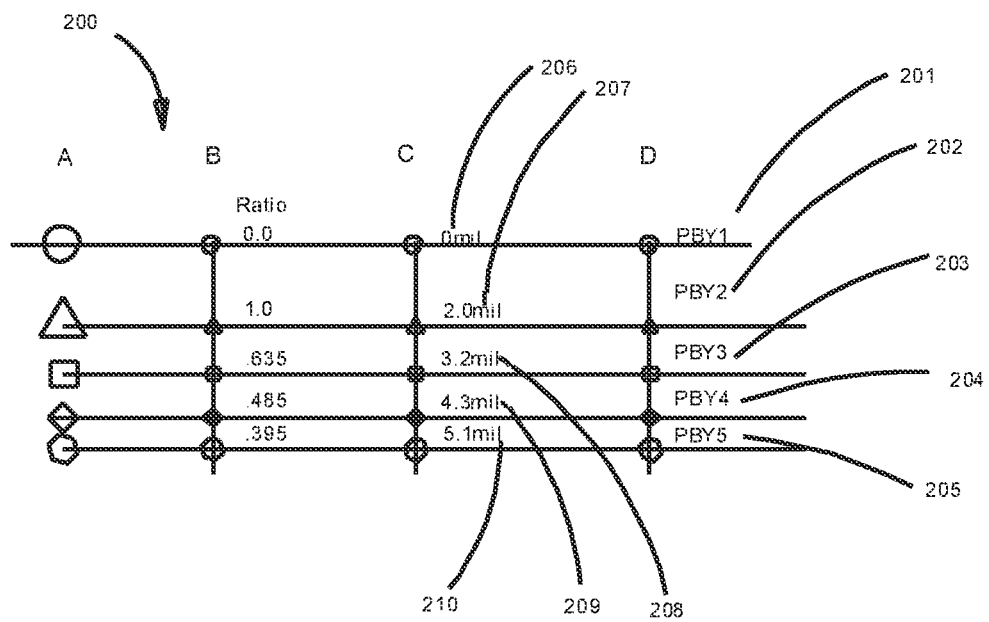
FIG. 5 Illustrates a progression of a build of a reticle and terms.

Details for FIG. 10 include the reticle FOV detail 600 and points 601,602, and 603. While they at first glance appear to be different then what is represented in FIG. 3 they are in fact the exact same dots (any shape applied detail 101-105 and still governed by the spacing applied in FIG. 4 detail 106-109. As noted this ratio will be used at all points regardless of velocity, range, target size, bullet weight, Ballistic coefficient, angle of shot and all current known input formats.

Evaluating 5.56, 7.62, and 6.5 with a 200 zero with a constant Δy of −40 and −80 inches may result in the following reticle reticle 4. It is obviously different from a standard BDC reticle because in this example the distance between reference marks decreases versus increases from center reticle to bottom.

Evaluating 5.56, 7.62, and 6.5 with a 300 zero with a constant Δy of −40 and −80 inches may result in the following reticle reticle 6 It is obviously different from a standard BDC reticle because in this example the distance between reference marks decreases versus increases from center reticle to bottom.

Overlaying all three reticles and applying an average of constants may yield FIG. 10:

Reference marks may correlate to any Δy constant in some Δy interval.

For example, evaluating 5.56, 7.62, and 6.5 with a 100 zero with a constant Δy of −20, −40, −60, and −80 inches may result in the following reticle FIG. 3. It is obviously different from a standard BDC reticle because in this example the distance between reference marks decreases versus increases from center reticle to bottom.

For example, evaluating 5.56, 7.62, and 6.5 with a 100 zero with a constant Δy of −10, −20, −30, and −40 inches may result in the following reticle FIG. 3. It is obviously different from a standard BDC reticle because in this example the distance between reference marks decreases versus increases from center reticle to bottom.

Reference, noted in FIG. 3, marks may be represented as dots, stadia, circles, numbers, crosses, or any other two-dimensional figure or shape in any combination or appearance.

Reference marks may represent a Δy, an angle Θ as a function of Δy, a Δx as a function of Δy, or any other projectile equation variable as a function of Δy.

Reference marks may be mechanical or optical in nature, such as turrets, reticles, prims, wedges, lenses, and mirrors.

Similar to writing the equation y=x/2, the same equation may be written as 2y=x. Therefore, one can appreciate formulas may be rewritten to use an alternate primary function, yet still operate to the same effect. Recognizing this mathematical relationship, the distance associated between stadia in a Master Reticle™ (MR) could be reversed/inverted to build a standardly recognized BDC, yet still function as a MR. For example, using a MR to stack 10-inch kill zones and shooting 5.56 55 gr G1 BC.243 with velocity v' in velocity range v, results in the following FIG. 45.

As you can see, inverting the distance between each stadia in a MR may result in a more recognizable configuration for a BDC where stadia increase with range; however, the Y-Drop is still "precise" to specific y-values, independent of range. Thus, even though it appears like a BDC, it still functions as a MR. Further, inverting a MR yields many relationships. Such non-limiting, examples include:

$$MR\ Y\text{-Drop}\ P1 \times 4/10^* = BDC'Y\text{-Drop Position1} \quad (P1)$$

$$MR\ Y\text{-Drop}P2 \times 1/2^* = BDC'Y\text{-Drop Position2} \quad (P2)$$

$$MR\ Y\text{-Drop}P3 \times 2/3^* = BDC'Y\text{-Drop Position3} \quad (P3)$$

$$MR\ Y\text{-Drop}P4 \times 1 = BDC'Y\text{-Drop Position4} \quad (P4)$$

$$MR\ Y\text{-Drop}\ P4 \times 1 = BDC'\text{Position4} \quad (P4)$$

$$BDC'P4/2^* = BDC'P3$$

$$BDC'P3/2^* = BDC'P2$$

$$BDC'P2/2.5^* = BDC'P1$$

*Approximate for values are derived from the averages, formulas, number of decimal places used, etc. used in calculation(s) to solve ballistics. For the purpose of target engagement, the difference of 0.5 inches at several hundred yards is a fraction of a MOA and well within the margin of error induced by a user, ammo, rifle, etc.

Section 8: The Application of Constants with Real-World Ballistics

Example FIG. 46 looking at an average 5.3 moa shift.
The cartridge used in FIG. 46-FIG. 48:
Caliber: 5.56 mm
Grain Weight: 55 gr NATO Ballistic Coefficient: 0.243
Muzzle velocity 16":3125 fps
Sight Height: 2.75"
Zero: 100 m
Example FIG. 47 looking at an average 8.5 moa shift.
Example FIG. 48 looking at an average 11 moa shift.
The cartridge used in FIG. 49-FIG. 51:
Caliber: 5.56 mm
Grain Weight: 62 gr M855
Ballistic Coefficient: 0.304
Muzzle velocity 12": 2690 fps
Sight Height: 2.75"
Zero: 100 m
Example FIG. 49 looking at an average 5.7 moa shift.
Example FIG. 50 looking at an average 9.2 moa shift.
Example FIG. 51 looking at an average 12 moa shift.
The cartridge used in FIG. 52-FIG. 54:
Caliber: 5.56 mm
Grain Weight: 55 gr NATO
Ballistic Coefficient: 0.243
Muzzle velocity 16":3125 fps
Sight Height: 2.75"
Zero: 200 m
Example FIG. 52 looking at an average 5.0 moa shift.
Example FIG. 53 looking at an average 8.2 moa shift.
Example FIG. 54 looking at an average 5.0 moa shift.
The cartridge used in FIG. 55-FIG. 57:
Caliber: 5.56 mm
Grain Weight: 62 gr M855
Ballistic Coefficient: 0.304
Muzzle velocity 12":2690 fps
Sight Height: 2.75"
Zero: 200 m
Example FIG. 55 looking at an average 5.2 moa shift.
Example FIG. 56 looking at an average 8.5 moa shift.
Example FIG. 57 looking at an average 11.3 moa shift.

In the above examples, rows with 20, 40, and 60-inch bullet drops ($\Delta Y$) are shown with corresponding ranges and MOA values.

This is the precise value a person would need to dial or holdover for a point of aim (POA) and point of impact (POI).

For example, if a shooter wanted to hit the center of a 40-inch target at 334-m with a 55 gr 5.56 out of 16" barrel with a muzzle velocity of 3125 fps and 100 m zero, a person would have to dial or holdover 5.2 MOA. Or the 5.2 MOA corresponds to the 19.9-inches a bullet will drop over 334-meters due to gravity with that specific setup.

Comparing the ballistic table of a 5.56 55 gr at 3125 fps and a 5.56 62 gr at 2690 (vastly different grain weights, ballistic coefficients, and velocities) have remarkably similar bullet drops in terms of $\Delta Y$ and MOA.

This is due to the fact gravity pulls all objects, regardless of mass, toward the center of the earth at—generally—the same constant rate of 9.81 m/s. This may be assumed at any value or function though.

If a person were to release a bowling ball and a marble at the same time and height, both will hit the ground the same time, despite each weighing 12 lbs and 0.01 lbs, respectively. Depending on the accuracy of the observer, one may observe a miniscule difference in time due to air resistance; however, the difference is essentially zero.

Thus, despite shooting a 55 gr bullet and a 62 gr bullet with different weights (mass) and ballistic coefficients, the drop is remarkably similar.

In the above examples, rows highlighted in green correspond to a specially selected MOA that corresponds to an accuracy tolerance. Where yellow is a precise POA and POI, green represents an accuracy that corresponds to a linear bullet drop that spans a $\Delta Y$ distance.

Therefore, using 5.4 MOA as our average in the above examples for a 20-inch bullet drop, means even if the bullet drop ranges between 18-22-inches for different cartridges and zeroes, a shooter can effectively aim at the center of a 40×40-inch target and know they will be close out to $\Delta X$ distance.

For example, a person shooting a 5.56 55 gr at 3125 fps with a 100-meter zero can effectively guarantee hits between 0-340 meters or ~360 yds aiming at target center on a 40×40-inch target.

Using 8.7 MOA as our average for a 40-inch bullet drop, means even if bullet drop ranges between 36-44-inches for our first reference mark, a shooter can simply aim at the center of a 40×40-inch target and know they will be close out to $\Delta X$ distance. For example, a person shooting a 5.56 62 gr at 2690 fps with a 100-meter zero can effectively guarantee a hit from 300 meters to ~430 m or ~470 yds aiming at target center on a 40×40-inch target using 8.7 MOA, because the bullet will not rise or fall more than 20-inches.

Section 9: Real-World Field Application

Figure 58:
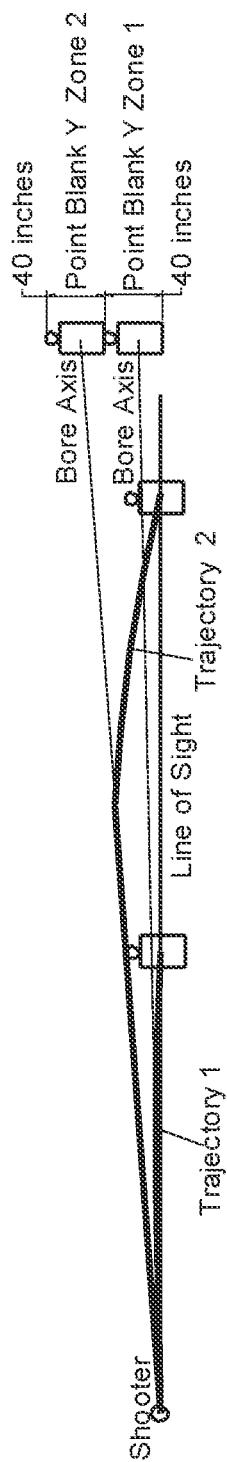
FIG. 58 Illustrates measuring vertical heights.

A Single Optic will shift the Object image to the next Point Blank Zone and allow a shooter hits from 0-600 yds while holding directly on the target.
FIG. 58

In this scenario FIG. 58 we are measuring vertical heights. As noted, a much easier measurement, by a much broader range of people, without the use of high technology equipment.

In this case I need an approximate noted size and/or approximate range for the noted size. In this case, I would simply move from one aim point to the next and be assured of a hit as the vertical target will be within any point from PBY1 to PBY2.

FIG. 59

Figure 59:
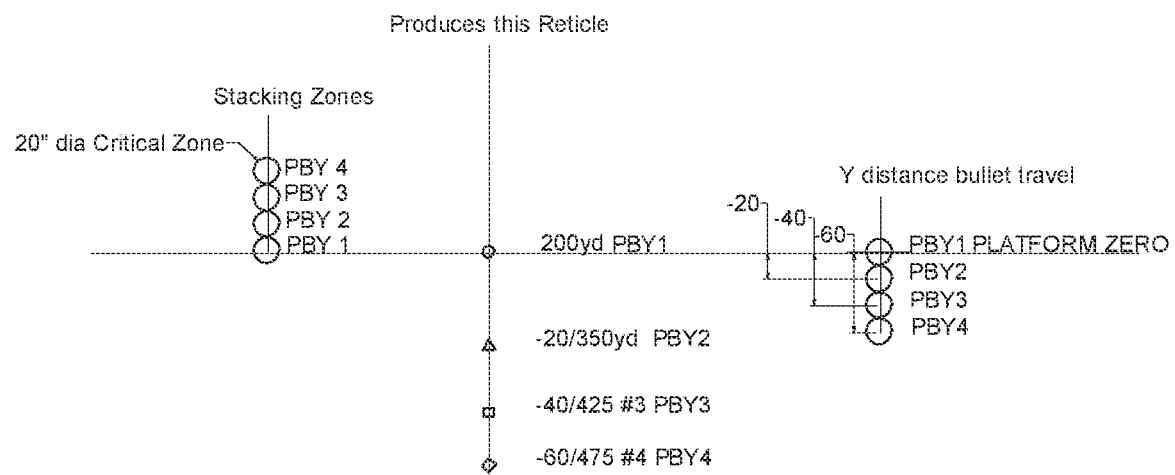
FIG. 59 Illustrates appropriate points as a range estimation increases.

Impacts on target size 20 inches FIG. 59 will be made on any of the appropriate points as the range estimation increases.

If I am short on PBY2 by a short amount, engage with PBY3 for an instant hit.

Of course, the reticle can be built with indicators. As in the base design the indicators are vertically driven versus range driven.

In the case of man size targets, a four PBY values will be very effective with essentially no limitations. This will produce four specific dots/aim points.

These four points are described in the supplied equations. These same points may further reduced to simple ratios/percentages. These simple ratios that then produce the reticle have been proven to be correct and applied to every example we have identified with no exceptions. Applicable to targets as small as a golf ball to targets as large as a semi-truck or building, all target sizes will fall within the same calculation and resulting ratios described within the systems and/or methods of the present disclosure.

However, it is important to note, these solutions are simply exemplary as other reticles with one or more subsequent reference marks and ratios may be realized.

Section 10: Statistical Proofs

The following are the statistical results comparing final outputs with different category inputs such as velocity versus target height. Without this study of reliability, any further discussion is without point. As a new concept is a first priority to prove reliability, accuracy and precision.

All categories studied were compared across a wide range of inputs.

We then compared each of the categories to each other regardless of normally apparent disparate relationships such as velocity vs target size-sight in distance. Normally the outputs will create a changing horizontal distance. In this case the outputs are placed against an easily measured field value being a vertical component.

It should be pointed out that the horizontal components will fall into the same ratio, but they are not nearly as usable at a low skilled untrained user level.

In summary of all of the work performed: the error of target size, velocity, BC, sight in range, and line of sight all indicate a combined 3SD of less than 10% for any given category of input.

In statistics, the standard deviation is a measure of the amount of variation or dispersion of a set of values. A low standard deviation indicates that the values tend to be close to the mean (also called the expected value) of the set, while a high standard deviation indicates that the values are spread out over a wider range.

Using 3SD (three standards of deviation) fully represents the total potential data.

In this case a wide range of inputs were used, wider than is currently used by any known group or user, when transitioning from one ammunition round to another for we are not aware of any other device that can switch multiple variables and provide new solutions—with nothing more than a scaling factor.

The following specific inputs were applied. Each input also shows the constants applied to isolate the individual input such as Target Size.

1) Vertical target size-5-100 inches. Same velocity and same BC, and same bullet weights for all targets were used.
2) Velocity-1150 fps to 4800 fps. Same BC, Same target Size, same bullet weight.
3) BC. Same target size, same velocity, same bullet weight.
4) Bullet weight. Same target size, same velocity, same BC, sight in range.
5) Sight in Range. Same target size, same velocity, same BC.
6) Density Altitude
7) Kinetic energy-remaining energy on target.
8) Line of Sight Comparing each category to itself yielded a maximum 3% error potential over the full range, which is very small.

Comparing each category to its corresponding PBY for other categories yielded a maximum error or 3%, which is also very small.

These resulting values can be calculated as a ratio. The ratio can then build a reticle. Since the ratios are a constant, the only change to the reticle required is scaling. Scaling can be accomplished thru magnification, modules, direct optics and other methods not limited to the described methods.

FIG. SD1 provides example summaries of standard deviation calculations.

In FIG. 60 we are comparing two extremes of target size, a 30 inch tall target and a 100 inch tall target. The SD is very low at 1.5% error and 2.7% error on the two targets. When targets between 2.5 inches tall to 100 inches tall all fell within the same potential range of one SD, it should be noted that the error could lay in the input side as each value was not calculated to an exact tenth of precision. Many inputs were within 0.5" of a true value on input side.

In FIG. Ch17 an extreme range in velocity is examined: 1150 fps to 4800 fps (fps=feet per second).

Again, the range of potential data is under 1.5% for all points.

FIG. 62 provides summaries of ratios found for each PBY.

While variation FIG. 62 to the exact numbers can be found the general trend is very tight. The projected values applying 3SD to the results produces a maximum of a 10% error with all variables calculated to their extreme input values with the maximum potential error accounted for and calculated in an additive form. Error PBY1+Error PBY2+Error PBY3 creating the potential maximum error.

FIG. 63 provides summaries of statistical ranges per category.

A summary of the ranges FIG. 63 found, yields the same tight projection. No outlier has been found to disrupt this data and resulting statistics. Plotting the ranges of each output sets the SD to its maximum potential value. Again, using the ranges of the data the resulting SD calculations provide extremely high confidence level in the comparison of the inputs and their relationships.

Summary of the SD FIG. SD5 values further indicate no outliers exist. Calculating the Standard deviation using normal statistical methods show that the systems and/or methods of the present disclosure and its corresponding resulting ratios provide an error value exists within less than the typical error of the shooter. In short, an error on a vertical target of 2% equates to 0.400" potential error on a 20" critical zone.

Section 11: Exemplary Ratio Derived from Statistical Proofs

Effective fire solutions on an enemy combatant can be applied, without the use of a full ballistic computer calculation, for every range value required.

An exemplary Ratio exists with the following resulting points:

$PBY1 = 1.0000\,mil =$ Rifle zero $PBY2 = 0.635 - 4.1\,mil$ $PBY3 = 485 - 5.3\,mil$ $PBY4 = 0.395 - 6.5\,mil$ A reticle, prism, lens assembly, mirror assembly or any combination of the noted items (to include electronically generated images) can be produced in which simply scaling it will cover five or more stacked vertical zones regardless of the inputs. The same ratio reticle can service all known fired rounds.

Producing a reticle representative of the highest velocity and highest BC will allow all other variations of the velocity and BC to be produced by a simple factor applied to the starting reticle.

Bullet weight is irrelevant as velocity and BC describe the arc of the round. In many of our test examples, bullet weight had to be varied. Weight had no impact concerning variation as compared to the base ratio. Weight and velocity are a time function when related to gravity.

Size of target is irrelevant as the resulting arcs become a constant against the vertical height of the target.

The factor can be applied by scale or angle. Scaling the original reticle will allow all solutions to be produced. Rotating the reticle around its axis will also realize solutions for all known rounds to be described.

The systems and/or methods of the present disclosure embody or realize ratio constants of 1.0, 0.635, 0.485 and 0.395, but others could be realized. These values are exemplary for demonstrative purposes and should not be construed as limiting.

Where PBY1 is 1.0, PBY2 is 0.635 of the 1.0 plus the 1.0 mil or moa value, PBY3 is 0.485 of the 1.0 plus PBY2, and so on.

These ratios, as applied to a reticle, will describe all targets stacked four times.

Further ratios can be applied to the limits of magnification: the discrimination of the target as distance increases and magnification becomes insufficient to create sufficient offset discrimination as compared to the vertical height of the target. In short 15th, 6th and continuing could be used to produce further ratio values.

The following primary components will make up the proposed reticle:

1) Target size
2) Velocity
3) BC
4) Angle of Line of sight.
5) Zero Range
6) Density Altitude
7) Remaining Energy remaining on Target They have been placed in their relative order of impact on the reticle. For instance, a slow velocity will create the large spread of the noted points on the reticle. A large target will create a large spread of the noted points on the reticle. Inversely, a high velocity will make a smaller spread of reticle points.

Section 12: Exemplary Reticles Derived from Ratios and Statistical Proofs

If we produce a maximum reticle noted below FIG. 2:
1) Minimum velocity: 2000
2) Maximum 4800 fps in the example.
3) Target height equals twenty inches.
4) Bullet is constant.

The noted inputs create the physical separations between primary points described by the ratio 1.0, 0.635, 0.485 and 0.395. In other words, the physical size as would be measured on a printed reticle between each point is represented. FIG. 2

A) Five points are shown with individual shapes. The shapes have nothing to do with the formula, inputs or any part of the output of the reticle. They are only for example only.
B) The formula ratio is applied to each of the five points.
C) The equivalent drop value is shown in order to build a reticle with location points to allow it to function in the applied to scope to a correct scale.
D) The point blank vertical stacked values are noted: PBY1, PBY2, PBY3, PBY4, PBY5.
E) It should be noted that Ratio B will not change regardless of the change in input. A change in velocity, BC, Target size or Line of Sight incline will not alter these values.
F) If a larger physical value would be required—Example 1150 fps—The physical locations of the shapes and lines on the etched reticle would be changed but the resulting ratio would stay the same:
G) Column D and column H show the PBY1+PBY2+PBY3+PBY4+PBY5 and describes the five positions on the reticle.
H) PBY1 always represents the zero range or sight in range of the platform.

Figure 6:
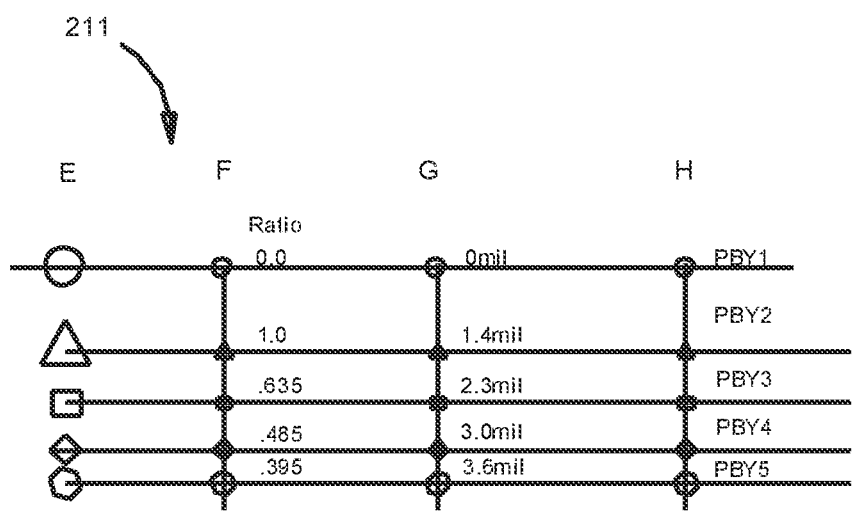
FIG. 6 Illustrates a reticle progression for build and scaling.
Figure 20:
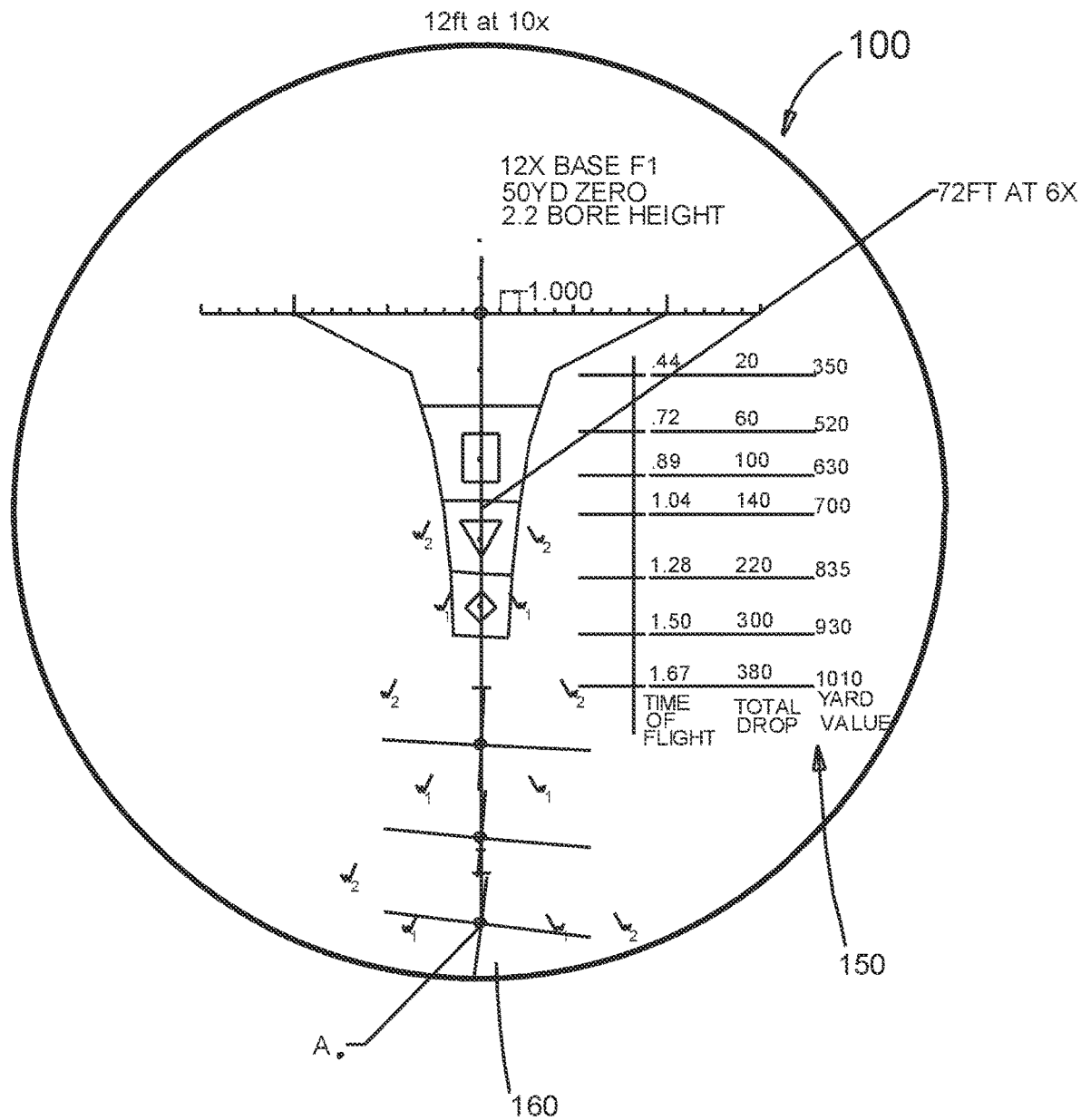
FIG. 20 Illustrates Aerodynamic jump.

FIG. 6
  20"TT×3000 fps

The above reticle (FIG. 6) is to the exact same scale as (FIG. 2). The constant for the scale is the ratio-noted in (FIG. 2) as column B and noted in (FIG. 6) as column F. However, the velocity was changed from 2000 fps to 3000 fps. The ratio's do not change from one velocity to the other. The relative placements of the PBY's to each other do not change.

Figure 23:
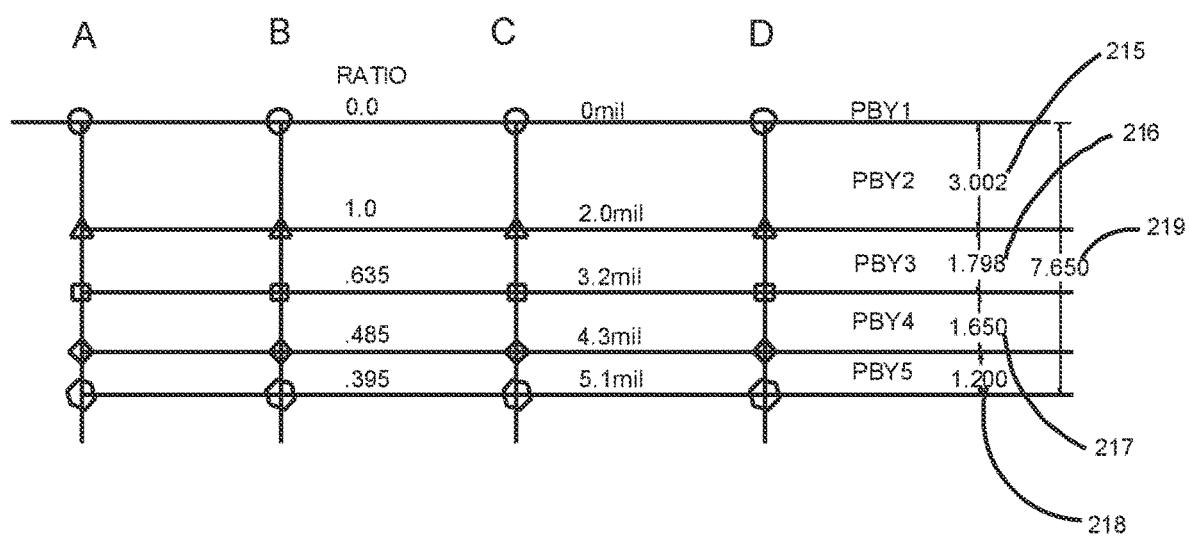
FIG. 23 Illustrates a reticle progression for build and scaling.
Figure 24:
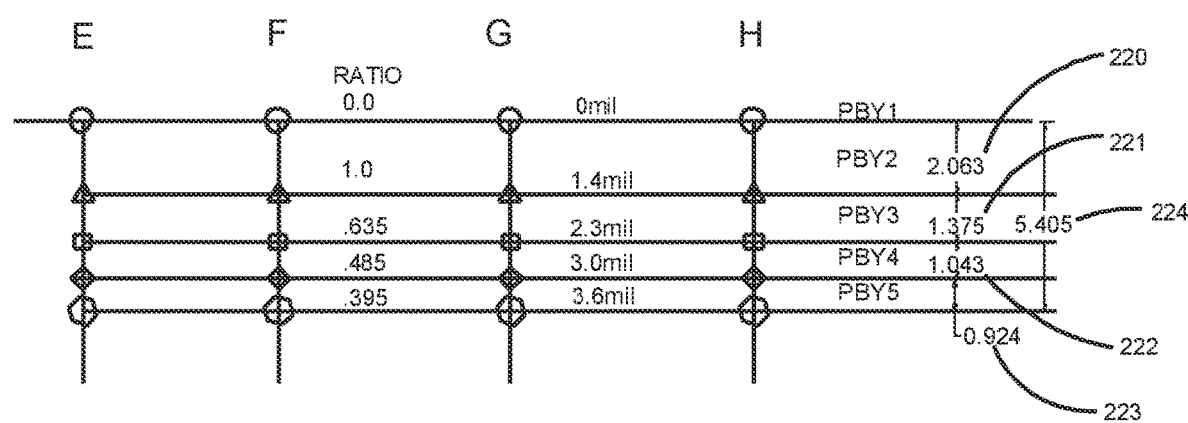
FIG. 24 Illustrates a reticle progression for build and scaling.
Figure 64:
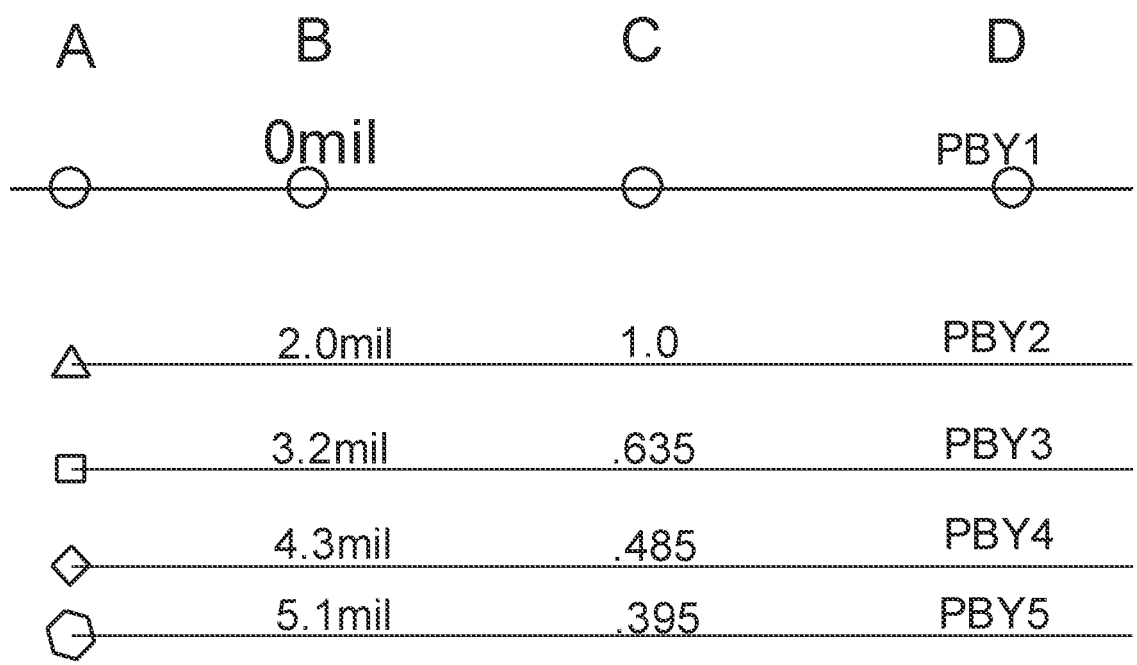
FIG. 64 Illustrates scaling to the equivalent mil radian values.
Figure 65:
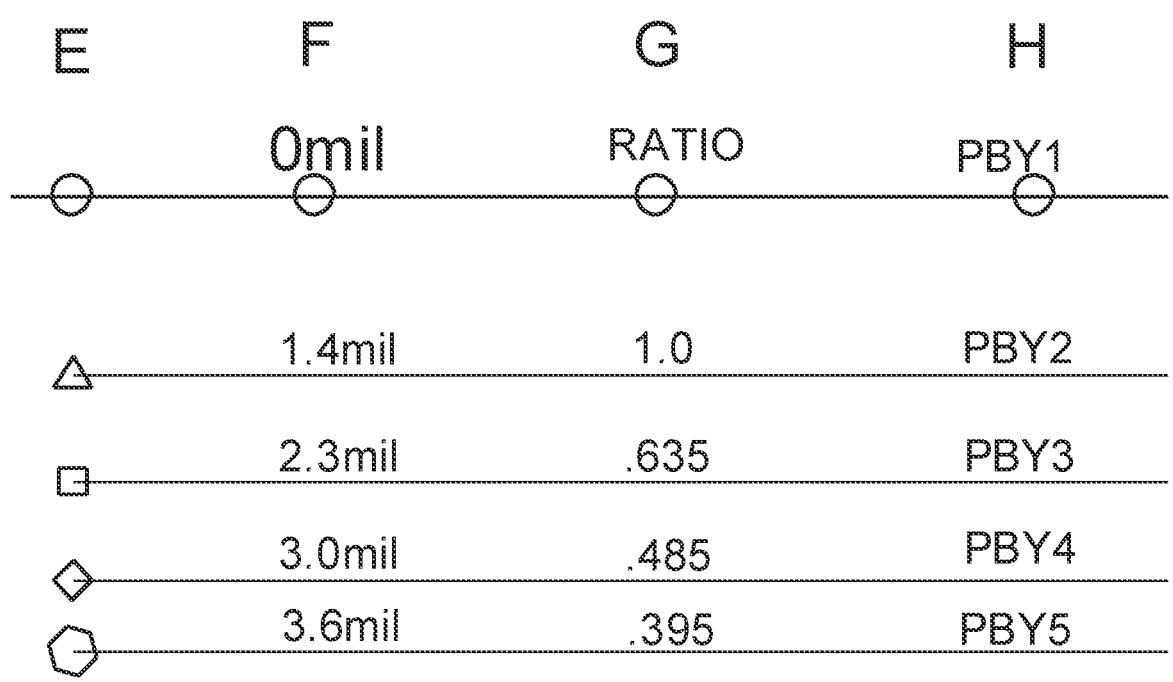
FIG. 65 Illustrates scaling to the equivalent mil radian values.

Scaling the Drawings to the equivalent mil radian value FIG. 64 and FIG. 23 column C and column G:
FIG. 64
  20"TT×2000 fps
FIG. 23
  20"TT×3000 fps In this case the facility producing the reticle would physically dimension the features required for the scope to function as required. The design and manufacturing action is taken on every scope existing that currently has any stadia or dots for used for measurement.

FIG. 24

In this example the reticle itself is given dimensions, Details 215,216,217,218, and 219, that can be tested to confirm the ratios given in FIG. 2. They are noted to the right of column D and column H. Mil radian values (for reference) have been changed along with the responding physical dimensions between each of the PBY values. It should be noted that the ratio values noted and corresponding equation do not care what the scale type is (Details 220,221,222,223, and 224). However, again it must be noted the original ratios are the same and the spacing between the PBY points are changed. Keeping these values and/or ratios will allow all rounds to be placed on a 20-inch-tall target regardless of changing velocities, BC, bullet weight and Line of Sight Angle. Correspondingly changing the size of the target retains the same ratios.

While elements 214 and 215 used a twenty inch tall target, changing the physical size of the reticle by scaling directly or tilting on an angle around axis x will yield the reticle points to engage a 5 inch tall target. Or a 15 inch, 25 inch, 40 inch, 100 inch or including very large numbers. The ratio has an extremely wide range of use.

Figure 11:
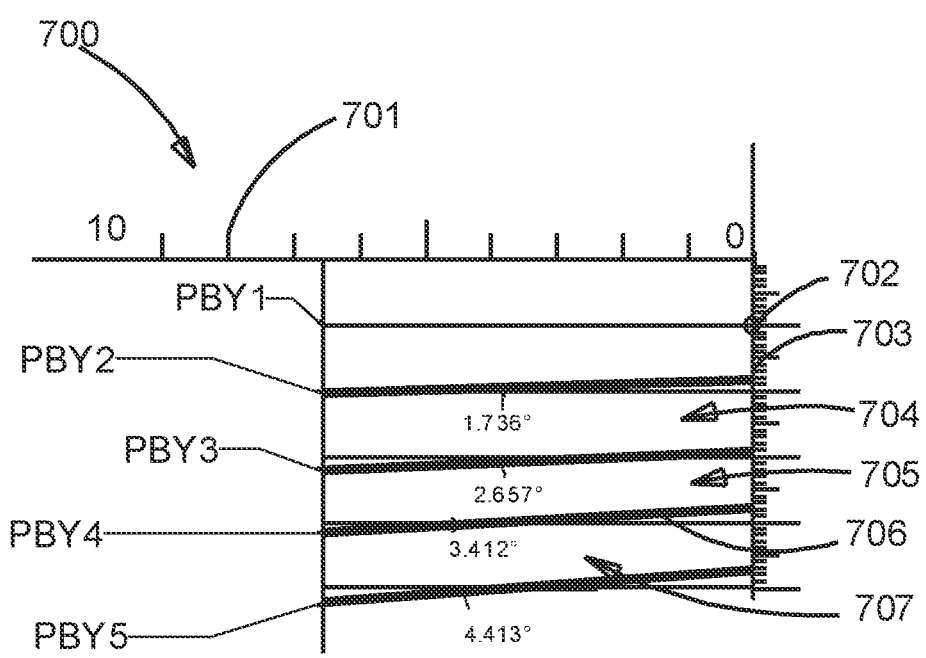
FIG. 11 Illustrates initial application to a scale and further constant ratio information.

Following FIG. 11 we build the proof of the scaling. This scale will be used to plot the variables:
1) Target Size
2) Velocity
3) Ballistic Coefficient-BC
4) Line of Sight
5) Zero Range-Shown in Detail 702

FIG. 11

Element 700 encompasses the first detail as being applied to a scope reticle, Detail 703, and it also incorporates angular dimension Detail 704 to 707. It will be seen that the angles are also a ratio constant. This ratio constant produced by the angles is constant no matter what the velocity, target size, bullet weight, Ballistic coefficient, angle of fire and other known applicable inputs that can be determined by a person of skill in the arts.
1) The scale has both a Horizontal scale and a vertical scale Detail 703.
2) Both scales are delineated by 0.1 values.
3) The vertical scale will be used to show the corresponding mil/moa value derived from a ballistic calculation.
4) The horizontal scale, Detail 701, will be used as part of a final calculation after points are plotted to describe the resulting mil/moa value.
5) The angle shown, Detail 704, 705, 706, and 707, are a result of the plotting of the points. Finding the extremes of a calculation will create two end points. They are connected by a line. The line has an angle.
6) Four lines with dimensioned angles are shown. PBY1, PBY2, PBY3, PBY4, and PBY5.
7) Each PBY value and angle will have its corresponding plotted result.
8) To NOTE: the resulting angles shown are a result of the scales used.
9) If you plot PBY2 for all of the variables noted they will fall on a line. The line will produce a slope as they are graphed against the vertical scale and the resulting line that represents the extremes of the inputs.

FIG. 66 shows the plotting of the single variable Target Size. Target sizes of 5, 10, 20, and 40 are shown.

Section 13: Proving Exemplary Reticle Derived from Ratios and Statistical Proofs FIG. 67 is a representative output from JBM Ballistics. It is representative of all calculations made within this paper. In this case a standard 0.308 round is used as a basis for the following calculations.

It needs to be indicated that for all the graphs only one variable was changed per PBY tests. In this case JBM Ballistics was used to calculate each point. FIG. 67 shows a typical input to derive the individual PBY points.

FIG. 68 shows the output derived from calculations in FIG. 67.

As can be seen the second column indicates a vertical height of the projectile at a given range (first column) and its corresponding mil radian value. The bold values denote the corresponding 5 inch target. Stacking 5 inch targets produces a 5,10,15 20 and continuing, where capability is available, essentially leaving no unsolved target zones. NOTE: the vertical drop can be displayed in any format concerning angle.

In this case:
PBY1=0: the sight in value range for the platform.
PBY2=−0.6
PBY3=−0.9
PBY4=−1.2
PBY5=−1.5

These calculations were repeated for the inputs of different target height. Values of 5 to 100 were calculated and plotted. Each PBY2 of each target height was plotted on a single line, PBY3, PBY4 and PBY5 were also all plotted on their individual line.

It must be re-NOTED that the overall line was determined by two extreme values of each category of input: Target Size, Velocity, BC, Line of Sight Angle, and zero range. For example a velocity plot for 1150 fps to 4800 fps was calculated.

Figure 69:
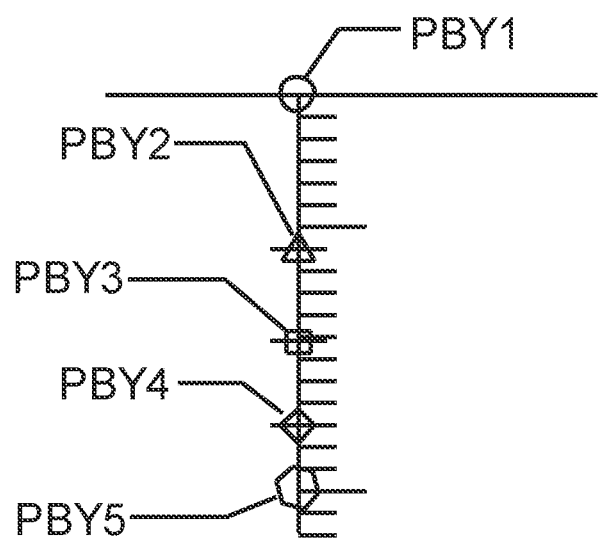
FIG. 69 Illustrates a representative reticle.

Example FIG. 69 (Details in this FIG. are covered in FIG. 3, FIG. 4 and FIG. 11): Velocity FIG. 69. If we plot 3000 fps for all 5 PBY values and their result is placed on a single line vertical scale.

Figure 70:
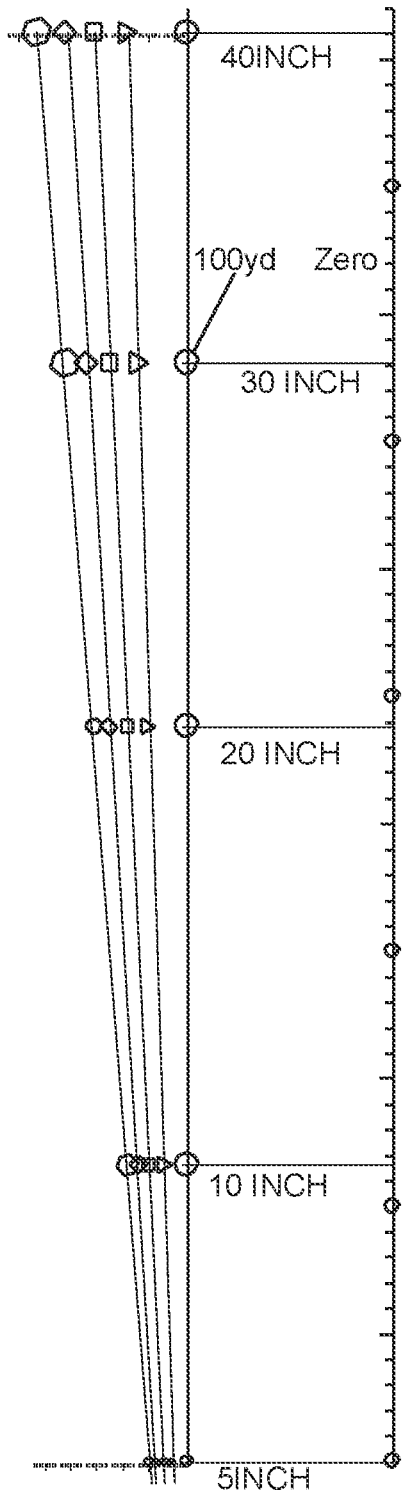
FIG. 70 Illustrates a plot of derived PBY values for multiple target sizes at different ranges.

We would then move it over to its best fit position on the lines described in FIG. 70. The positions of PBY2 thru PBY5 are referenced to the zero line PBY1. PBY1 is the zero range of the platform. The zero range of the platform is the point at which the projectile crosses of line of sight, the first time, of the optic or sighting device. PBY1 is a line with zero angle. Plotting all derived PBY values to this line creates reference zero for the system.

The following FIG. 70 shows the results of multiple target sizes at two different ranges.

FIG. 70

In FIG. 70 it can be seen that the varying target sizes all fall on the same slopes as represented by PBY1, PBY2, PBY3, PBY4, and PBY5.

Figure 71:
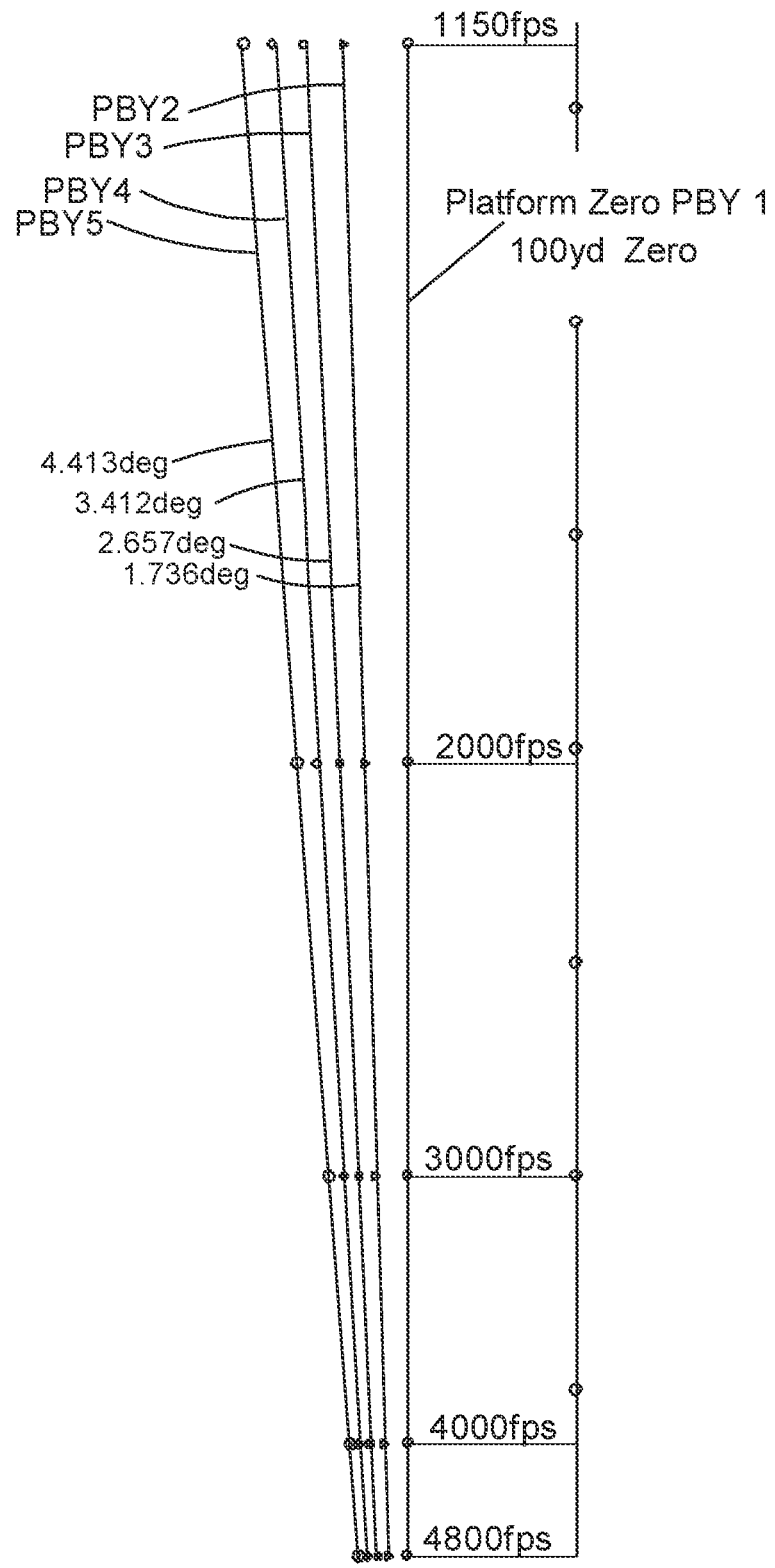
FIG. 71 Illustrates a plot of derived PBY values for multiple target sizes at different ranges.

In FIG. 71 the velocity was changed from 1150 to 4800 fps. To note at this time no known public round exceeds 3600 fps. As can be seen the velocity points for the PBY values line up on the same common base line angle. Even when the target size is cut in half the resulting points still line up to a projected PBY line.

Figure 72:
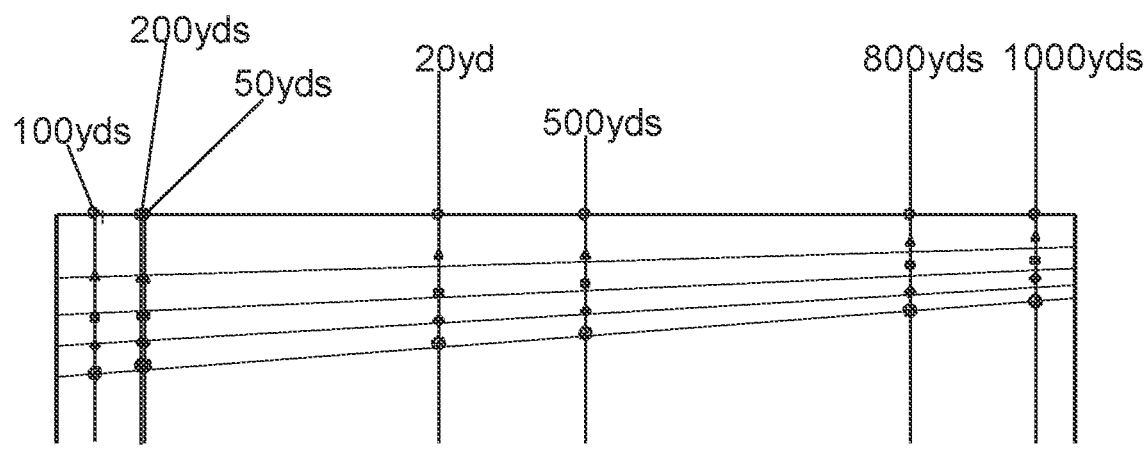
FIG. 72 Illustrates a plot of derived PBY values for multiple target sizes at different ranges.

FIG. 72 shows a zero range change from 20 yds to 2000 yds.

Same angles are carried forward and used from—Target Size, BC, velocity.

As can be seen this plot is an inverted "V". The results retrograde but still fit the predicted slopes.

Figure 73:
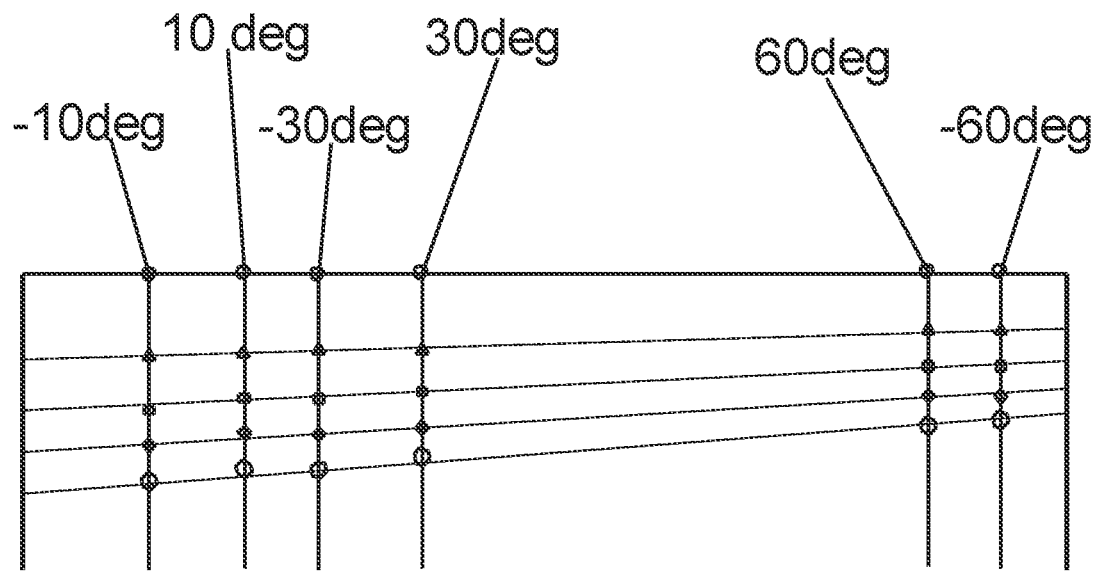
FIG. 73 Illustrates a plot of derived PBY values for multiple target sizes at different ranges.

FIG. 73 shows Line of Sight Angle. Line of Sight Angle is used in up and down hill shooting. There is no other reticle that compensates for these angles. Angle slope shooting is currently a training event.

In this example Line of Sight is compared for the fit of the PBY's. The values are in degrees of departure for a change in line of sight from a normal zero angle.

In FIG. 74 Ballistic Coefficients are compared. An extreme range of 0.1BC G1 to 2.0BC G1 were compared. Base Gun Information:
Target Height—0.308-168 gr Match King—3000 fps
FPS—168 gr Match King—20" tall target
BC-variable

FIG. 75

Figure 75:
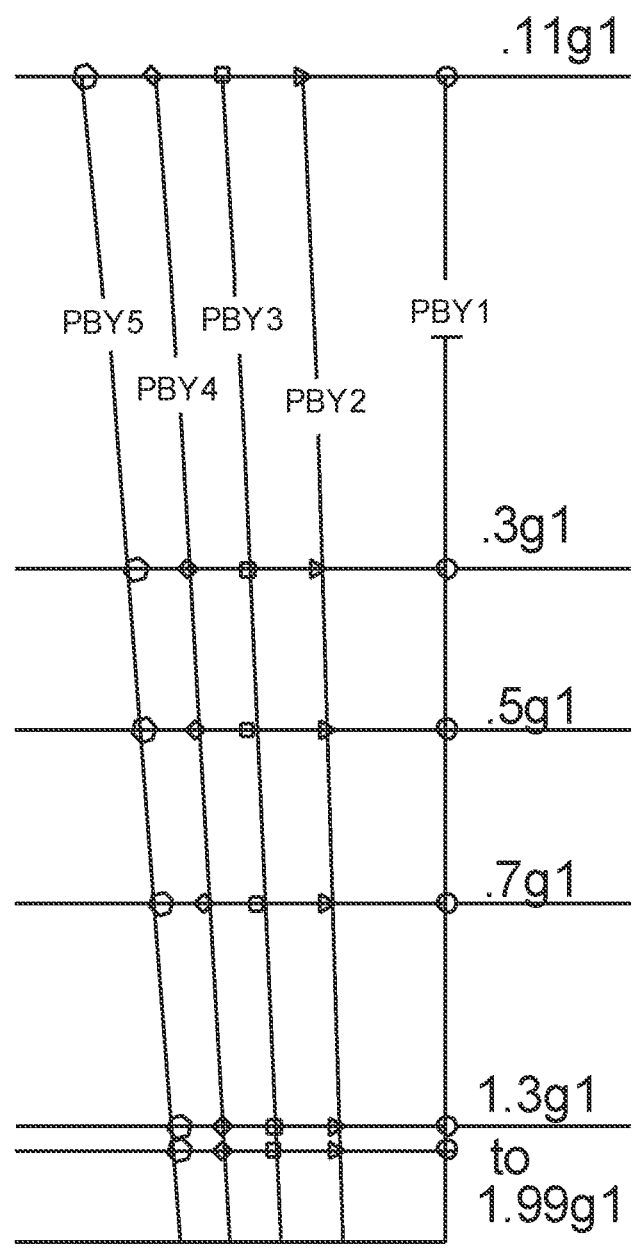
FIG. 75 is a table Illustrating a comparison of ballistic coefficients.

As can be determined the changing BC falls shown in FIG. 75 on the same line sets for each of the PBY Values.

Figure 76:
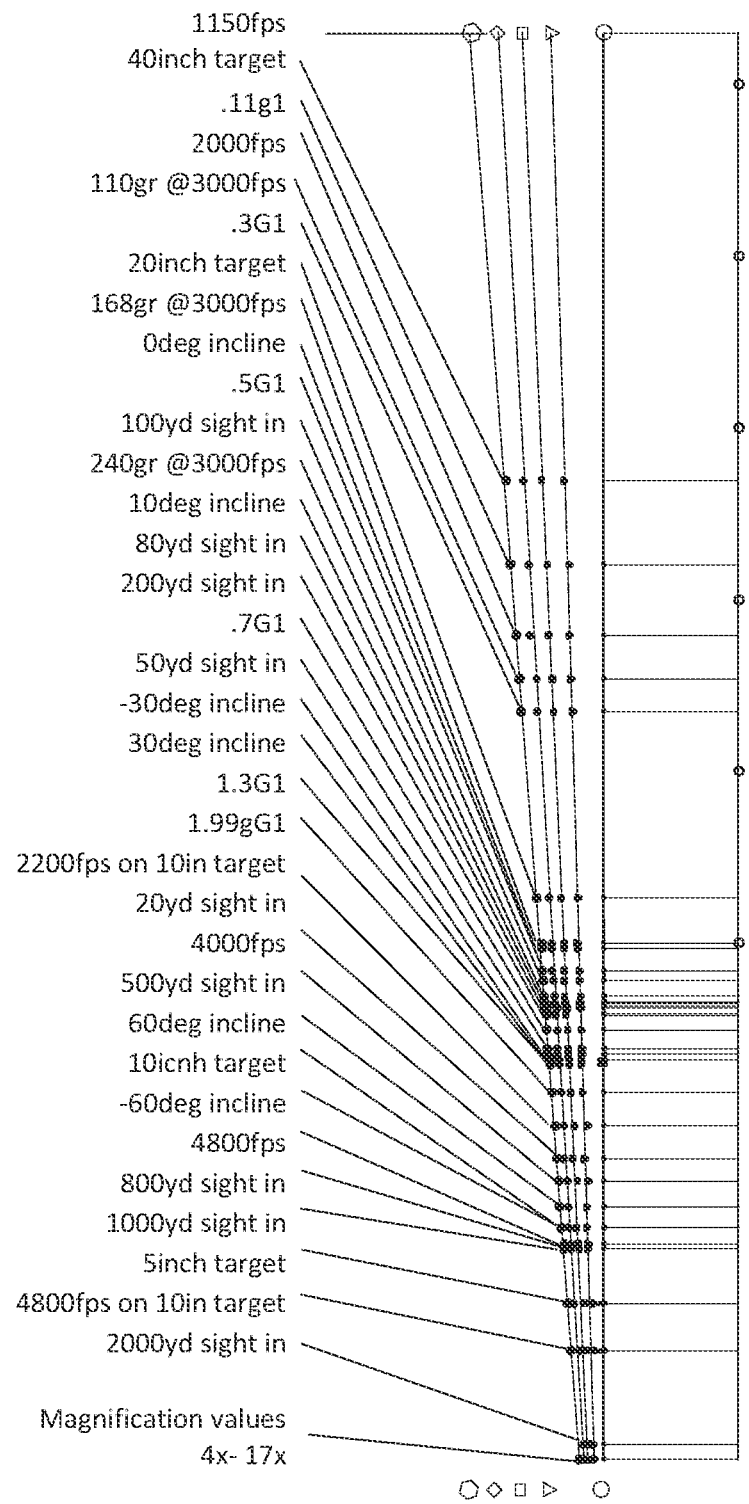
FIG. 76 is a table Illustrating a comparison of ballistic coefficients.

For FIG. 76 we combine multiple inputs: The following is a second way to view the data FIG. 77 and FIG. 78:

Manipulating Ratio Scale by Changing Magnification

Figure 77:
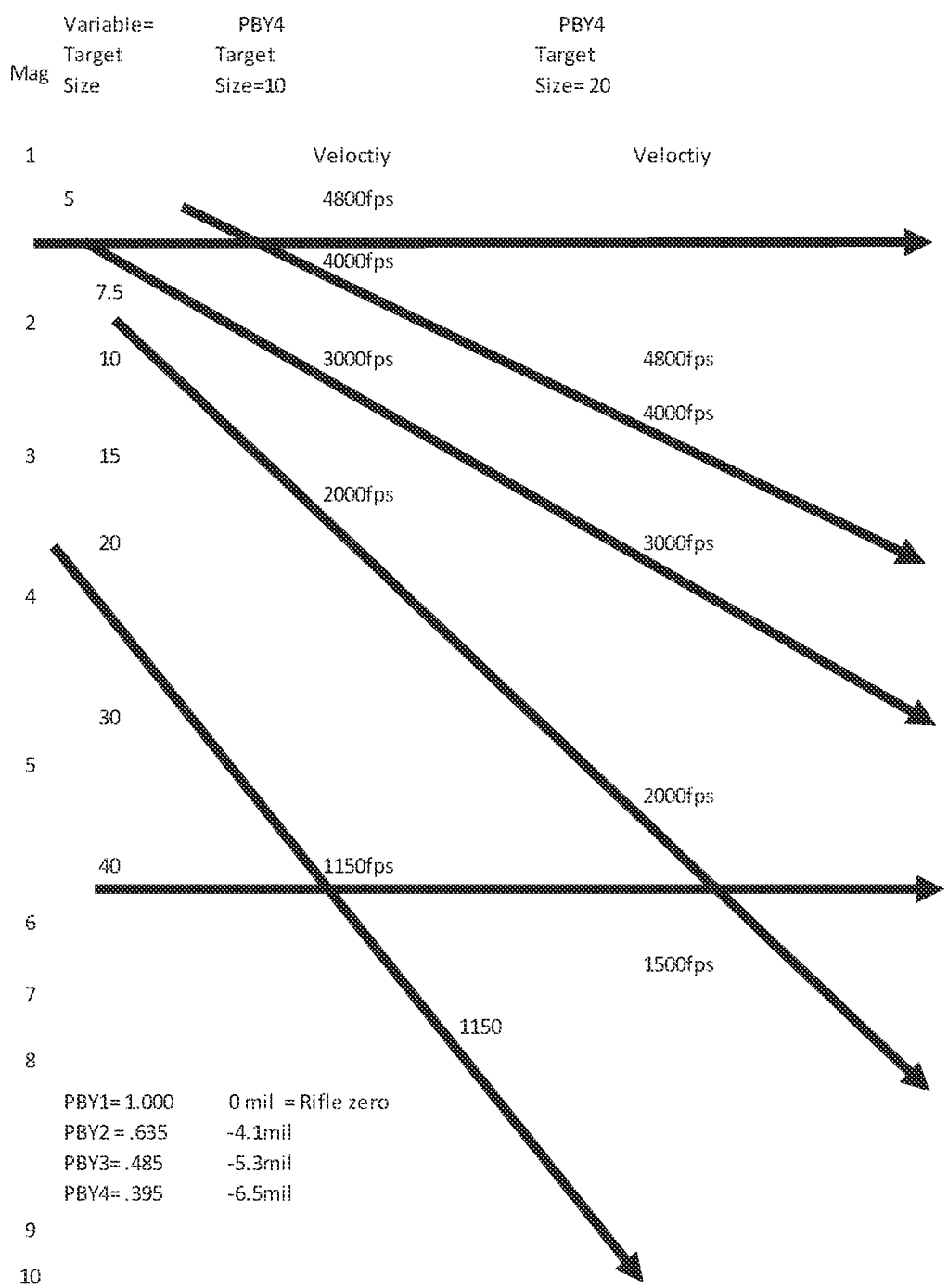
FIG. 77 Illustrates manipulating ratio scale by changing magnification.
Figure 78:
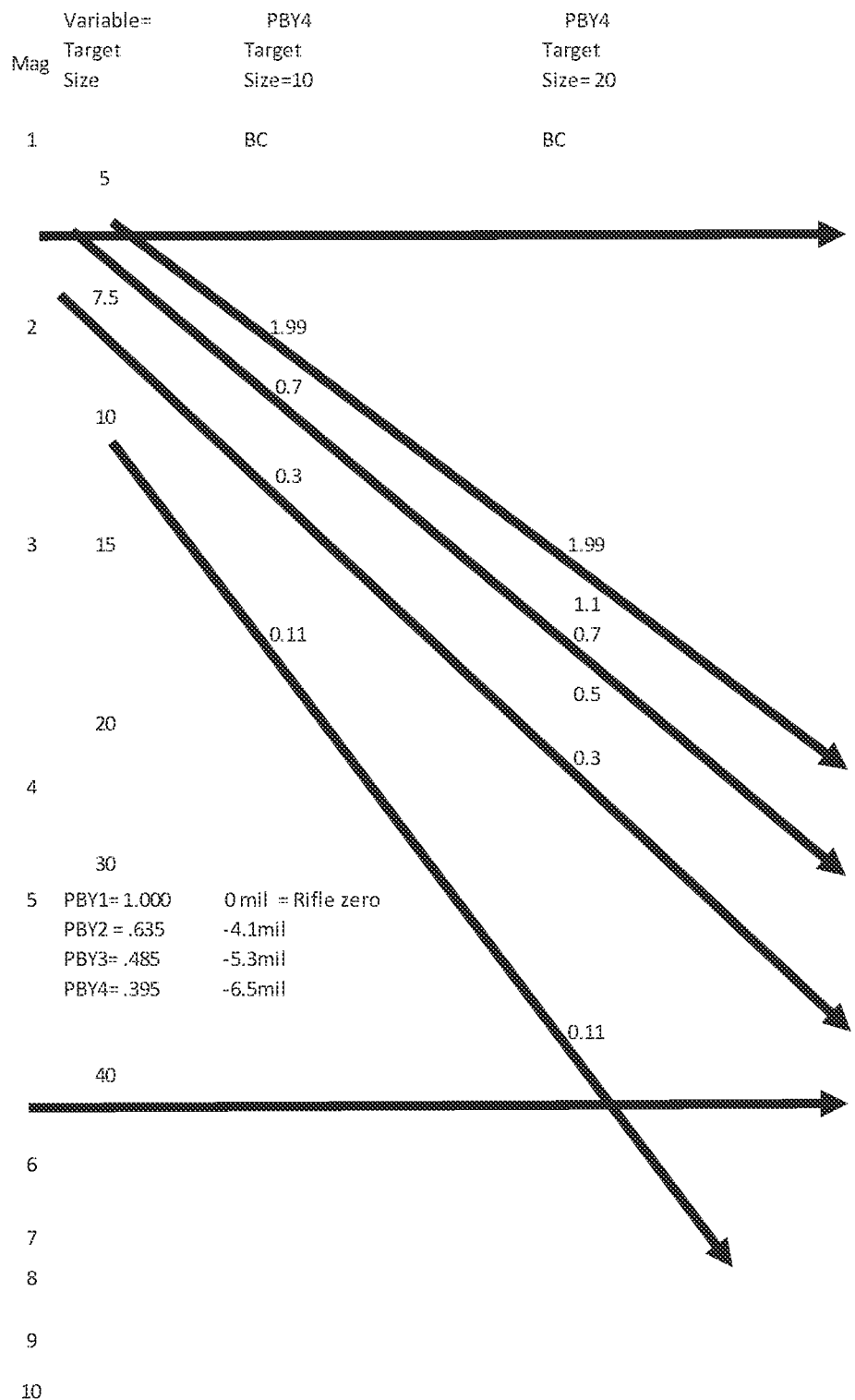
FIG. 78 Illustrates manipulating ratio scale by changing magnification.

In FIG. 77 and FIG. 78 we add a second scale being Column A. A is termed magnification.

FIG. 77-FIG. 78 are also the bases for a reference book, wheel type reference, file type reference, bases for a stand-alone ballistic program. Other formats could be used.

An optic could be produced in which the reticle can be varied from 2.3 to 5 in which well over 95% plus of all ammunition produced would have a firing solution for a vertical value equal to 5 target heights (or more)—represented by PBY1, PBY2, PBY3, PBY4 and PBY5—by simply changing the size of the reticle. The ratio noted for 2.3-5 could be calculated for larger or smaller magnification values. The solution would include varying target heights (Critical Zones), Velocity, BC. Line of Sight Angle, and Sight in Ranges.

Current scopes would include any Second Focal Plane scope. In the case of an F2 scope (second focal plane) a reticle would be built that represents the largest mil value or moa value calculated for PBY5, applying the ratio's will provide PBY1, 2, 3, and PBY4. Setting the reticle to create a correct solution at a maximum magnification value would allow a user to work between the values 5 and 2.3 and produce hits with standard ammunition under standard conditions on a vertical target out to 5 heights (or more with further points calculated).

Figure 79:
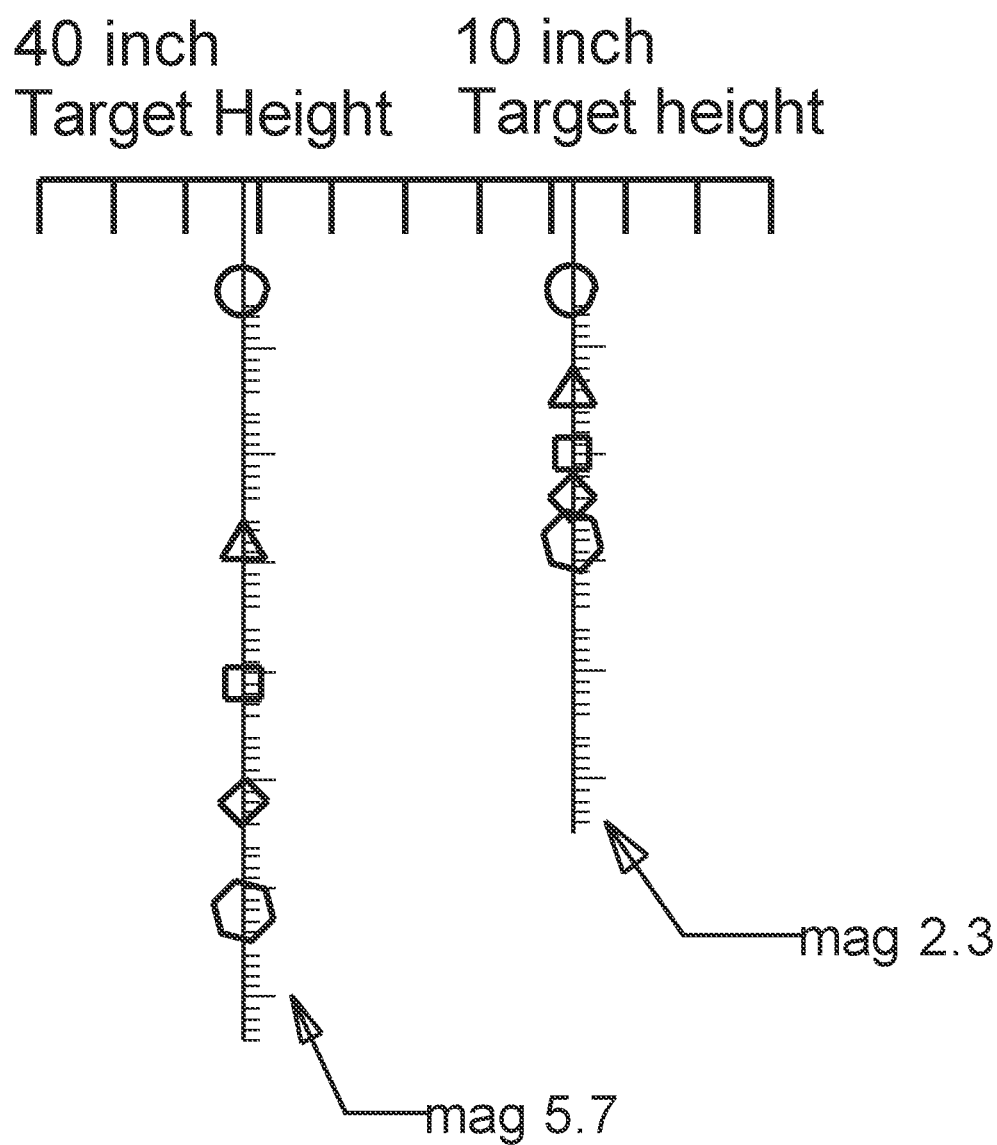
FIG. 79 Illustrates a representative reticle.

In FIG. 79 a reticle has been produced at a max value of a 40" tall target. This value is true at a magnification of 5.7×. Dialing the magnification to 2.3× will effectively allow us to engage any and all target sizes between 10" and 40" tall.

FIG. 80

As can be seen this value also allows shots to be taken based on a variety of parameters. Any and all current velocities, target sizes, BC spread, Inclined shooting, bullet weights: all fall on the same line(s).

It should be understood that a F1 scope could be built with a reticle based (as an example) on a target size of 20 inches, Velocity of 2850, 200 yd sight in and a BC of 0.5.

A strict hunting reticle could be based on a target size of 8 inches, velocity 2850, sight in of 100 yds and a BC of 0.42G1. This would now cover all North American game out to 425 yds using a PBY1-PBY6. No gaps would be present.

If the noted reticle was set at a 8× mag:
1) At approximately 10.6× the target sizes that can be engaged by PBY1PBY6 would be 4".
2) At approximately 9.3× the target sizes that can be engaged by PBY1-PBY6 would be 16".
3) At approximately 6.7× the target sizes that can be engaged by PBY1-10 PBY6 would be 24".

Essentially covering Coyote sized game to Elk and Moose.

In this case the velocity of 2850, 20 inch target size, BC 0.5, Bullet weight 200 gr will produce the reticle FIG. 69;

FIG. 69 can be set at a mag of 5.7 (still using the 2.3 to 5.7× example);
1) Any target smaller than 20" can be targeted using the PBY points.
2) Any velocity faster than 2850 can be targeted.
3) Any BC greater than 0.5 can be targeted.
4) Bullet weight is nearly irrelevant over these calculations.

If reticle 15 could be set at a mag of 4× at the reticle build +/− values can be targeted.

If reticle 15 were configured to be correct during the reticle build a simple ratio can be applied:

$$10/5.7 = a/2.3 = 10 \times \text{upper value and } 4.3 \times \text{lower value.}$$

Of course, if sufficient magnification were available all scenarios could be encompassed.

Figure 80:
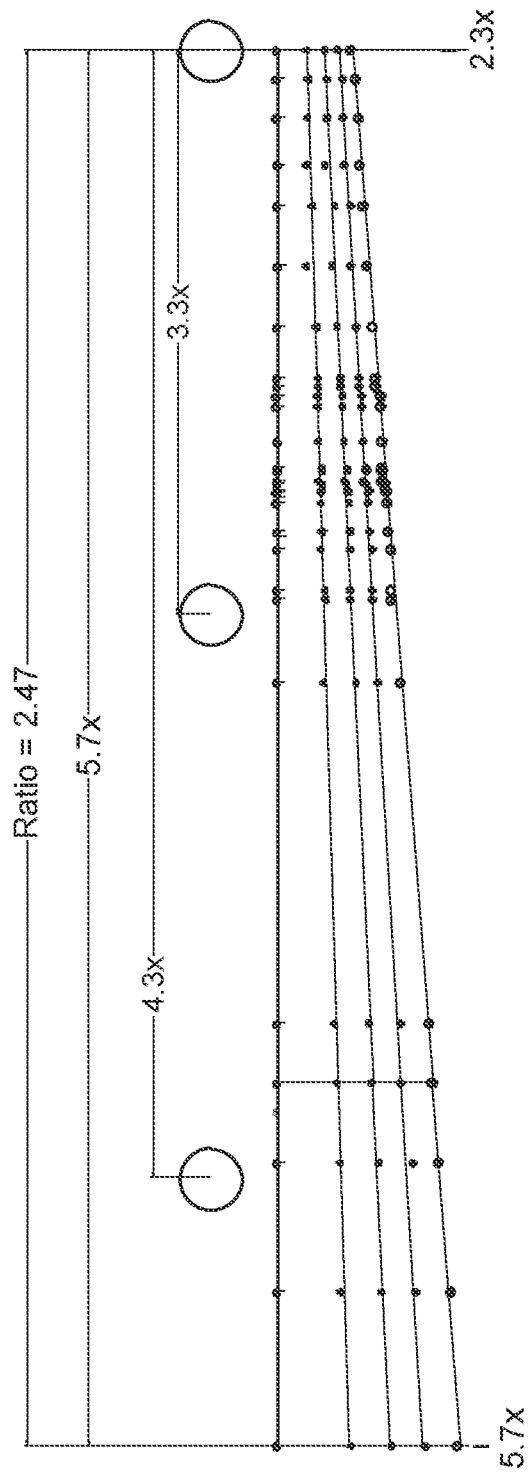
FIG. 80 Illustrates a plot of scenarios.
Figure 81:
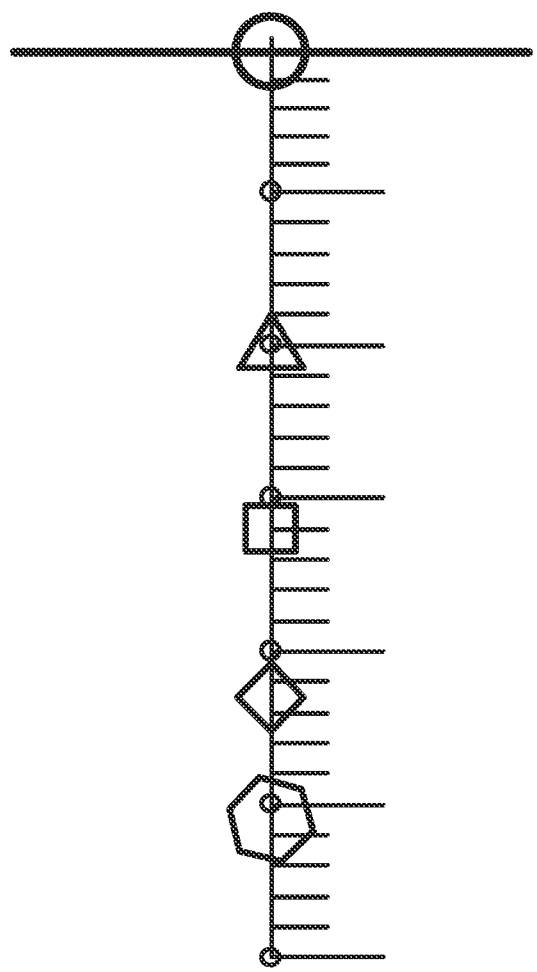
FIG. 81 Illustrates a representative reticle.
Figure 82:
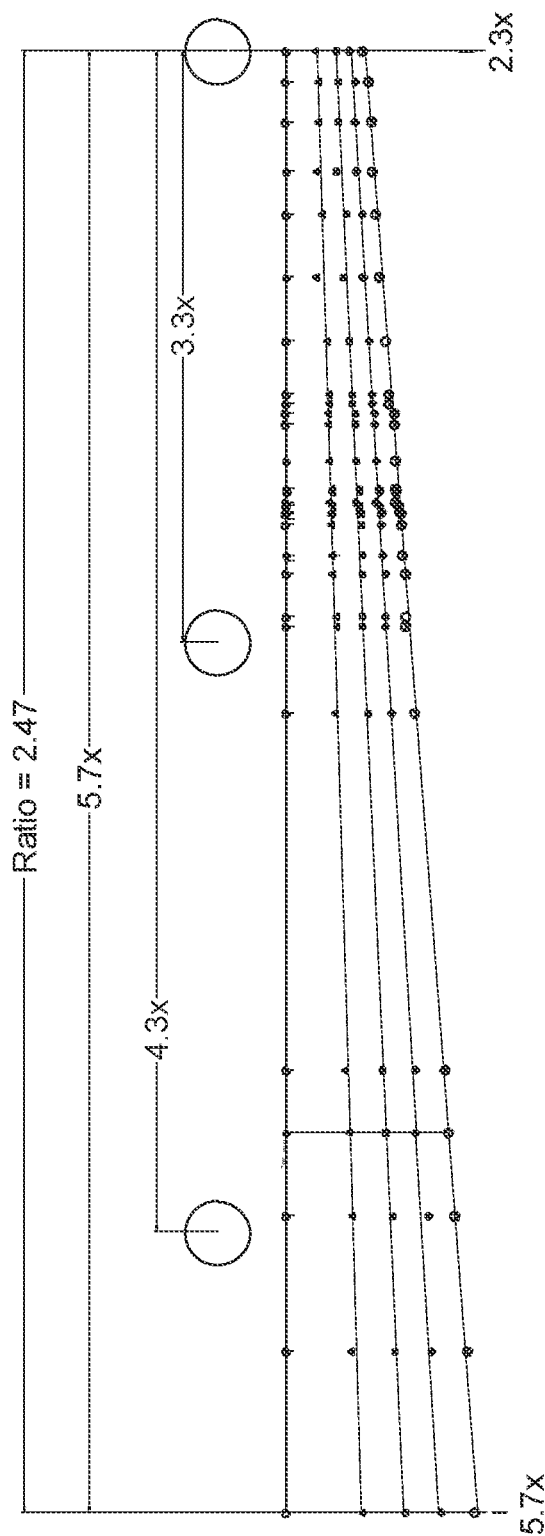
FIG. 82 Illustrates a plot of scenarios.
Figure 83:
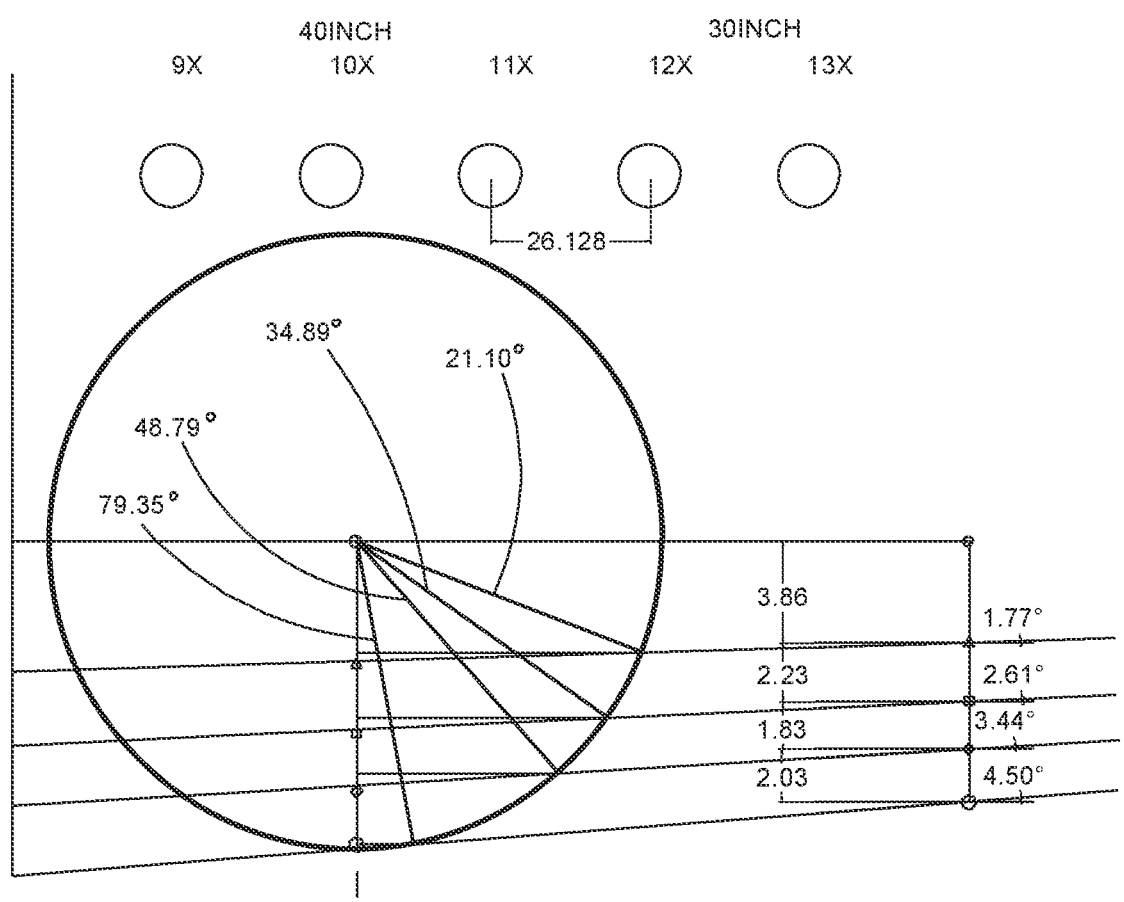
FIG. 83 Illustrates scaling for a representative reticle.

A F2 scope of a 1-8× capability would be able to encompass all researched scenarios. The plot of such scenarios is demonstrated in FIG. 80.

2-10× and 3.5-10× are readily available in the marketplace. The marketplace is commonly filled with 5× gain function for magnification.

Magnification could be set with indexable lock points:
1) Marked tube for initial settings based on primary PBY factor.
2) Lock ring to line up to the marked scope tube. The ring would have a detent receiver or a mechanical indexing point.
3) The magnification ring would have the receiver or a male side of the lock ring in #2.
4) A person skilled in the arts could devise countless ways to index the magnification ring precisely and create a user friendly initial index home.

Figure 12:
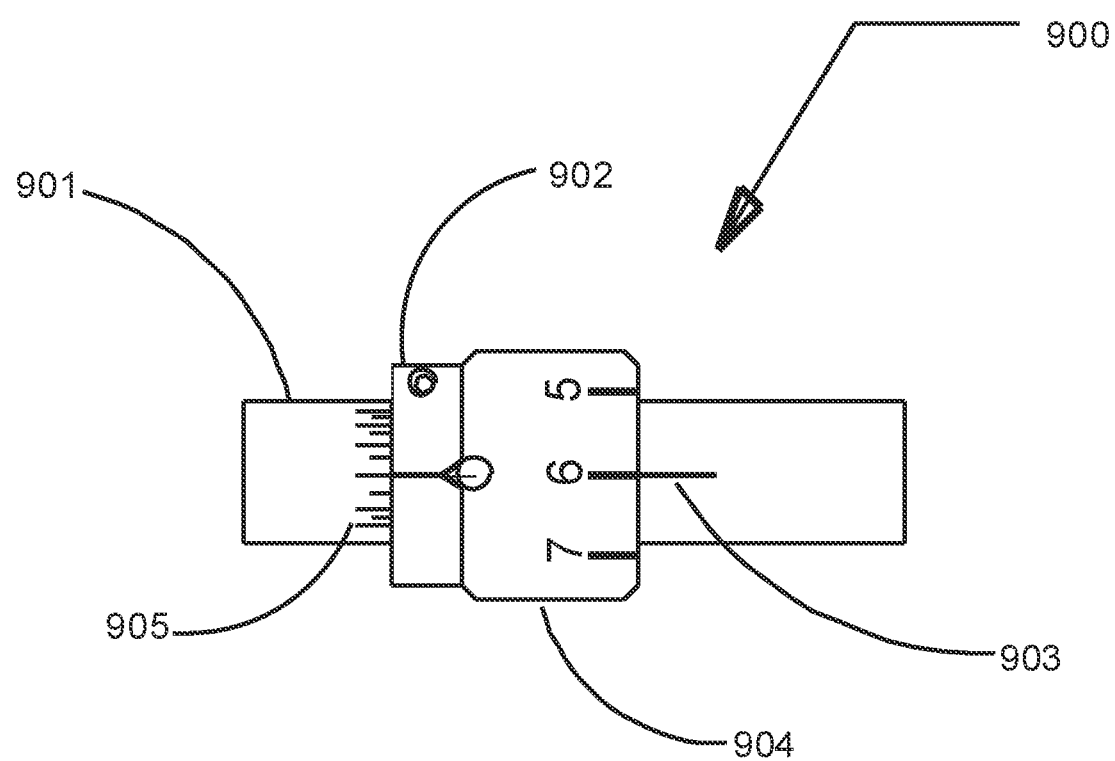
FIG. 12 Illustrates a secondary adjustment on a scope concerning magnification.

In FIG. 12

901 is the scopes primary tube.

905 are index marks applied to the tube. These marks would coincide to 904 which is the current magnification ring.

902 Is a locking ring that contains a detent or locating device. This ring lines up to a chosen 905 value. It would then be locked.

903 contains the standard magnification ring with a receiving detent for 902 or any mechanism that a person of standard skills could devise to locate, and lock if chosen, to achieve the magnification value that fits the parameters required by the shooter: Target Size, velocity, and BC being the primary inputs.

Of course the magnification could be set by hand to the current numbers on current magnification rings. The exercise shown describes a linear application in the working world to apply the noted equations and resulting linear ratio described by a vertical target calculation.

Section 15: Manipulating Ratio Scale by Tiling the Reticle

Since the system is linear, simply tilting the reticle will yield the continuously changing point value for PBY1 to PBY5 and still maintain the ratio's derived.

Figure 13:
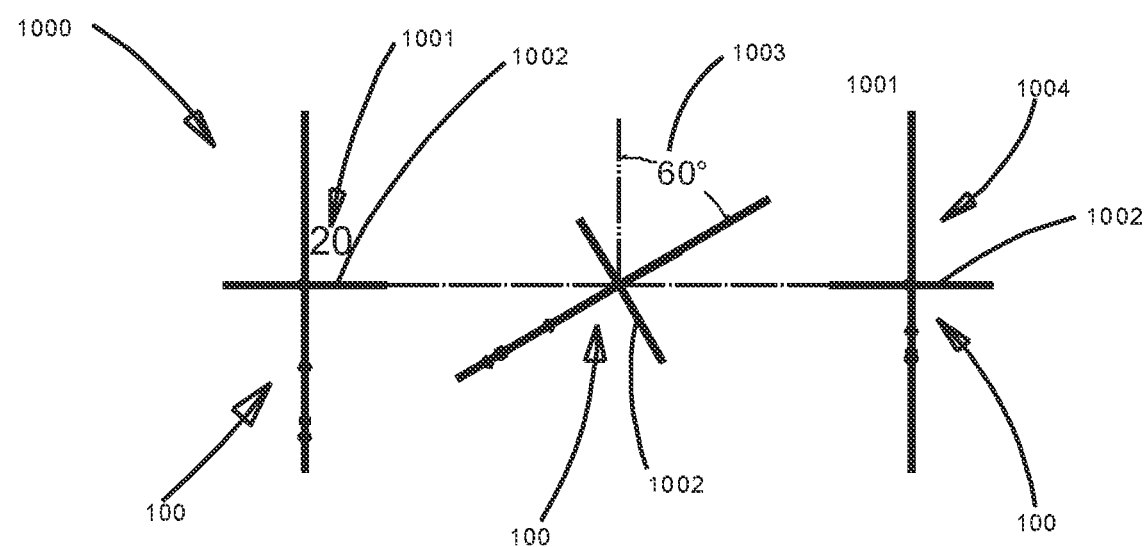
FIG. 13 Illustrates a tilting reticle.

A tilted reticle is a simple trig function. FIG. 13 is a schematic example of this concept.

In this example FIG. 3 reticle noted as Detail 1000, shows a base reticle.

Detail 100, set to a base size of 20 in this example. The same reticle Detail 1000 has been tilted 60 deg, Detail 1003. This will result in the shooter viewing the representation noted in Detail 1004. A larger base reticle was tilted to establish the same ratios noted in FIG. 3. In this example a reticle was tilted from a 0 deg plane to a 60 deg plane. This provides targeting solutions for multiple PBY values for both a 10 inch target and a 20 inch target. As can be understood the values would not be limited to the examples. The tilting of the reticle will also follow a specific ratio. As a ration constant a near inifinite series of values could be applied. This is not limited to target size, velocity, range, BC, inclination and so forth as can be applied by a person of skill in the arts.

Figure 14:
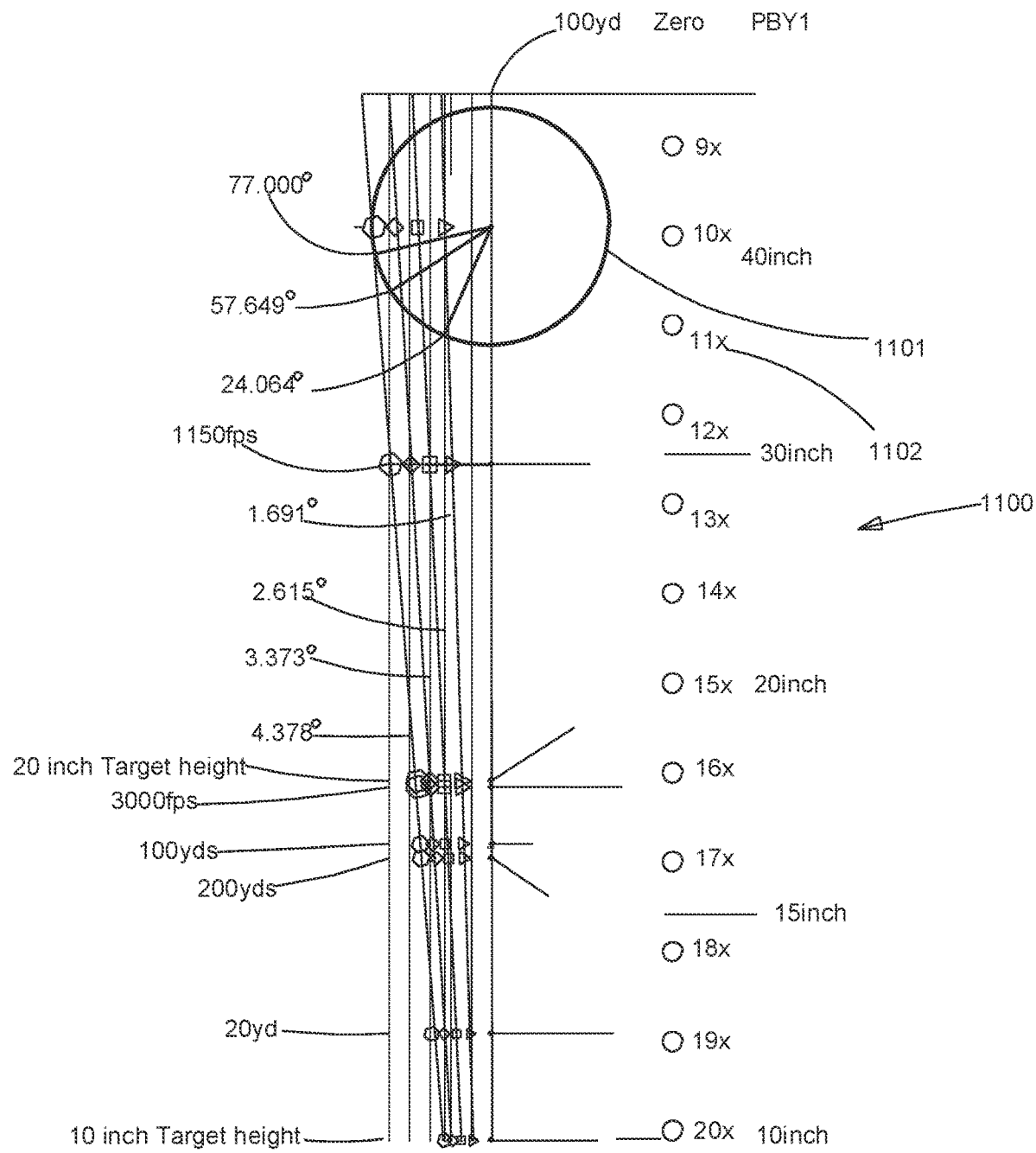
FIG. 14 Illustrates multiple components, tilt, mag, slope ratio.

In FIG. 14 we show a complete scale with multiple conditions. Detail 1001 indicates an arc around which angular values can be determined. Detail 1102 is indicating a scale as would be applied using a magnified optic to alter the apparent overall height of the reticle as noted in FIG. 3. The changing of the magnification will alter the apparent height of the reticle as applied to an object but does not alter the ratio noted in FIG. 3 and other figures noted.

In this view of FIG. 14 we show a detail section of FIG. B11 In this we show that the ratios have multiple dimensions. We have also added a ruler noting magnification values applied to this concept. What can be seen is the ratios arrived at can be used to establish a firing solution for all current known variables.

1) Direct Geometrical for above point of aim and below point of aim. Above point of aim would encompass a PBY1 of a maximum point blank range value. Maximum Point Blank Range value would encompass a ballistic path that is approximately equal to one half of the vital zone above point of aim and the second half below the point of aim. The second direct geometrical values would be for all PBY values to be equal to and then below the line of sight.
   a. The original reticle will have the ratio constants of 1.0, 0.635, 0.485 and 0.395. Other reticles with different ratio constants from noted equations could be realized. These values are exemplary.
   b. The Max point blank range ratio is 1.0, 0.582, 0.425 and 0.370. Other ratios from noted equations could be realized. These values are exemplary.
2) Angles for the results are shown. In this scale 1.736, 2.657, 3.412, and 4.413 are shown on an x axis. Again, the ratio between the angles of 1.0, 0.635, 0.485 and 0.395 exists.
3) A second set of angles are shown on the Y-axis. As can be expected the same ratio exists.

The PBY values can also be calculated by using the side opposite, which makes the Y axis, of the initial points or the initial point of origin:

Using: PBYangle1=90−arcsin(½PBY1/PBY1) and repeat the values for PBY2 thru PBY5.

These will yield the angles:

The values noted conclude that multiple conditions can be used to calculate a PBY value. Other formulas could be used to derive results. The noted examples do not limit the conditions but certainly show the relationships of the PBY1 to PBY5.

Concerning the tilted reticle, a tilted reticle could be used in an F1 scope. This will change the scale of the reticle and then using the magnification feature on the scope the new tilted reticle is true to the target regardless of the magnification.

A combination of several technologies can produce a linear image to retain the ratio:
1) Magnification
2) Tilting
3) Offset lens
4) Cylinder
5) Electronically-multi point generation and single displaced reticle.
6) Wedge prisms-inside of scope and outside of scope. Alpha Patent 25 7) Risley pairs-inside of scope and outside of scope.
8) Liquid lenses and prisms.
9) Reflective surfaces
10) Stacked combinations of more than one PBY.
11) Pill type replacement reticles.

If we look at Item #10 above, we can apply it in multiple fashions:
1) Stacked PBY sets per a given magnification.
2) Secondary PBY sets using different magnifications.

Section 16: Reticles with Stacked Ratio Scales

Figure 21:
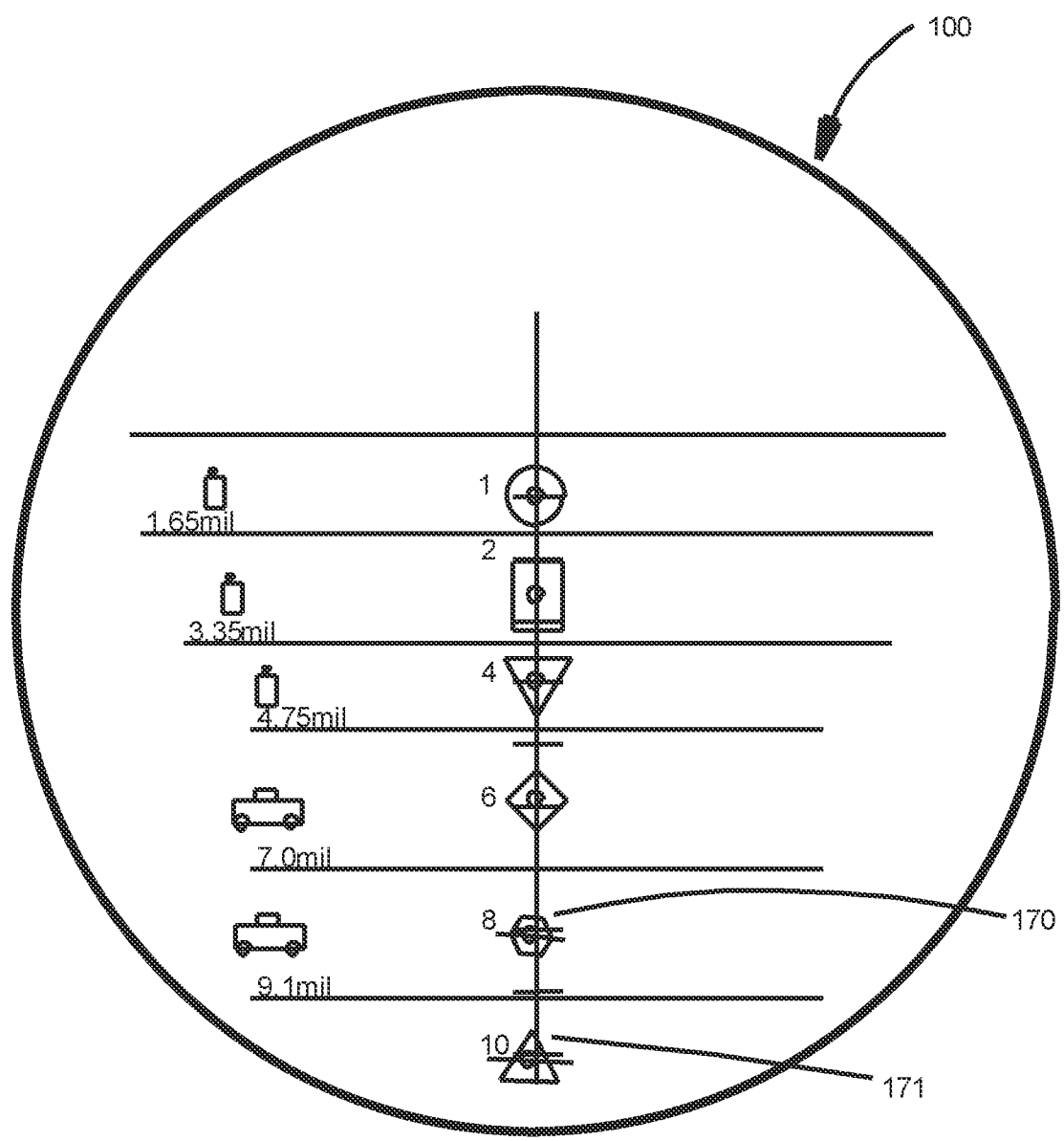
FIG. 21 Illustrates Spin drift effect on the reticle.
Figure 22:
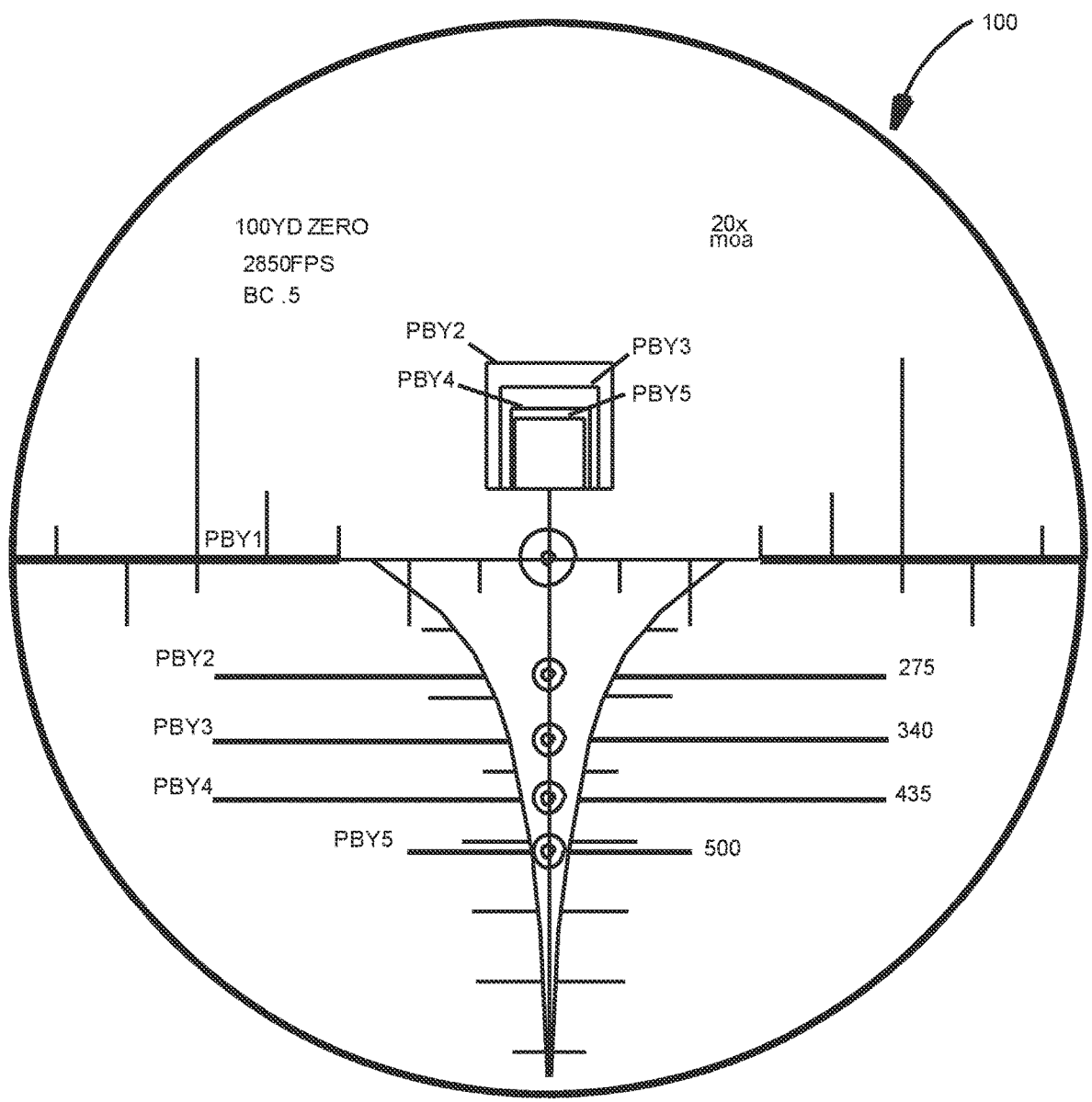
FIG. 22 Introduces a funnel as a secondary aiming aid.
Figure 84:
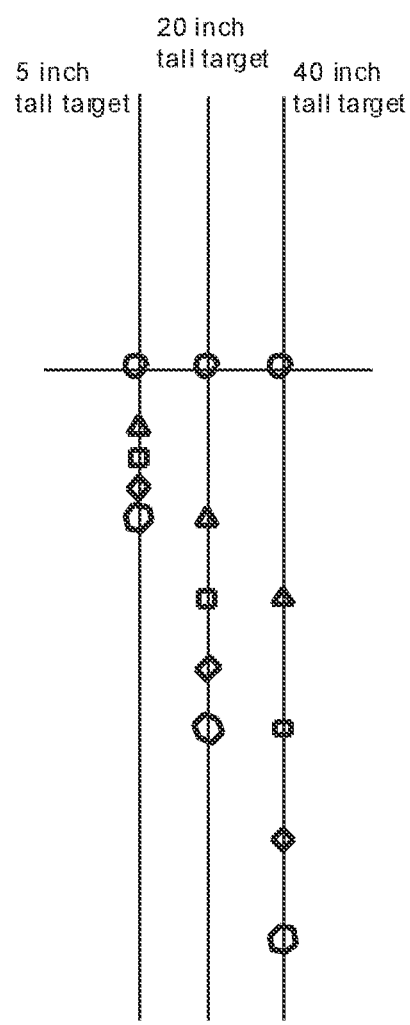
FIG. 84 Illustrates a comparison of more than one PBY series for a representative reticle.
Figure 85:
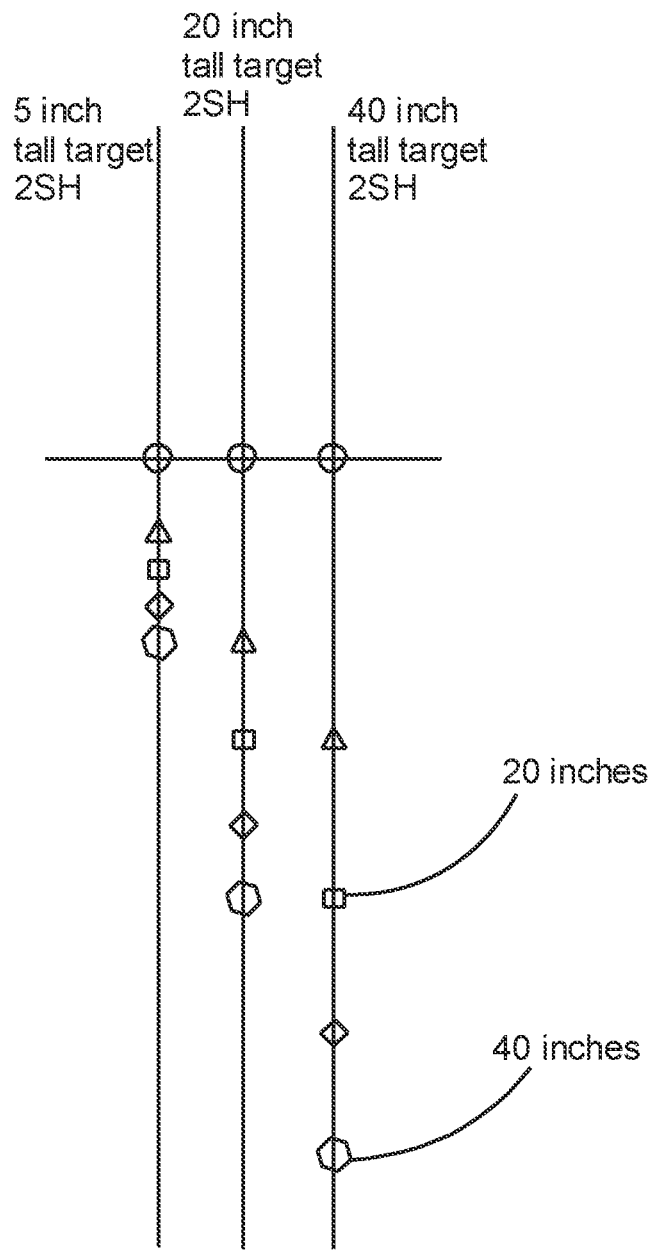
FIG. 85 Illustrates a comparison of more than one PBY series for a representative reticle.

In this FIG. 84 example more than one PBY series are being compared side by side at the same scale. A 5 inch tall series, a 20" tall series and a 40 inch tall series are compared:

FIG. 84 is fully embodied in FIG. 3 and FIG. 21. It should be understood that a person of skill in the arts would understand and appreciate that the ratios noted in FIG. 3 can be applied to any target height. FIG. 84 is used to create a comparison reticle solution to various heights of the target.

If we refer to the PBY's as:
1) 5 inch=PBYA=PBY1A, PBY2A
2) 20 inch=PBYB=PBY1B, PBY2B
3) 40 inch=PBYC=PBY1C, PBY2C In this FIG. Ret17 Use2 the 5 inch and 20 inch reticle are combined. The 5th PBYA of the 5 inch target sits at a 20 inch target (PBY1+PBY2+PBY3+PBY4+PBY5=0+5+5+5+5=20). The first PBYB of the second set for the 20 inch targets sits at PBY5A.

The noted ratio's allow a continuation of PBY's as continuing intergral of previous PBY's.

FIG. 85

The start of the PBY1C is setting at the same value at PBYB2. PBYC for the 40 inch target is shown side by side.

Figure 86:
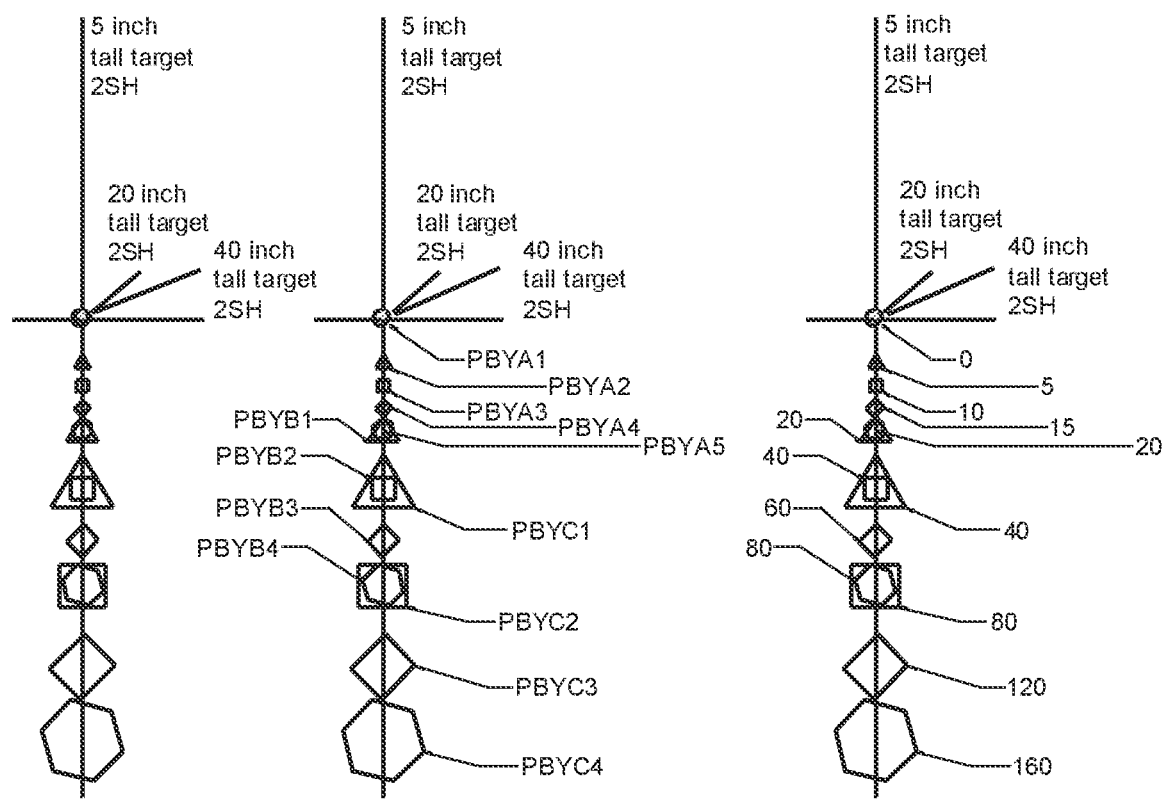
FIG. 86 Illustrates a comparison of more than one PBY series for a representative reticle.
Figure 94:
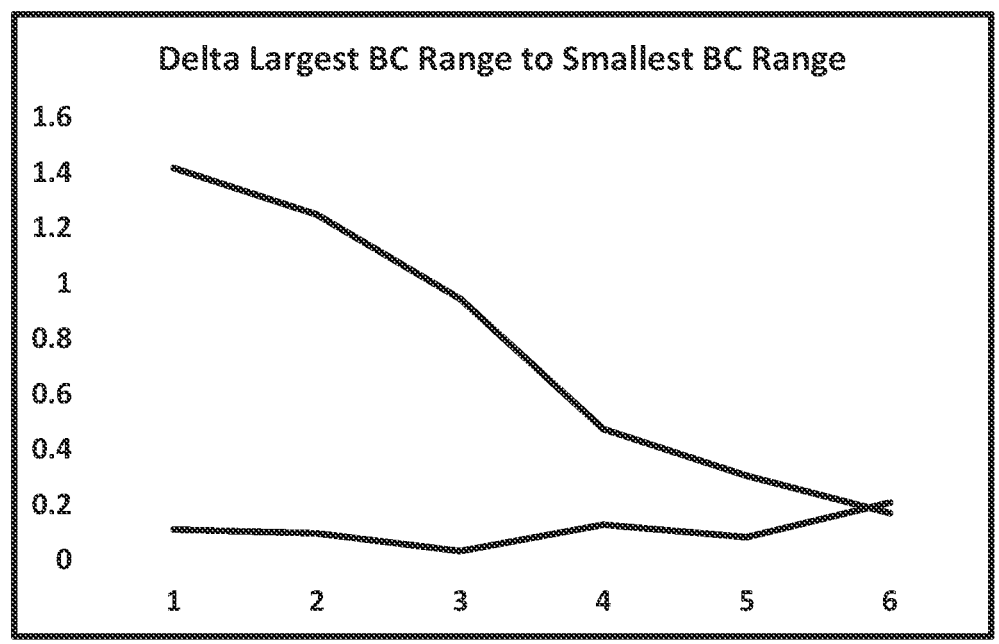
FIG. 94 Illustrates a comparison table.
Figure 95:
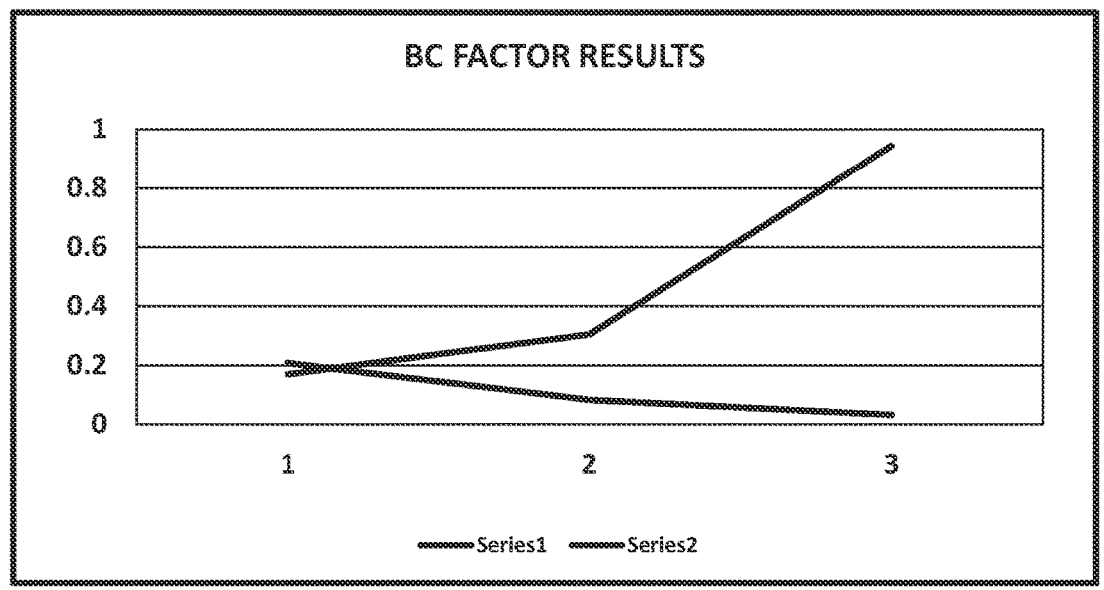
FIG. 95 Illustrates a comparison table and graph.
Figure 96:
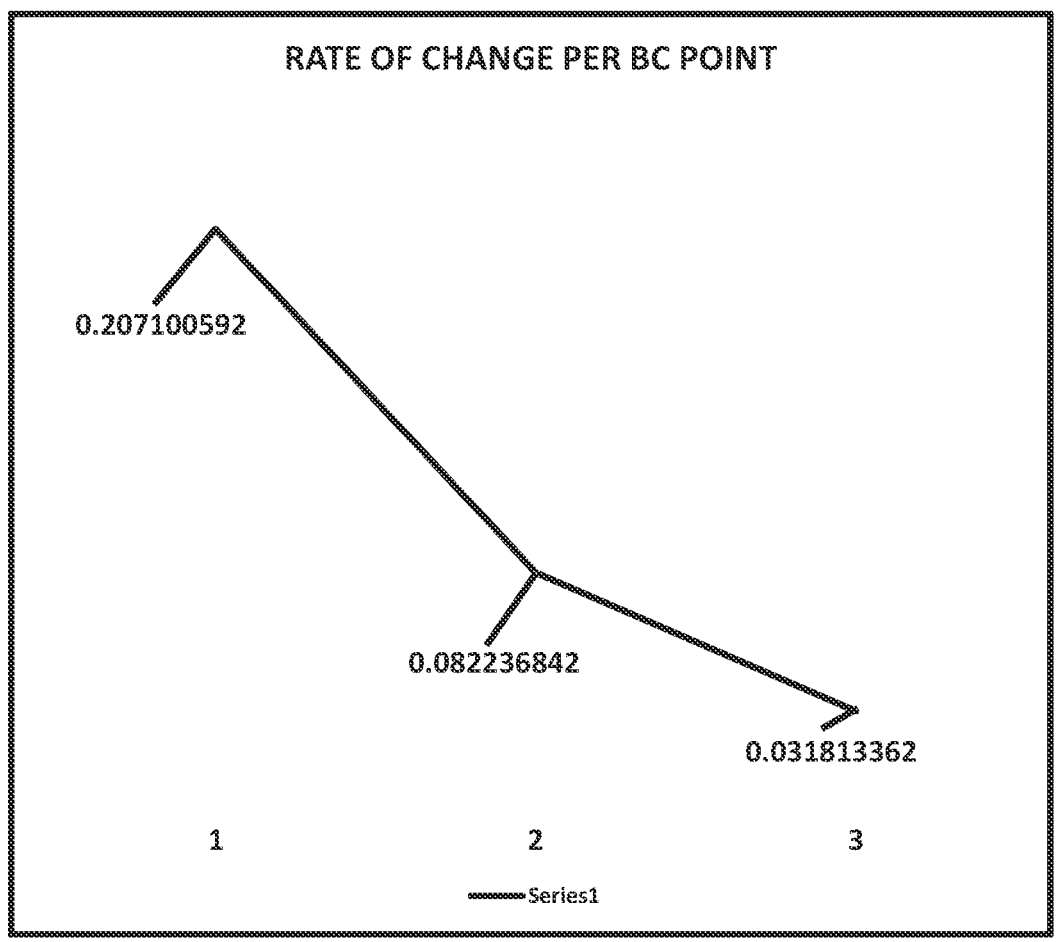
FIG. 96 Illustrates a comparison graph.

In FIG. 86 (Which is embodied in FIG. 3, FIG. 11, and FIG. 12 which show position of shapes, a standard ratio, and size integral) we show the addition of the 40 inch target set. Then the note of the individual PBY values as noted:
4) 5 inch=PBYA=PBY1A, PBY2A
5) 20 inch=PBYB=PBY1B, PBY2B
6) 40 inch=PBYC=PBY1C, PBY2C Then we show the stacked PBY's and their equivalent total offset.

FIG. 86

In FIG. 86 we show the same reticle with each position noted with a descriptor. Each column adds a detail moving left to right until all components and values are in place.

Any of the above can make the shifted ratio alone. Any of the above could be used in conjunction with another or all to create the ratio noted and ability to engage vertical targets with no gaps in the firing solution.

Other methods to add or subtract reticle.

Section 17: Exemplary Turrets Designs Integrating Ratios

Turrets could be produced with:
Turrets-standard reticle:
1) Turrets with deep indents that match PBY values-four PBY values could for example be obtained within 1rev.
2) Turrets with cams that rapidly elevate to new PBY-four PBY values could for example be obtained within 1rev.
3) Turrets adjustable points could be used to create multiple PBY values.
4) Custom marked exterior turrets-PBY1, PBY2, PBY3, PBY4 etc. These turrets could be applied to standard scopes.
5) Multi turret—each turret has its own horizontal cross hair.

Figure 15:
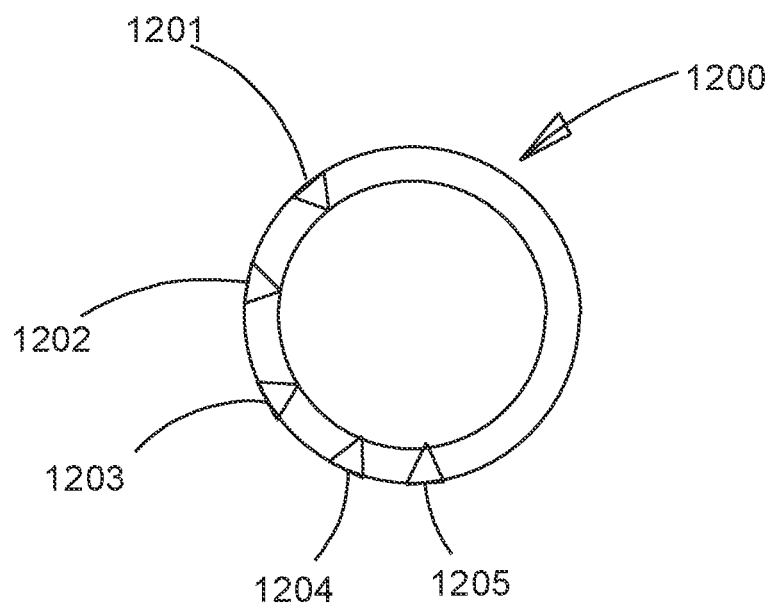
FIG. 15 Illustrates simple detents in a scope cap equating to the noted ratio.

FIG. 15 shows a simple ring with detents at the correct PBY values. Typical PBY values PBY1-PBY6 could be obtained in less than 1 revolution. A secondary ring could be present stacked above or below this ring that would still allow a full use of a turret using current standard conditions: adjusting for mil or moa.

Turning the turret to each detent will produce a new position on the target equivalent to the calculated PBY required.

Figure 16:
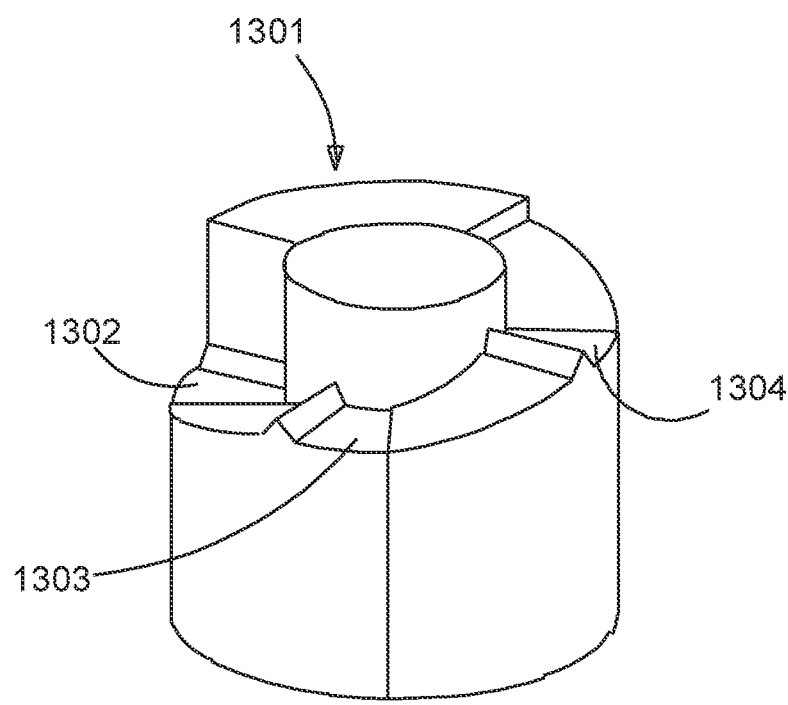
FIG. 16 Illustrates a scope with vertical detents.

In FIG. 16 a direct use turret is shown. Flats are used in this example and indicated by Detail 1301, 1302, 1303, and 1304. Turning this turret directly engages the erector assembly and places the cross hair at the required PBY position. In this example a person of skill in the arts could device countless methods to rapidly adjust a aim point in a scope to an equivalent resulting ration number described in F1.

Figure 17:
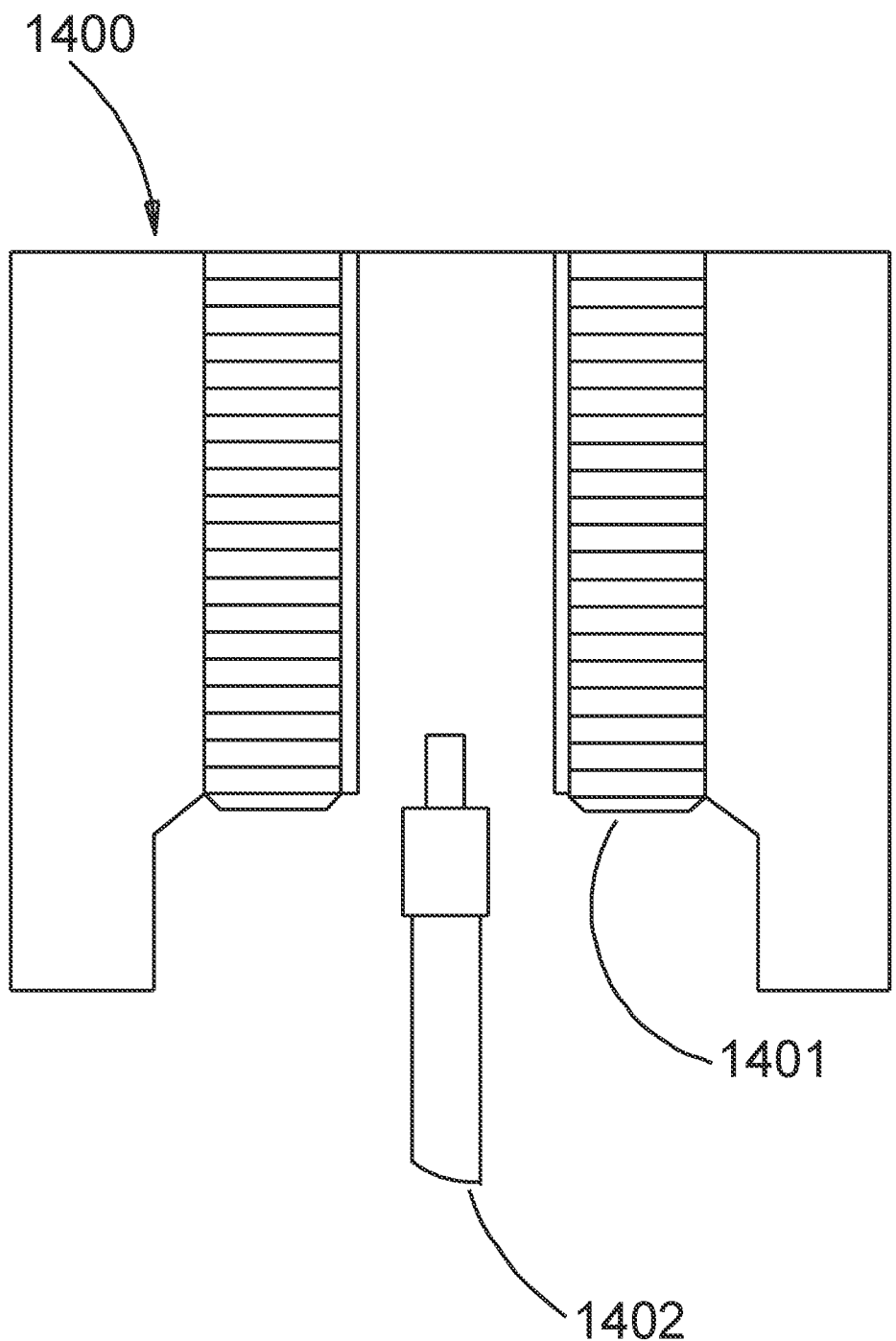
FIG. 17 Illustrates a scope cap with individual adjusters in the cap.

In FIG. 17A turret is shown with adjustable points vertically mounted in the turret and parallel to the movement of the erector assembly. Adjustable points noted by 1401 and 1402 can be employed to adjust an erector assembly to the calculated equivalent ration position described in FIG. 3.

Turrets are not the focus of this patent. Multiple methods could be introduced to produce turrets, mechanical bases, wedges, mirrors, electronically generated images could be devised by a person skilled in the arts.

Section 17: General Methods of Reticle Application

Reticle:
  a) Stacked dots
  b) Stacked shapes to indicate separation. Dots, circles, chevrons
  c) Stacked shapes per second, third, and fourth point-blank range:
  d) Stadia
  e) Circles, squares, triangles any closed boundary type shape or solid format.
FIG. 3
  f) Varying styles for different heights/ranges.
  g) Shapes with built in secondary features that will allow adjustment without adjusting the scope magnification.
  h) Battle PBY+Tree or dots or stadia starting at 600 yds (example)
  i) Trees with PBY marks.
  j) Systems with more than one reticle-front primary and rear secondary or vice versa.
  k) Systems with more than one reticle-primary instilled in secondary.
  l) Scaling reticle to a target distance, elevation, such as mil or moa, or zero.
  m) Reticles used in conjunction with wedges or mirror assemblies.
Turrets-Standard Reticle:
  1) Turrets with deep indents that match PBY values-Five PBY values could for example be obtained within 1 rev.
  2) Turrets with cams that rapidly elevate to new PBY-Five PBY values could for example be obtained within 1 rev.
  3) Turrets adjustable points could be used to create multiple PBY values.
  4) Custom marked exterior turrets-PBY1, PBY2, PBY3, PBY4, PBY5 etc. These turrets could be applied to standard scopes
  6) Multi turret—each turret has its own horizontal cross hair.

Section 18: General Methods of Ratio Application

18a. Magnification Adjustment

The math and testing indicate a strong ratio within the noted values of velocity, BC, and gravity (which effects time of flight). This ratio can be used to describe the vast majority 99+% of all ammunition sold and used (and will extend to further reticles as the velocity range increases), but others could be used. The error found in the variation of:
  1) Target size to cartridge
  2) Target size ratios.
  3) Velocity variation low of 1100 fps to high values 4800 fps which is over 50% above current standards.
  4) Bullet BC: BC.11 to BC 1.1 using G1 values.

To further note: the resulting ballistic results for all of the parameters noted produces one series of ratios, when PBY1 is set as to operate within 80-200 yd zeroes. A second set of parameters and ratios occur when initial platform zeroes are under 80 yards and over 300 yds. The second set uses a max point-blank range system that uses the radius of the target above the zero point of the platform. Example: using a 10 inch target. A max point blank range system will establish a platform zero when the bullet path will rise above the zero point by 5 inches and drop below the zero point by 5 inches totaling 10 inches.

It does not matter how or what range or system is used to establish the platform zero: once it is established stacking PBY values will yield a repeating ratio for all known ammunition.

Since all of the noted variables fall within a ratio guideline the resulting PBY values can be manipulated with magnification.

All follow a specific ratio whose total variation error is within an SD of 2% typically. The ratio can describe any PBY with only two variables. Hundreds of ballistic tests were conducted. Statistics were applied to multiple result categories, mixed categories, extreme limits and a statistical confidence level of 98%+ exist at one standard deviation. This is for all inputs (Size of target, velocity, BC) combined.

At this time, 4 reticles are all that is needed to describe this encompassing event.

If we use a 2nd focal plane scope and use the magnification to alter the position of the 5 PBY's all reticle varieties/spacings all of the input variables can be captured within one scope:
  1) Establish a Platform Zero.
  2) Produce the reticle based on its highest velocity, or highest BC
     a. Set this base reticle at mag 1×x (Example). However, any starting magnification could work.
  3) Any manipulation to obtain new solutions would be accomplished by raising the magnification.
     a. Lower velocity will require increasing field of view size as compared to the reticle.
Decreasing Magnification Creates this Spread.
     b. Higher BC will require decreasing the field of view size. Increasing the magnification will decrease the field of view creates which increases the apparent reticle size as compared to the target.
  4) Identify the magnification value that meets the correct ratio and offsets from the established platform zero.
The Magnification Ring can be:
  1) Marked by group:
     a. A series of hash marks would delineate the different reticle positions which can then be crossed referenced into size of target and cartridge type. This can be accomplished within 3×mag rotation on a typical mag ring. Example: a 1-6×—the change in required reticle size change to meet new platform/round would be 2 points of magnification.

2) Magnification ring can be changed-like current custom turrets.
3) A series of indents could be produced for a tactile feel for settings.
4) Stops could be produced in which an operator rotates to stop to be on a true battle reticle with stacked PBY's.

This magnification adjusted PBY could also affect wind dots locations. Wind dots would be a linear application based on velocity and gravity as the PBY are. They could be built in such a way as to show a 5 mph walk lead value for multiple calibers.

Changing the position of the dot as compared to the target thru the magnification. High velocity high mass projectiles will need less PBY values and less wind lead as compared to a High Velocity low mass projectile (representing typical center fire cartridges). Extremes such as subsonic rounds could possibly be employed also.

Once (example) a 5 mile per hour wind dot is set on a given reticle, a change in velocity would require a change in magnification. Changing the magnification would change the wind dot location as compared to the target and would also correctly line up with the PBY requirements.

18b. Turrets
Turret Detents-Standard Ring (FIG. 15)

A turret using standard components and current standard methods could be built with detents specific to a reticle.

A simple cross style reticle could be produced with no secondary aim points. The turret style adjustments would move the simple "cross" style reticle to its new PBY location.

1) Four detents that will provide a singular move offset. Turn the turret until a detent is felt creating PBY1. This could be a 0.5 mil setting for example. Turning the turret again until the second detent is felt would create PBY2. This could be 0.7 mil setting for example. Repeating the procedure for PBY3 and PBY4.
   a. The turret could then continue with standard clicks allowing precision shooting beyond the four stacked PBY.
   b. The turret can be turned in either direction to return to a marked Zero.

Turret Detents-Cam Type Turret (FIG. 15 and FIG. 16)

A turret could be built with a vertical cam component. Four ramps with (optional) secondary detents for location could be built to known height creating the offset necessary of a reticle. Turning the turret will allow a follower attached to the reticle to allow the reticle to move vertically by following the angular ramps built into the ID of the turret. The ramps would angle up to (or down from) a starting zero. Once a ramp reaches a specific vertical offset the reticle will be in PBY1. Rotating the turret again will allow the follower to trace the second ramp to the next vertical specification for PBY2. This will be repeated for ramps three and four creating PBY3 and PBY4. Detents of stops could be built accordingly. Exact detail of the mechanism is not needed and can be produced by a person skilled in the arts.

18c. Titling the Reticle
Tilting-Reticle

When changing variables to produce new PBY values, the action is nearly linear. In fact they can be closely described by an angle. If a glass reticle (or wire version) were tilted around its x axis, the distance between the stops will be reduced to the viewer's eye. The spacing becomes a ratio of the tilt. For instance a reticle set up for a 20" tall target with known PBY1, PBY2, PBY3 and PBY4 could be tilted 60 Degrees to create a new PBY1A, PBY2A, PBY3A and PBY4A for a 10" target.

18d. Replaceable Scope Reticle Cartridge.

A scope could be produced in two operating halves. Since the stacked PBY reticle does not need to be adjusted though its range of use turrets are not needed in order to manipulate the noted PBY reticle. A scope could be produced that will allow the removal and reinsertion of a reticle assembly. Scopes are currently sealed with O-rings and similar items. The sealing cap of such a device could be sealed using a threaded cap and O-ring for example.

18e. Holographic, Laser, Dot Generators and Disturbed Reticles these could Produce Aim Points Using the PBY Concept.

Dot generators attached to range finders could be made much simpler as the range finder only needs to be active during PBY shifts, and only move to four points versus continuous scan.

Section 19: Applying Systems and/or Methods to a Changing BC

19a. BC Ballistic Analysis
Examples of the test of the theory to build stacked PBY:
The following is a sample of an output for jbmballistics-.com, a commonly used online ballistic program.
FIG. 87
Only the following parameters FIG. 87 were manipulated during the cross comparisons:
1) Size of target—PBY zone.
2) Velocity
3) Ballistic Coefficient—BC 4) Weight of bullet.
Only one variable at a time was changed for each comparison.
The following FIG. 88 would be the output of the above inputs:
FIG. 88
19b. BC Statistical Analysis Test were Ended at Four to Five PBY Values.

In the BC test the input for the vital zone was equal to the base total values of all of the previous test: PBY1=20 PBY2=40

PBY3=60. Using the radius of 30 in this example allows us to look at a ballistic curve starting 10 yds from the muzzle. It also has a sight height of 0.1 inches. A nearly perfect curve with no angular starting changes is created with this input.

In Velocity and PBY comparisons the inputs were left at real world values such as a 1.5" Sight Height. (distance from the center of the bore to the centerline of the scope).

Target Size: PBY1 equal the vital zone of the target.
PBY values of 10, 20, 30 and 40 inches were used. PBY1 is the first stacked target vital zone value starting at the zero range of the platform (100 m zero or 200 m zero for example).

Zero ranges of 100 m and 200 m were used.
FIG. 89 illustrates the summary PBY2.
As can be seen FIG. 89 the SD values of the 4 target sizes land 2 ranges creates an error of less than 3%.

Three percent of the target height or as converted to range is negligible and can often be lost in the noise of the shooters ability or atmosphere (all other inputs).

Testing velocities of 1150 fps to 4800 fps indicates a linear event thru 4PBY values. The value 4800 fps is higher than any current shoulder fired weapon known at this time. The 1150 fps represents a value just above the speed of sound. The test was conducted with BC from 0.453G1 to a 0.900G1.

It could be concluded that size and target distance to at least five PBY values is linear in progression.
Further Summary Comparison:
FIG. 90

In the following table FIG. 91 we compare the summary of each category onto itself:

In the following table FIG. 92 we compare the separate categories with each other:
FIG. 92

If we search for the greatest variable that works within four PBY values we will find BC has the highest variability. The variability is relatively low unless you work to extremes. Values of 0.450G1 to 0.700G1 are minimal if we are looking at effective suppression fire or point blank range (PBY) engagements:

The following table FIG. BC1 isolates a real world representative projectile BC range:

In this table FIG. 93 we look at the PBY summaries of each BC input value:

As can be seen the SD values error is still under 4%.
19c. BC Ratios and Equations It is understood that a ballistic coefficient is not linear. However, within a limited range it can viewed as relatively constant and the provided initial formula remains valid. It should be understood that given enough energy a brick can be accelerated to ultrahigh velocities and based on simple equations its decay in velocity is based on atmosphere resistance. While this exemplarily PBY concept will operate at all ranges at some point in a ballistic curve the change in angle of the ballistic curve will eventually become vertical. It should also be understood that projectile flight can be disrupted by its transition from supersonic flight to subsonic flight. It should be also understood that a projectiles flight—example the brick—is initially ruled by velocity and at some point the projectile will transition to an air foil and pick up flight characteristics. An example would be when a bullet lacks a twist rate/spin rate to stabilize it. If sufficient twist rate is not available a round can leave the barrel at 3000 fps but within a few hundred yards start to make a hard turn in some direction. However, all of these facts are secondary events not easily calculated for.

The primary point of this proposal is to show a relationship of all inputs to a basic ratio.

Starting at a low BC (0.11) and working towards a mid-range BC (0.453) yields the most rapid change.

As we exceed 0.7 the rate of change (improvement slows down).
Chart FIG. 870 and Chart FIG. 871

In Chart A we can see a merge of rate of change for BC.
FIG. B10
FIG. Table 12

Curve formula—These numbers in green

Variables may be calculated at different values, but the underline relationship between Factor Result Fig.ures is measurable.

Chart FIG. BC4 showing the BC range and resulting change in increased yards with the same vertical drop compared. Again, as note the change from 0.7 to 1.7 is a slowing curve. This value will never reach zero but will continue to decrease.
FIG. BC4
  BC1 0.284 BC2 0.453 BC3 0.757
  BC2 0.453 BC3 0.757 BC4 1.7
FIG. Tab 13

For those who want to match an inputted BC the following more precisely would be applied and will still function within the noted primary ratio. It should also be noted as one exceeds BC G1 of 0.7 the relative shift becomes smaller and smaller. It will not become appreciable until PBY are greater than PBY7. It also assumes a stable projectile in high BC formats.
For Factor Result
  0.207101
  0.082237
15 0.031813
May be described with the following equations:

$$C=B$$

$$C1=KB+F$$

$$C2=K(KB+2F)=K(KB+F)+KF$$

$$B=0.31813361$$

$$K(\text{constant})=2.1699483238$$

$$F(\text{Factor constant})=0.0132034914$$

Based on a precise BC value a shift to the left or right of the primary setting would occur. Even without this input the error from BC.1 G1 to BC1.99 G1 is relatively small <10%.

Section 20: Scope of System and/or Methods

The five base aim points can then be applied to critical zones (PBY) and the vast majority of known ammunition can then be employed against those PBY values.

They are represented by PBY1, PBY2, PBY3, PBY4 and PBY5.

Using magnification those ratios can be dialed up and down to meet given platforms.

The PBY values can also be calculated to meet a given new input:
  1) Target size
  2) Velocity
  3) BC
  4) Sight in Range
  5) Line of Sight Angle
  6) Bullet weight
  7) Remaining Energy.
Basics of the System:
  1) System is based on stacked critical zones.
  2) It is not a precision system. It is a fire for effect system.
  3) The vertical value of the target becomes the primary driver/solution versus the range.
  4) A vertical solution allows:
    a. Multiple calibers to be used with the same reticle, wedge, mirror units etc.
    b. Uses basic laws of physics: gravity, velocity, and time of flight.
    c. Recognizes that major groups of calibers follow the same ballistic path for periods of time. It recognizes that ballistic coefficients importance are drastically reduced within the noted time of flight and corresponding velocity values over specific distances.
    d. An operator can recognize height features much easier than distance features.
    e. Velocity driven platforms will conform to the critical zones.
    f. Few reticle types/spacings will be needed for any given vertical target size and cover 99% of current commercial cartridges. With one covering at least 90%. Only extreme ends of the inputs would need further review. Example a 2-story building versus a coyote sized target.

However, this is not to be construed as only a few reticle types/spacings are possible as many variations may be realized.
g. A 10" vertical PBY covers most medium size game.
h. A 20" vertical PBY covers most large game (North American equivalents). Other PBY values may be applied.
i. The factors for the PBY are not limited to the vertical components of live adversaries or game. Vehicles, buildings and so forth can be targeted through the same vertical calculations.

5) Training required to engage extended target values is essentially eliminated.
a. No ballistic knowledge is required.
b. Stadia knowledge is not required.
c. Estimated hold over is not required.
d. BDC is not required-which is limited to a cartridge and applied physical parameters of the platform.
e. Training is essentially eliminated.

Section 21: Applying System and/or Methods

Examples of Uses:
A hunter must sight in his platform to a known target distance and understand the point at which the bullet's trajectory will drop below the vitals of the game and/or drop so low as to miss the target completely.

The hunter presently has the following options:
1) Use Kentucky Windage and create an estimated hold over. Thereby placing the center of the aiming point somewhere above his target.
2) Dial his scope to the correct value using his elevation turret.
3) Hold his reticle in the correct position if a stadia reticle is present or some type of dot reticle.
4) Use a Bullet Drop Reticle.

The issues with the above are:
1) This is a guess. An experienced shooter can be effective within reason, however, the once-a-year games person is not.
2) You need a range card and time.
3) Pre-Knowledge is required in order to match stadia positions to a range. Stadia also add a minor complexity in the fact that many points are present. Errors can take place.
4) A BDC is only effective within a very narrow range of use and ammunition.

The range also has to be understood. Finally, gaps will be present concerning the vital zone of the game as a BDC is set to range not a vital zone.

A hunter can be presented with game that is outside of his sight in range and working critical vital zone. Using the noted system of stacked PBY's eliminates all the noted weaknesses:
1) True aim points are presented.
2) Rough range estimation is needed.
3) Minimal presentation of aim points are present drastically reducing the chance of a mistake concerning stadia position choices.
4) Works with 99%+ of all ammunition available.

Figure 19:
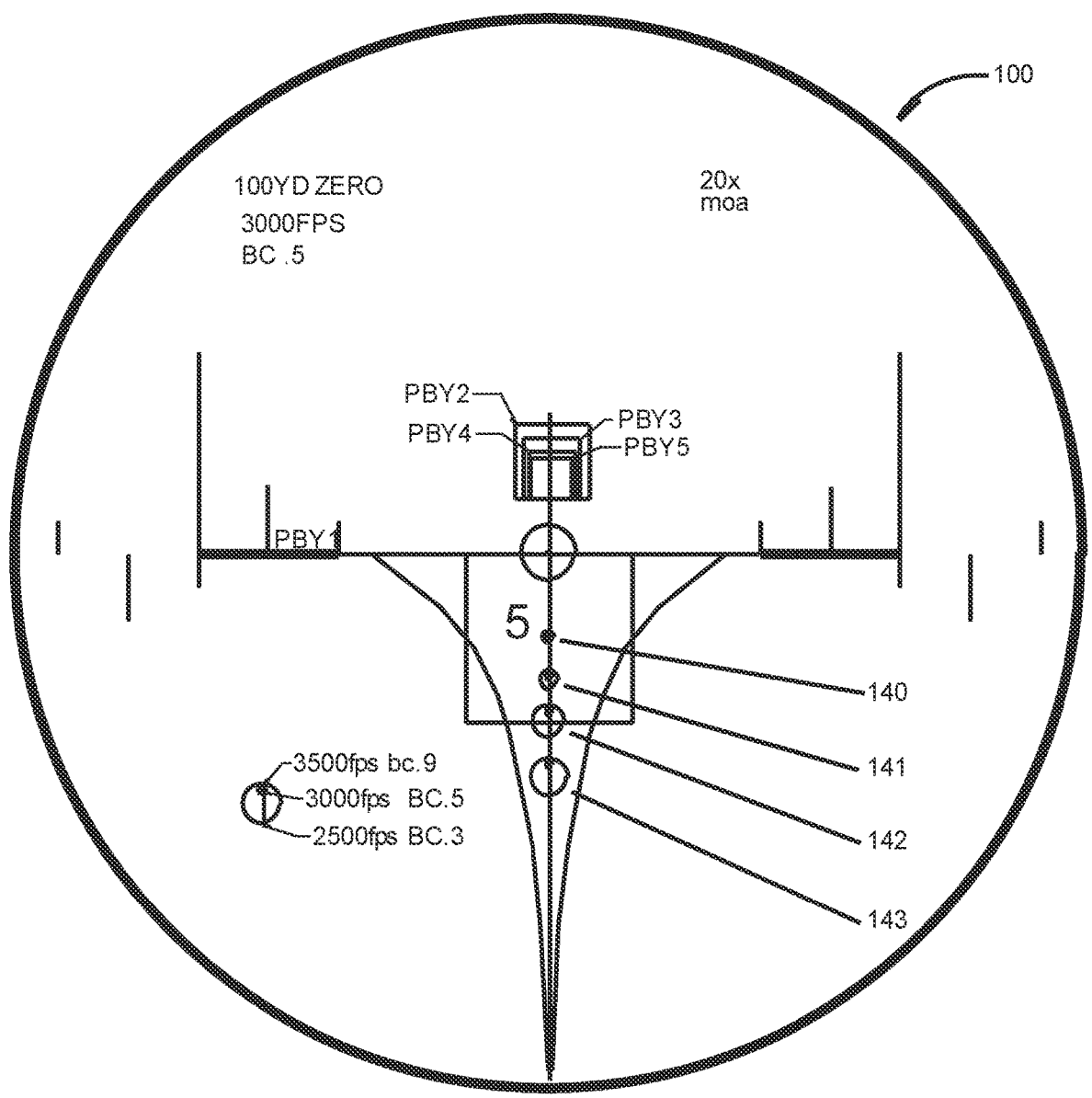
FIG. 19 Illustrates velocity offsets within the noted ratios.

In FIG. 19 noted below new detail has been added to allow for a use example. The base reticle noted in FIG. 3 is fully present with no changes. A simple scale noted by Detail 120 has been added to aid a shooter to establish ranges on known size targets. Detail 130 shows a funnel which again is used to help establish distances to known target sizes. In this example shoulder widths. The Funnel has patents owned by Frank Plumb:

Parabolic ranging reticles embodied in U.S. Pat. No. 10,073,277 (PLUMB) provide a graphic representation of the projectile's trajectory. This allows the user to understand and compensate for the path of the projectile throughout the duration of its flight. U.S. Pat. No. 10,073,277 (PLUMB) uses a common or a specific trajectory against the known size of a target. Common sizes of targets commonly used by U.S. Pat. No. 10,073,277 might be 18 inches, 12 inches, or 6 inches, or 450 millimeters, 300 millimeters, or 150 millimeters respectively. The width of the target, across the trajectory, is represented as the space between the parabolic arcs. The spaces between the parabolic arcs also represent the viewed size of the target at that distance for the shooter. The Full Reticle is Shown.

Parameters are shown along with a scale. The scale is the set of boxes on the outside of the reticle. These boxes are scaled to this reticle set at 20× and will be used for further examples in order to keep a scale constant and visually understood.

Figure 18:
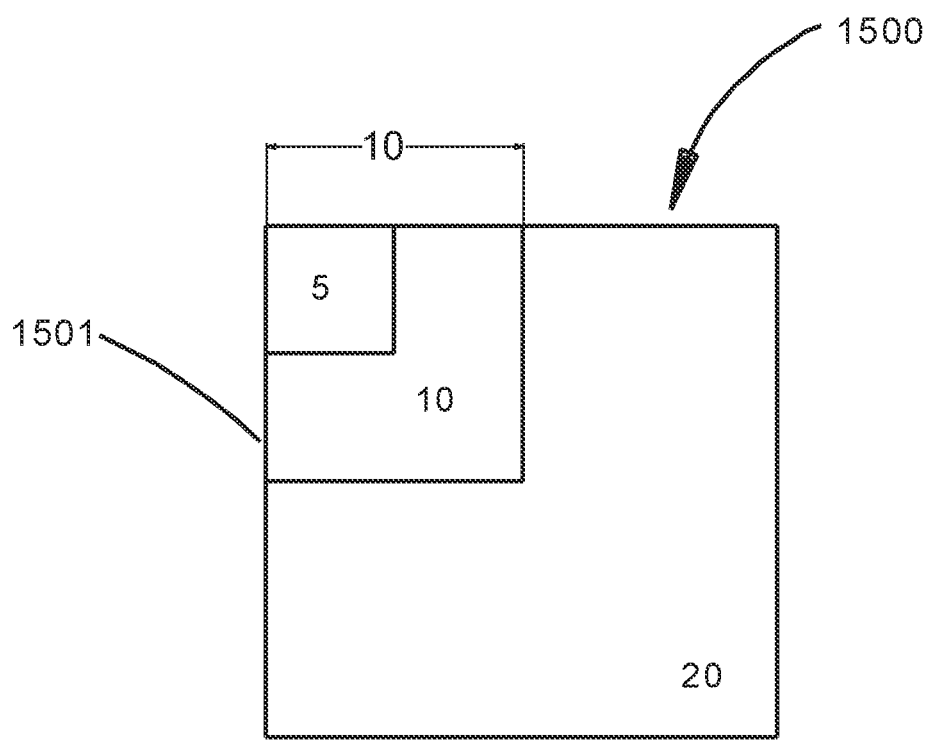
FIG. 18 Illustrates a scale.
Figure 97:
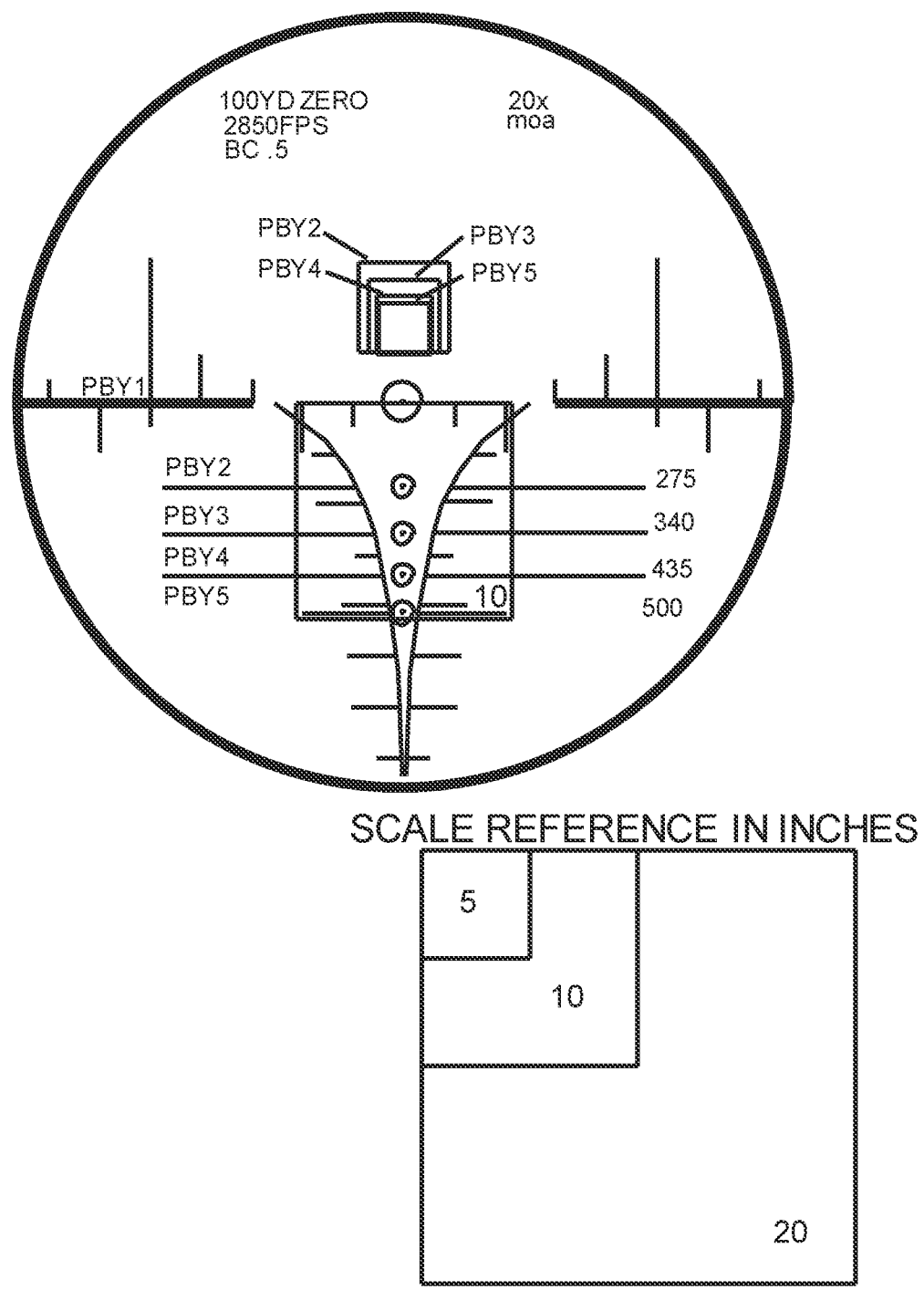
FIG. 97 Illustrates a representative reticle.

FIG. 3
f2Field of view at 100 yds=5.5 ft 20×
For FIG. 3 items are described.
This is the base line reticle: 20× F2
f2Field of view at 100 yds=5.5 ft
20×10 inch Target FIG. 97
Example use in the Field:
FIG. 97 uses FIG. 3 and FIG. 18 as a base example of use.
Vital Area values:
Pronghorn antelope=14"-15"
Small deer=14"-15"
Medium size deer=17"-18"
Large deer=18"-20"
North American wild sheep=20"-22"
Mountain goat=22"-24"
Caribou=24"-26"
Elk=24"-26"
Moose=30"-36"

Given those external body measurements, here are some estimated "vital area circle" diameters that roughly correspond to the approximate (heart/lung) target area:
Pronghorn antelope=8.5"-9"
Small deer=8.5"-9"
Medium size deer=10"-11"
Large deer=11"-12"
North American wild sheep=12"-13"
Mountain goat=13"-14.5"
Caribou=14.5"-15.5"
Elk=14.5"-15.5"
Moose=18"-21.5"

Though the base reticle is built on a 10 inch vital it this reticle can be used on every animal on this list with no gaps or estimations.

Figure 98:
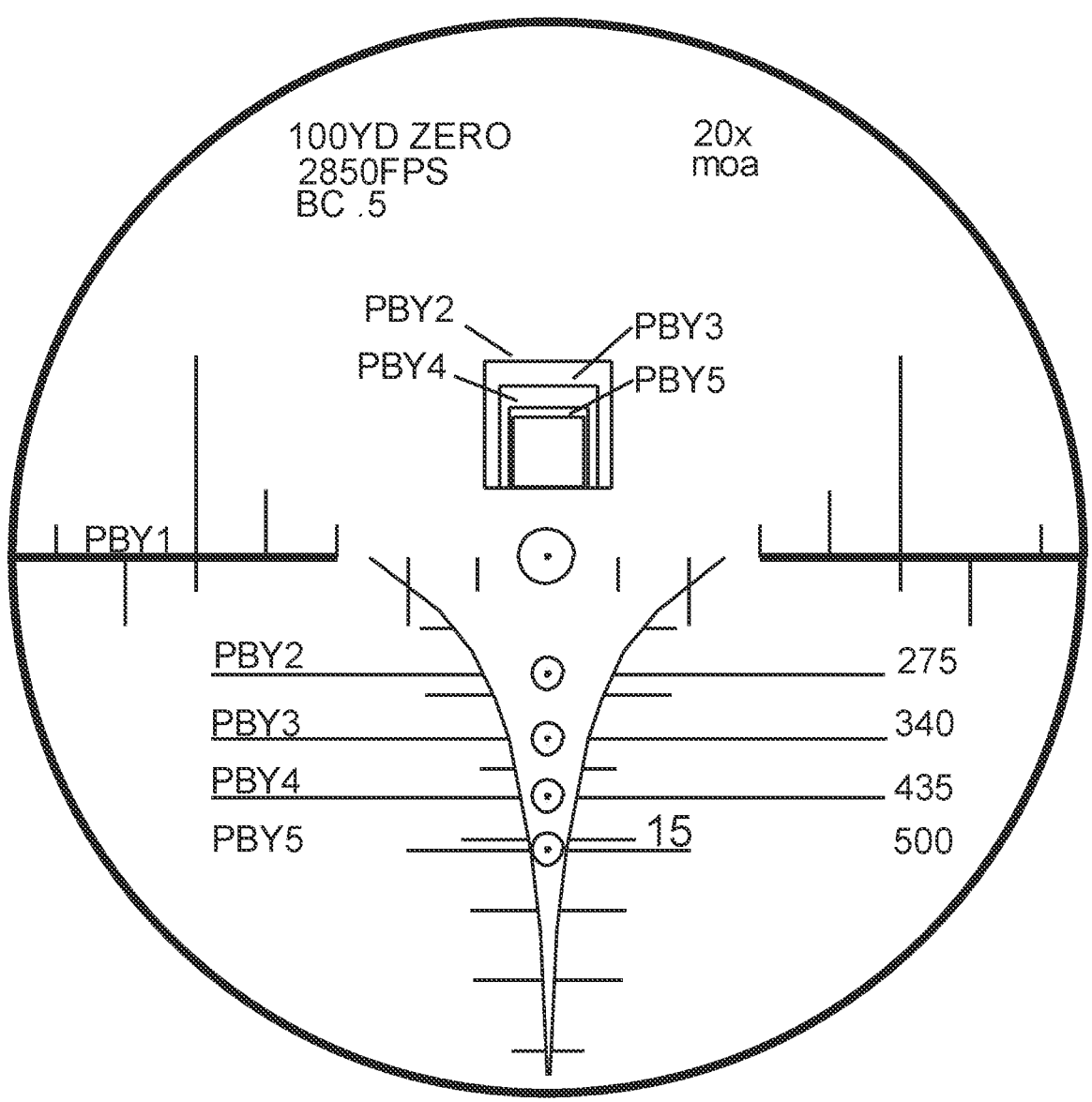
FIG. 98 Illustrates a representative reticle.

Scenario 1
FIG. 98
In this example we are at base parameters.
Medium sized deer-10-11 inch vital zone.
A medium size deer appears at any distance from 0-275 yds—hold PBY 1
A medium size deer appears at any distance from 275-340 yds—hold PBY 2
A medium size deer appears at any distance from 340-435 yds—hold PBY 3 A medium size deer appears at any distance from 435-500 yds—hold PBY 4

A medium size deer appears at any distance from 500-550 yds-hold PBY 5 Using those five PBY points no misses of a vital will occur.

Scenario 2

The animal is now a Caribou with a vital zone of 14.5-15.5 inches

FIG. 99

This is the base line reticle: 15× F2 f2Field of view at 100 yds=6.0 ft

15×15 inch Target

Figure 99:
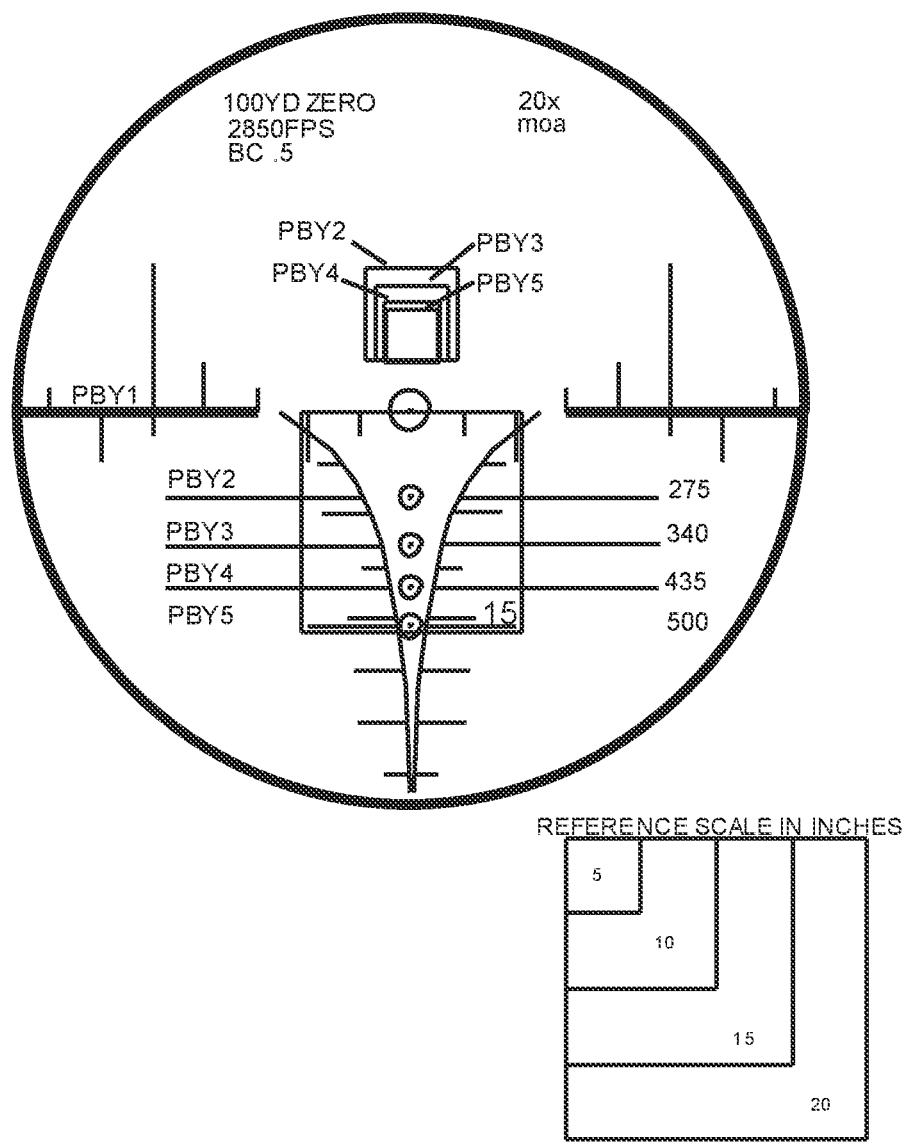
FIG. 99 Illustrates a representative reticle.

In FIG. 99 the magnification was adjusted from 20× to 15×. The reference square shows the original square using the numbers inside the rectangles. The measurement dimensions on top are true dimensions. By reducing the magnification from 20× to 15× the object image has been rescaled and the reticle is now true to the actual size of the object. Since this is an F2 system the reticle did not change size. However, the aim points are true and correct to the object image. No gaps exist. No estimations take place.

In FIG. 100 we compare the figures side by side.

Figure 101:
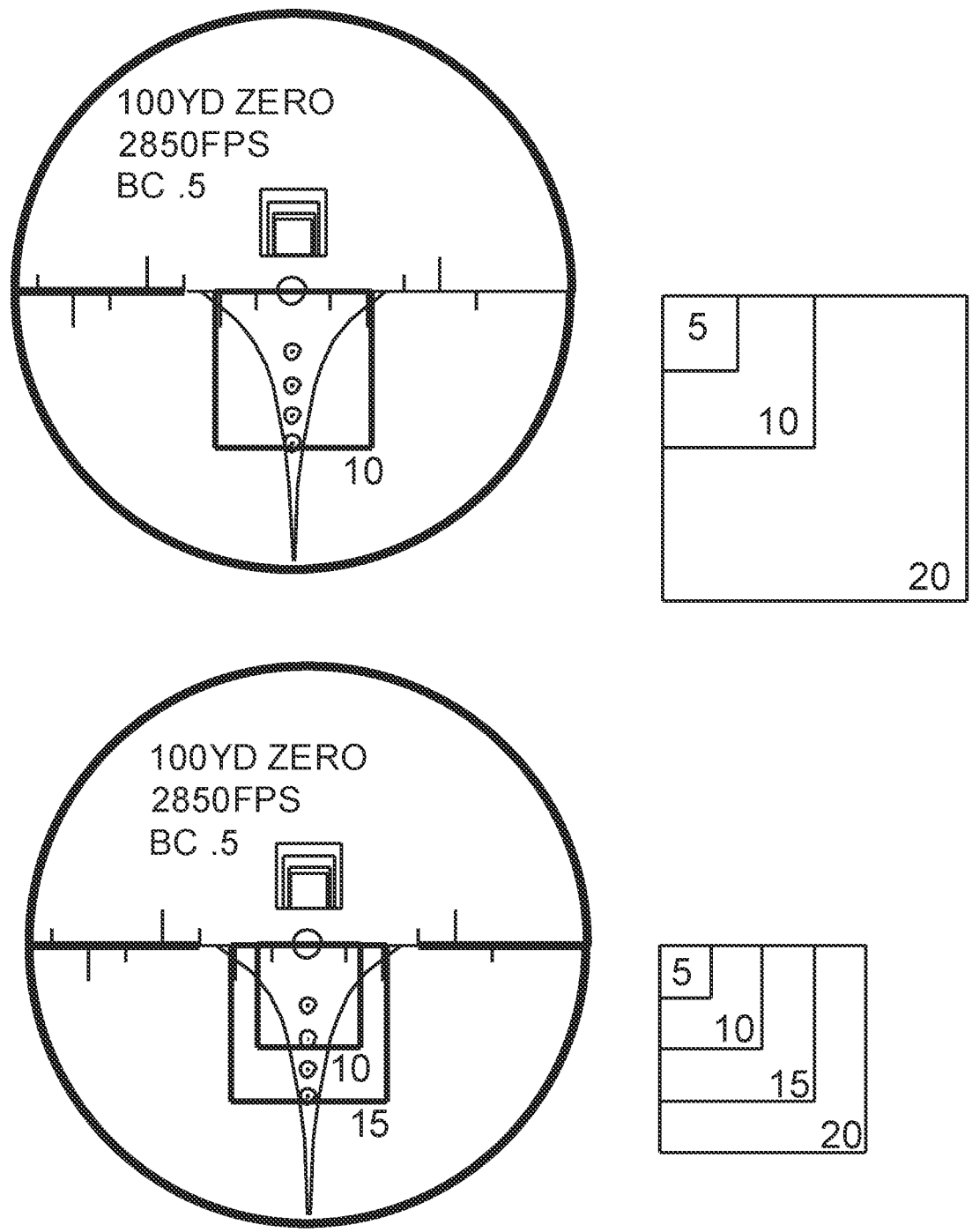
FIG. 101 Illustrates a representative reticle comparison.

This is the base line reticle: 20× F2 This is the base line reticle: 15× F2 f2 Field of view at 100 yds=5.5 ft f2 Field of view at 100 yds=8.2 ft In FIG. 101 all scales are retained but stadia are removed.

This is the base line reticle: 20× F2 This is the base line reticle: 15× F2 f2 Field of view at 100 yds=5.5 ft f2 Field of view at 100 yds=8.2 ft 20×15×10 inch Target15 inch Target As can be seen in FIG. 101 the scale of the reticle and its aim points have not changed.

The object image was re-scaled by the change in magnification. The 15 inch vital zone has been rescaled to fit the aim points. Changing the scale from 20× to 15× has compensated for the new vital zone.

In this scenario we compare the base BC of 0.5 to a new BC of 0.7.

FIG. 102 f2Field of view at 100 yds=5.5 ft

20×BC.3

10 inch Target f2Field of view at 100 yds=5.5 ft 18.6×BC.7

10 inch Target

Figure 102:
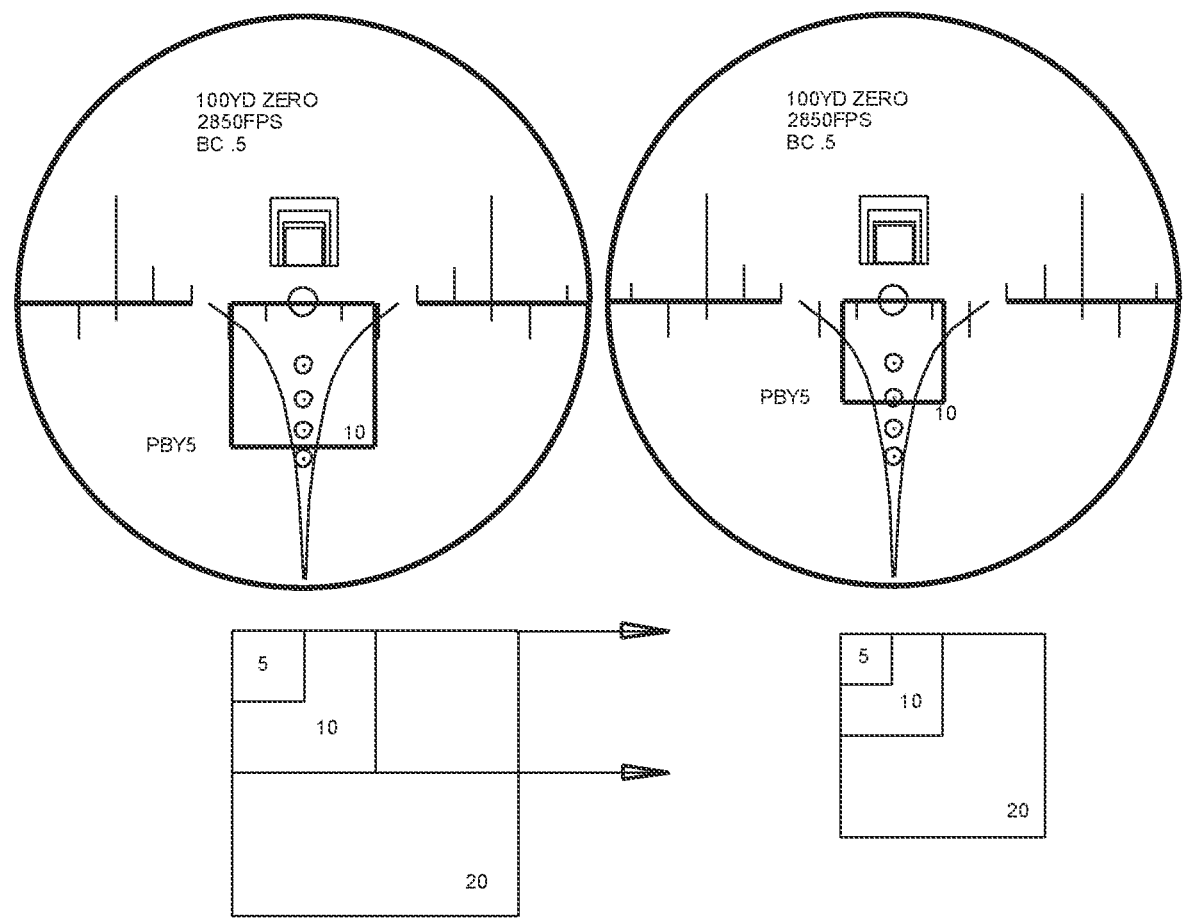
FIG. 102 Illustrates a representative reticle comparison.

In FIG. 102 the object image was scaled to fit the impact that a change in BC will have on the ratio and resulting calculations from the initial calculation.

Changing the magnification value has now compensated for the change in BC.

In FIG. 103 we will alter both the velocity and the BC. Velocity will be changed from 2850 fps to 3000 fps and the BC from 0.3 to 0.9. This would be representative of a high performance round currently available.

f2Field of view at 100 yds=5.5 ftf2Field of view at 100 yds=5.5 ft

As can be seen in FIG. 103 the magnification scale was reduced from 20× to 15.5×. The reticle has not changed size. The system has now been compensated for a change in velocity of 2850 fps to 3000 fps and a BC change from 0.3 to 0.9.

As can be seen on the 15.5× mag aim points appear to be outside the original 10 inch aim point: it needs to be remembered that the 10 inch box is for scaling purposes only to represent the object image as seen by the viewer. The placement of the aim points outside the representative object image would be correct as the velocity and BC where increased which would extend the range of against the base object.

In FIG. 104 we alter three variables:
1) Target size: 10 inches to 20 inches
2) Velocity: 2850 to 3500 fps
3) BC.3 to BC.9

FIG. 104 f2Field of view at 100 yds=5.5 ftf2Field of view at 100 yds=5.5 ft

If FIG. 13 we show a scenario that would ordinarily require:
1) Complete new calculations for each target point.
2) A new BDC reticle that would be completely unusable for any other "ordinary" round.
3) Estimation would be nearly impossible.

Training time would be funneled down to a booklet and setting mag or a custom program that catalogs the changes and its resulting magnification.

The noted examples are not the limits as it has been tested to velocities up to 4800 fps, BC up to 1.9, and target sizes over 100" tall to represent vehicles. Though given the correct round buildings could be set into the system for "effect" engagements.

It should also be noted that while descending magnification values are shown increasing mags and corresponding values work the same.

In the following examples we will use a First Focal Plane Reticle (F1) vs the previous F2 reticles.

FIG. 105

This is the base line reticle: 25× F1

Field of view at 100 yds=4.4 ft

25×20 inch Target4.4/2=2.2=26.4=7.33 units of 1 mil stadia marks.

Figure 105:
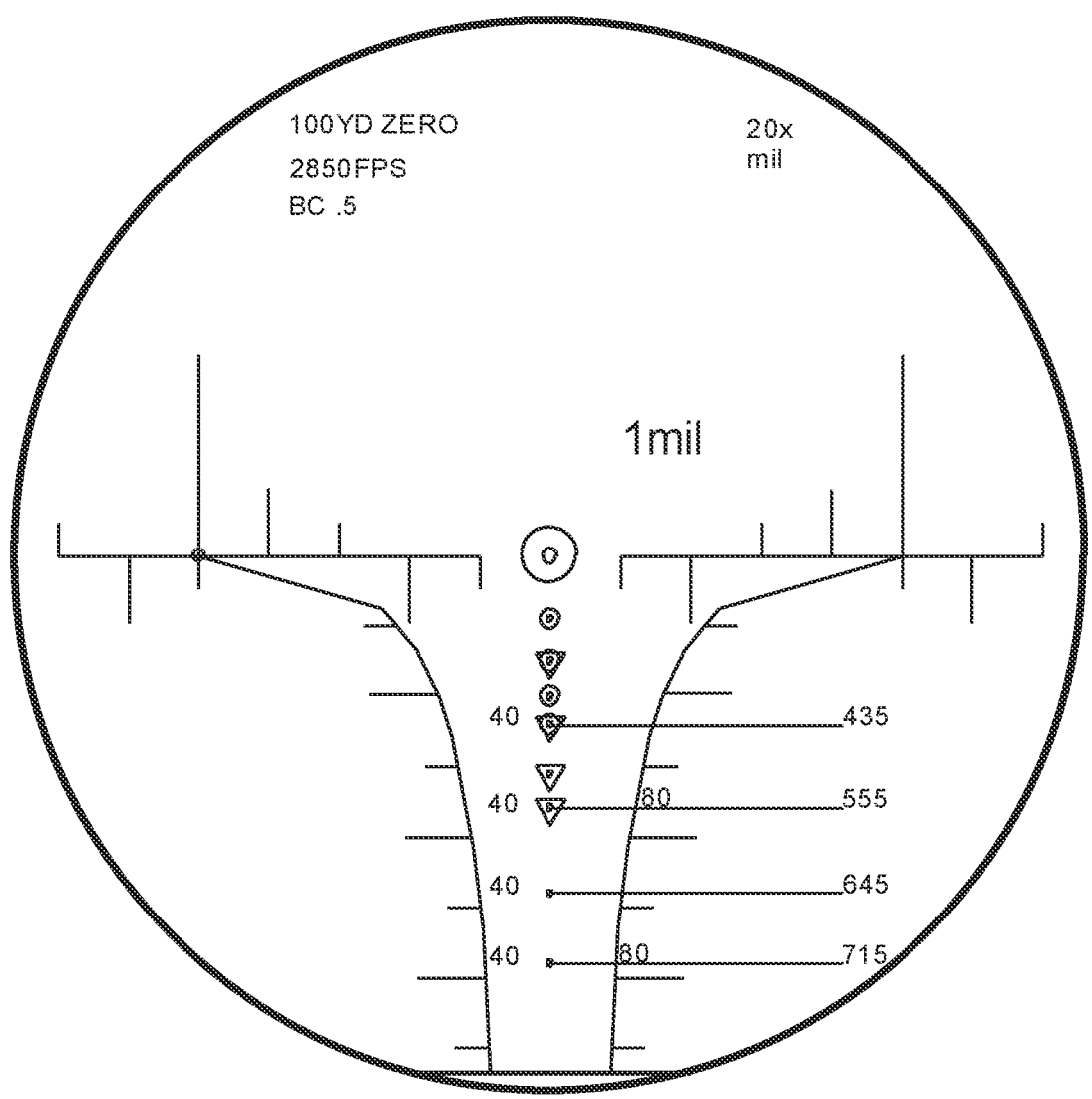
FIG. 105 Illustrates a representative reticle.

In FIG. 105 we show a F1 reticle with the corresponding PBY points. A PBY1 to PBY5 are shown for a 10 inch target noted by the circle image. A PBY1 to PBY5 are shown for a 20 inch target noted by an inverted triangle. Further PBY's are denoted by a direct value of 40 and 80. As can be seen a 40 inch target can be targeted at the full noted magnification. The 80 inch target can be targeted for PBY1, PBY2 and PBY3. To use PBY4 and PBY5 a lower magnification would be required due to the field of view.

As can be seen the reticle can still be used for precision shooting and details of the reticle are demonstrated by reticles such as the H59 and Tremor 3 by Horus. No effort is being made to design commonly known and patented features.

Large advantages to this reticle exists:
1) Instant aim points for effect are displayed which will not leave any gaps in the coverage of each target size out to a PBY of 5.
2) Use in the field is simple. If a shooter uses the wrong PBY and a splash is seen the offset of the splash will line up to a corresponding PBY. Simply realign the system to the PBY the splash was detected on and re-engage. Example: The range is not precisely known and PBY3 is used to target the initial round. Upon firing a splash is seen on PBY4. Align PBY4 to the target and re-engage. Not only is the target engaged but the range is now tightly estimated.
3) This reticle can be place on automatic weapons. This allows an operator to engage man size targets to vehicles. It should be noted the reticle can be built with PBY values that can be matched to story heights on a building.

Figure 106:
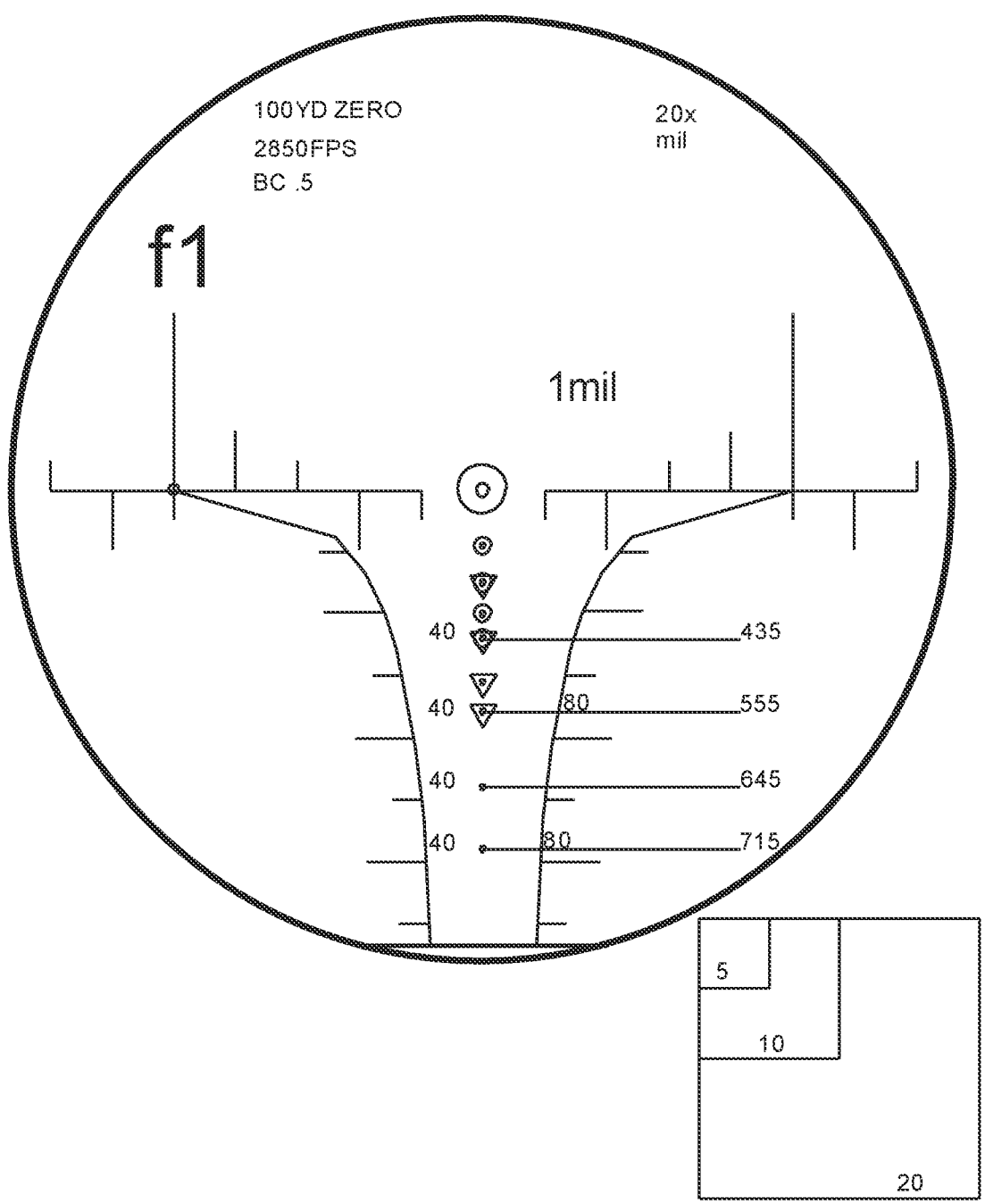
FIG. 106 Illustrates a representative reticle.
Figure 107:
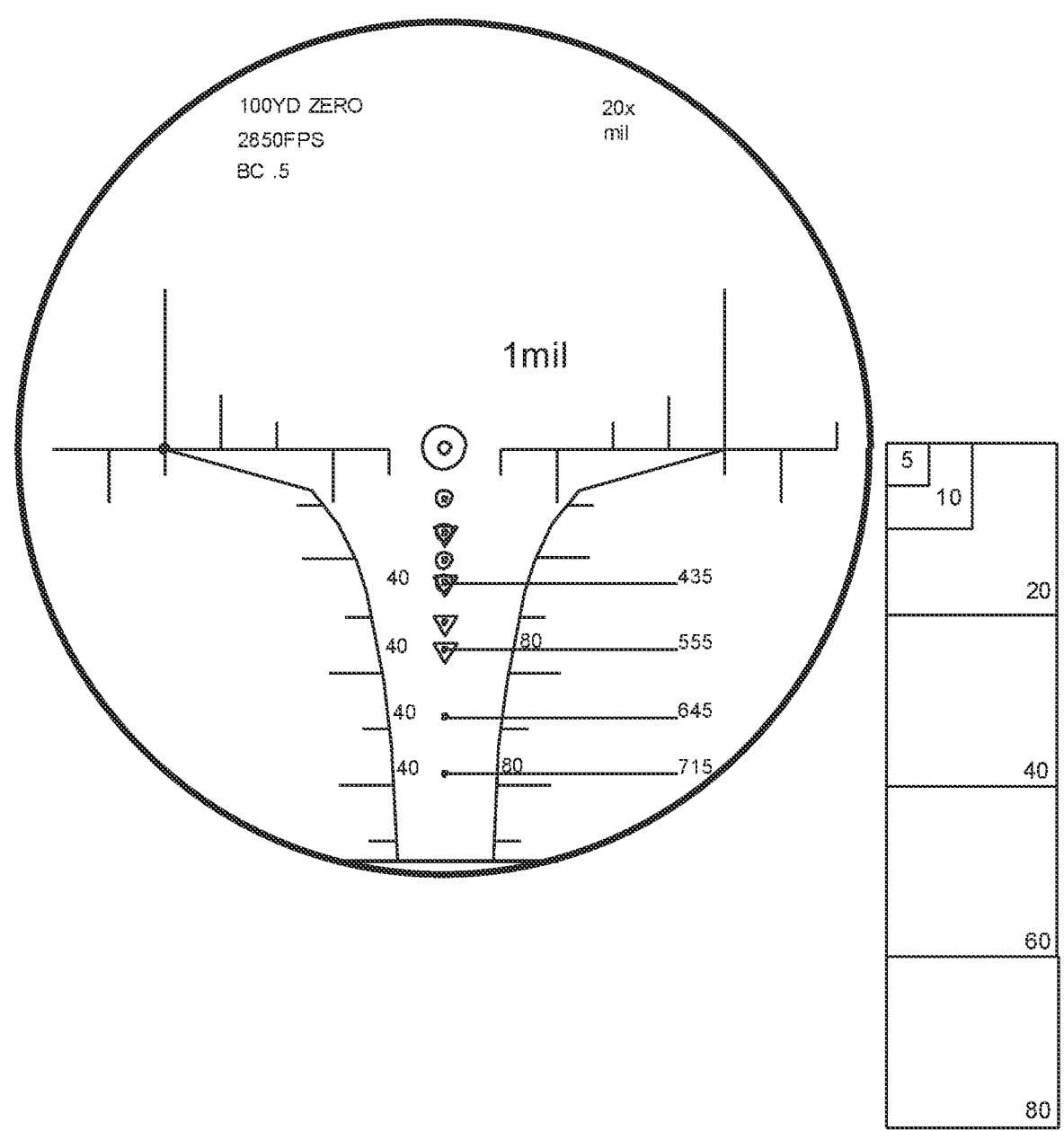
FIG. 107 Illustrates a representative reticle.
Figure 108:
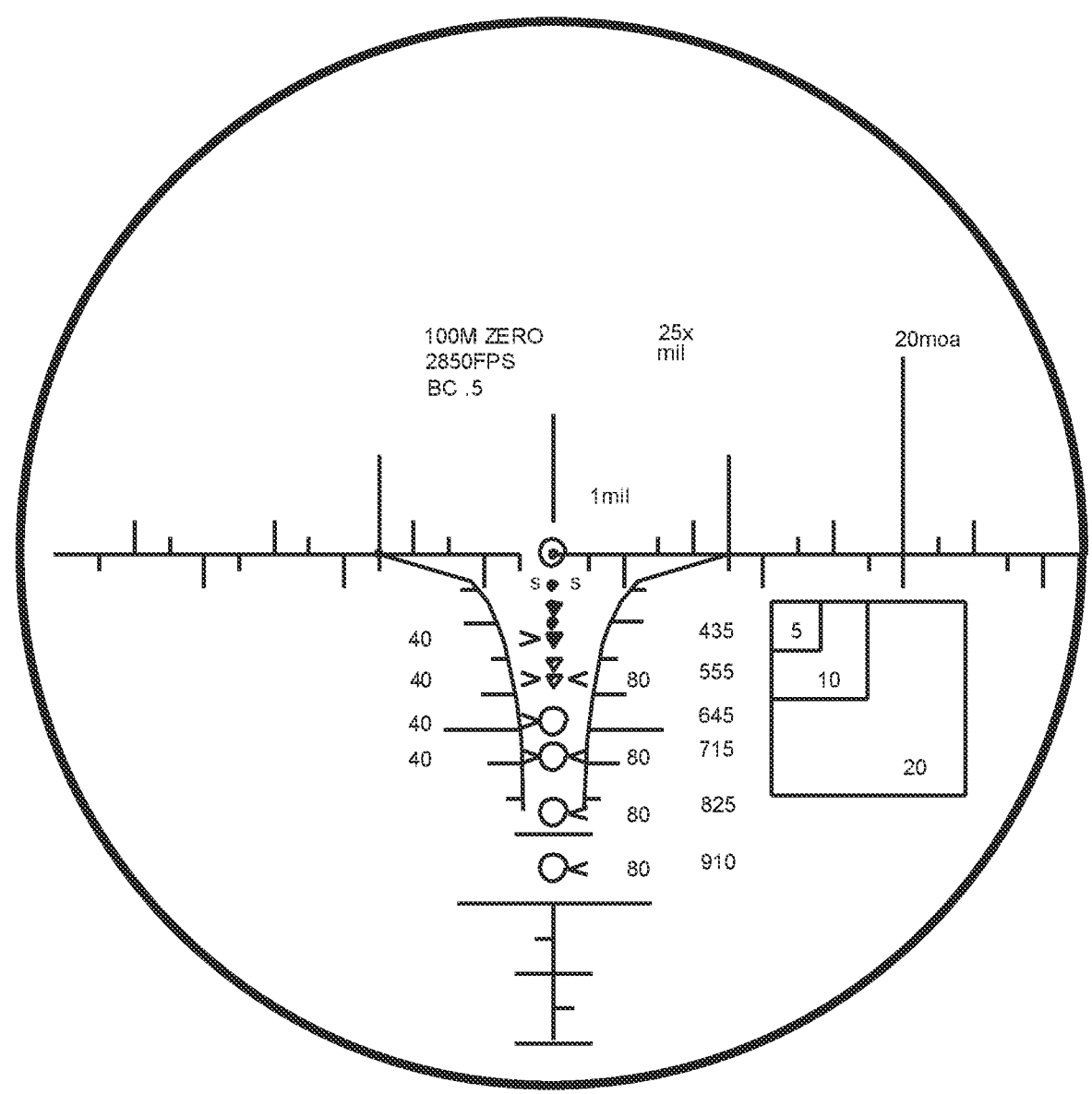
FIG. 108 Illustrates a representative reticle.
Figure 109:
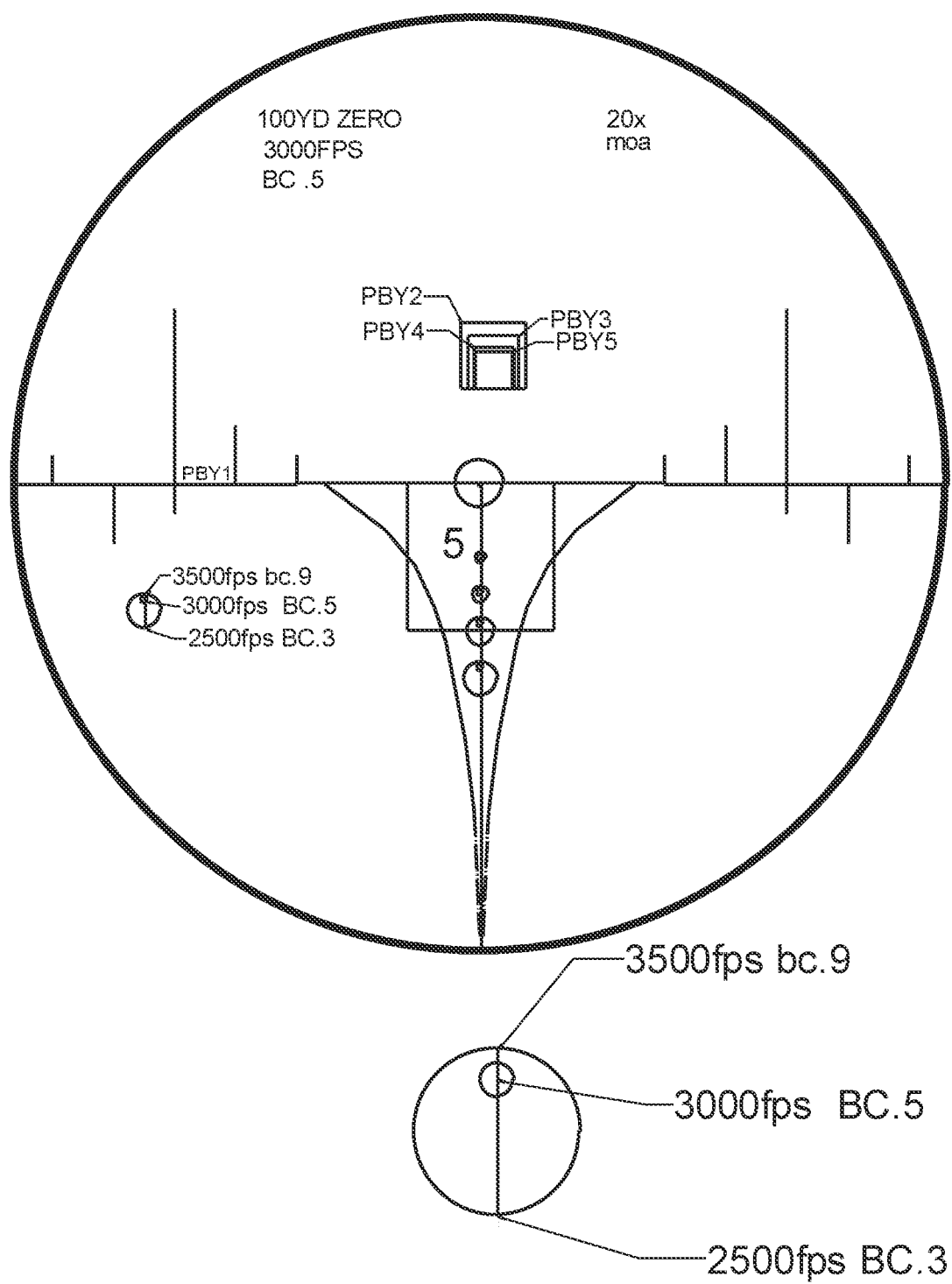
FIG. 109 Illustrates a representative reticle.

FIG. 106
    This is the base line reticle: 25× F1
    A scale FIG. 106 has been added for reference.
    In FIG. 107 the scale of 80 inches is shown for comparison
    reticle 29
    This is the base line reticle: 25× F1
    Field of view at 100 yds=4.4 ft
    25×20 inch Target4.4/2=2.2=26.4=7.33 units of 1 mil stadia marks
    The large target size shown in FIG. 107 will require a reduction in magnification in order to make full use of a rapid target and engage event provided by PBY1 to PBY5.
    In FIG. 108a reduced magnification is shown.
    FIG. 108
    Field of view at 100 yds=8.8 ft
    12.5×20 inch Target8.8/2=4.4=52.8=14.66 units of 1 mil stadia marks
    In FIG. 108 the magnification is reduced from 25× to 12.5×. Unlike the F2 reticle where the reticle does not change size relative to magnification, in a F1 the reticle changes and retains scale as the magnification changes. The reticle holds a size value as compared to the object no matter what the magnification is. Like the F2 it does increase the field of view which is what we are doing also with the F1. In the case of the F1 we are changing the object image size and allowing further aim points to be seen on the reticle. As noted the field of view went from 14.6 ft at 25× to 29.2 ft at 12.5×. It should be understood as we approach 6× the field of view is approximately 60 ft. At that point PBY values for targets 160 inches tall can be produced. Semis and two-story buildings can be rapidly targeted.

It should be understood that a person skilled in the arts for reticle design, layout, etching, wire, electronic displays, electronic overlays, disturbed reticles and so forth could produce line widths and images that can be seen at high power and reduce and/or become not visible as power is decreased. Doing so reduces the clutter of the reticle. In the examples multiple PBY's were included. Further values such as base scope values, and so forth are for representation only. It should not be construed that limits on design and applications of previous reticle designs could not be included. Point in fact is since this system does not share attributes with any other known reticle PBY's could be included with any existing reticle. The reference to approximate ranges shown in the reticles are unique to these PBY's and the ratios described.

It is also shown that comparative heights can be added. Again this is not unique in reticle design. However our comparative heights supply a PBY hold which is unique to this system.

In FIG. 100 details 140, 141, 142 and 143 have been added. They are the same components in features one to the other and follow the same ratio of the primary reticle F1. It must be remembered the ratio can be applied to any variable as a limited set within the variable. In this case the offset circle provides aim points for different velocity ammunition. This is especially useful for F1 scopes that cannot vary the target size relative to the reticle. In the case of Detail 140-143, the top of the circle creates an aim point for high velocity ammunition and the bottom side of the circle is used for low velocity ammunition. Using the bottom of the circle forces the shooter to raise their aim point. Raising the aim point is increasing the angle of the ballistic curve allowing the round to hit higher on the target or at a greater range. another component is introduced. The individual aim points that still sit at the points described by the initial formula and ratio described now have their own ballistics offsets provided.

In FIG. 19 the aim points have secondary offsets. These points cover a very large range of ammunition performance values. The final aim point can now be determined without a change in magnification to reset the reticle. It should be understood that a person of skill can produce other offsets or methods of lines and drawings to represent these changing offsets. The image shown now compensates for a velocity of 2500 fps to 3500 fps and BC of 0.3 to 0.9G1.

Examples of Field Use:
    A hunter has set his scope to traverse the noted PBY values or is shooting a F2 PBY Reticle. They have previously set the scope up and obtained their initial sight in values. A deer appears at 325 yds. The hunter fits the body vital area to the appropriate cubed area notes the PBY value-PBY2 in this case. They then align PBY2 to the top of the vital area on the animal and proceeds with the shot. As long as the animal is between 270 yds and 340 yds the projectile will arrive in the critical area.

A military person is to engage a truck. The truck has an approximate height of 80 inches—this can be tested by placing the truck hood at the PBY1 zero point on the reticle and confirming its effective height to PBY1. IF it is full height PBY1 is used, half height PBY2 is used, one third height PBY3 is used and so on. Align the proper PBY to the hood of the truck and engage. In this case PBY 4 is noted. Align PBY4 to the cab top of the truck and engage.

If the PBY is off the missed round will land in the true PBY aim point. Hold that PBY on target and engage. You are now on the correct PBY value to effectively engage the target.

Figure 110:
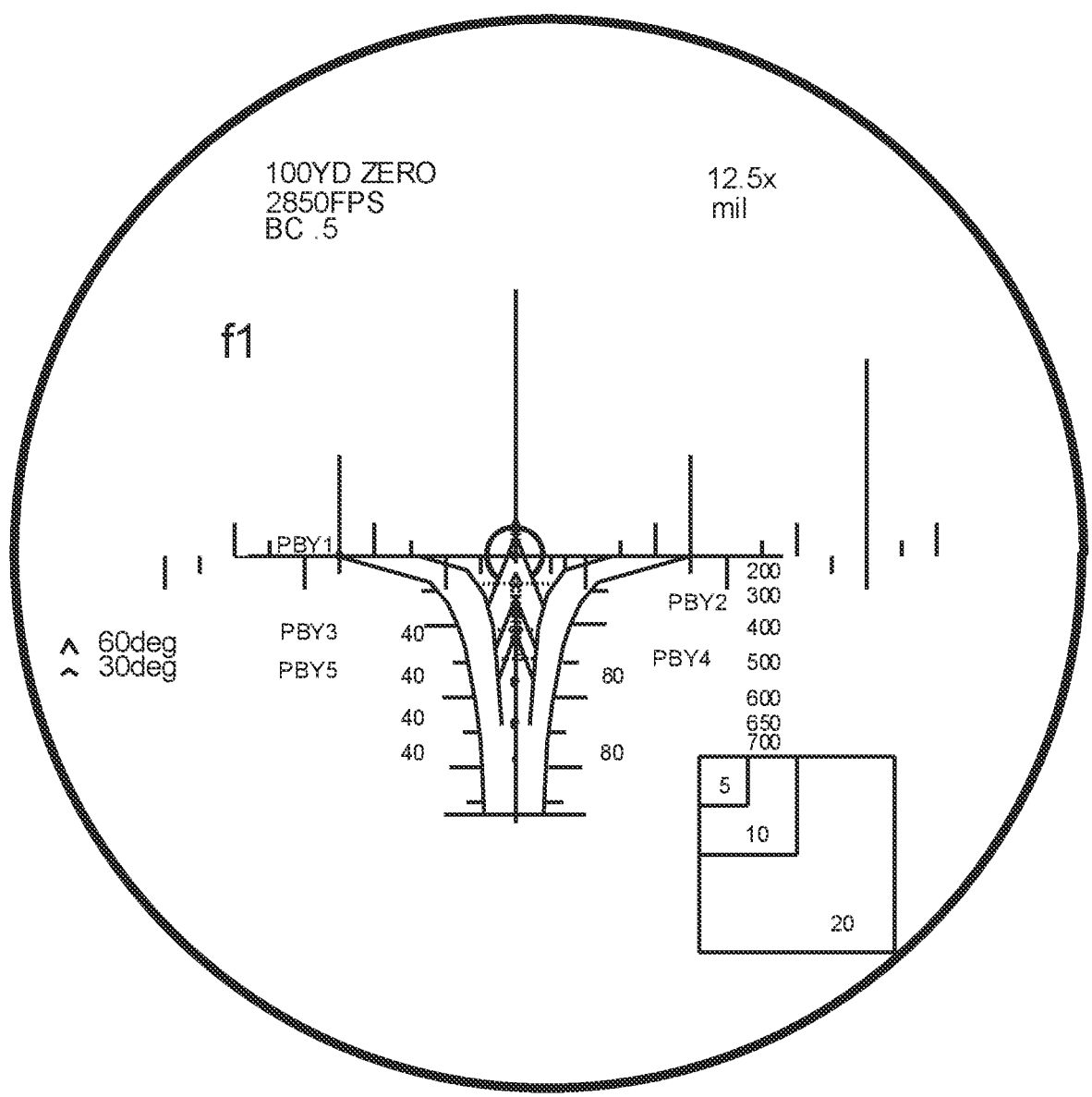
FIG. 110 Illustrates a representative reticle.
Figure 111:
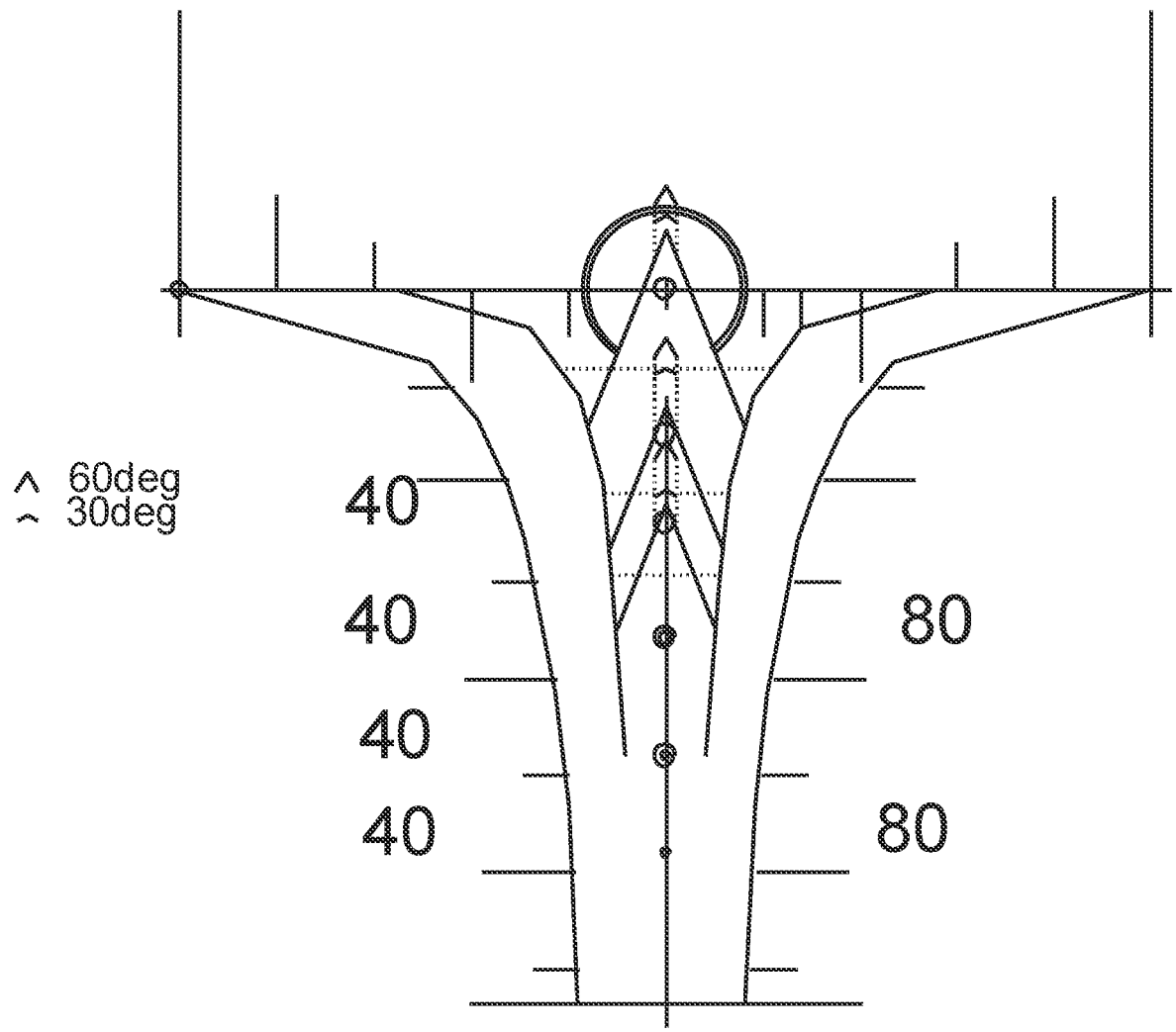
FIG. 111 Illustrates a representative reticle.
Figure 112:
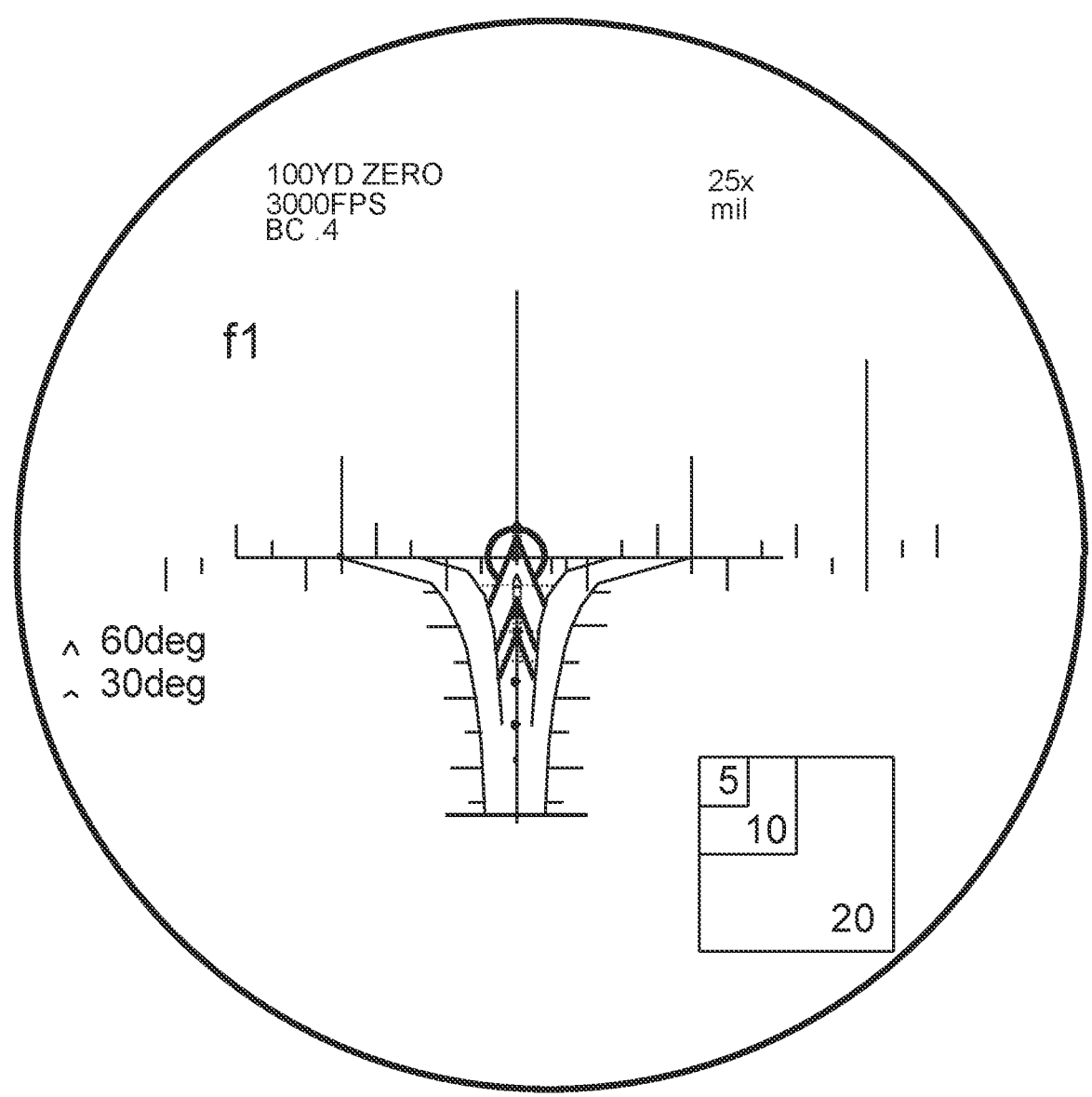
FIG. 112 Illustrates a representative reticle.

A military person is engaging a single enemy combatant. In this example F Ex16 the reticle has been optimized for rapid engagement:
    This is the base line reticle: 25× F1
    Field of view at 100 m=8.8 ft
    12.5×
FIG. 111
    In FIG. 111 a section of FIG. 110 is shown in detail:
    FIG. 111
    FIG. 111 is using Chevrons as a shape.
    1) PBY1-5 are indicated
    2) Approximate meters are indicated
    3) A center aim point is provided for low mag applications.
    4) This is a 20 inch target baseline.
    5) Inverted V's are used to field access target height and width. If the target fits height and/or width of the inverted V you are on the correct PBY. Engage the target.
    6) Secondary inverted marks are presented to compensate for inclined shots per PBY.
    The operator would place the on the top of the head of the target and engage. The correct aim point is in the correct position for the noted PBY.
    In FIG. 110B we show the same reticle at 6×.
    FIG. 112
    This is the base line reticle: 25× F1 Field of view at 100 m=32 ft
    6×20 inch Target17.6/2=8.8=105.6=29.32 units of 1 mil stadia marks
    A hunter is in the field. He will hunt Mule Deer, Caribou and Moose. Each game animal has a different vital zone and corresponding ranges based on the stacked PBY values.

Figure 113:
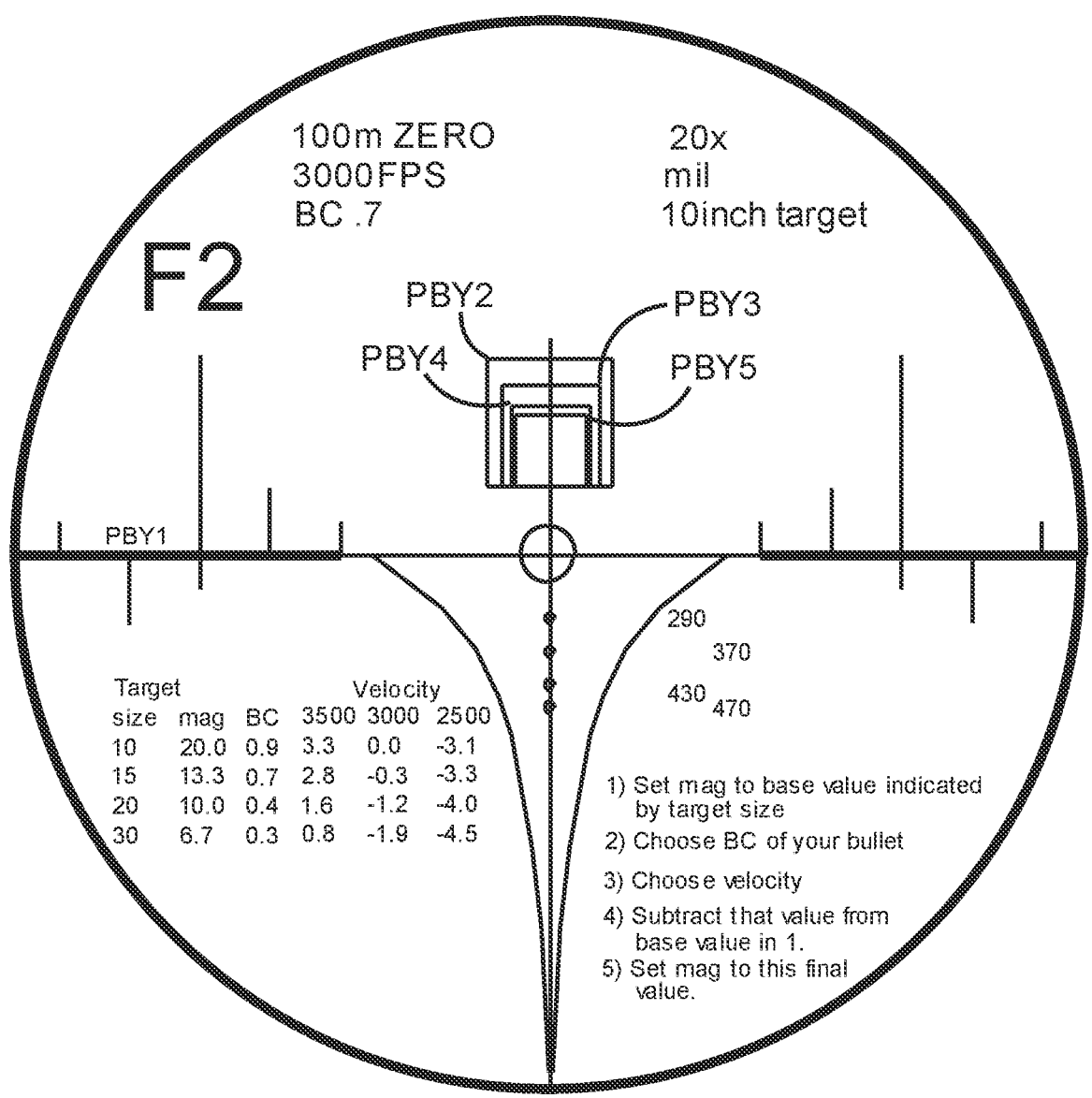
FIG. 113 Illustrates a representative reticle.
Figure 114:
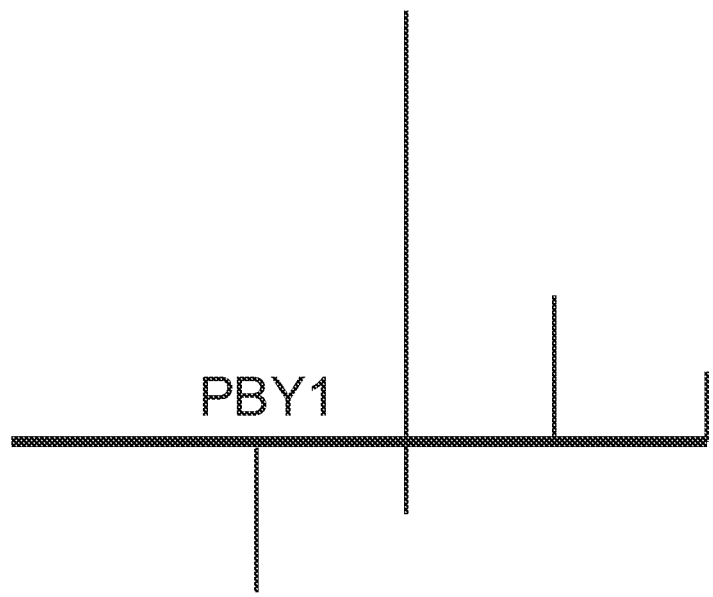
FIG. 114 Illustrates a PBY1 graphic.

In FIG. 113 a standard reticle is shown that contains the base adjustments needed to engage all three targets effectively. A simple table has been added to the reticle field.
FIG. 113
This is the base line reticle: 20× F2 Field of view at 100 yds=5.5 ft
20×5 inch Target
In FIG. 113 detail is shown:
100 m ZERO
3000 FPS
BC.7
20× mil 10 inch target
size mag BC 10 20.0 0.9 3.3 0.0 −3.1
13.3 0.7 2.8 −0.3 −3.3 20 10.0 0.4 1.6 −1.2 −4.0
30 6.70.30.8-1.9-4.5
1) Set mag to base value indicated by target size.
2) Choose BC of your bullet
3) Choose velocity
4) Subtract that value from base value in 1 5) Set mag to this final value.
1) The base line of the scope is indicated in the upper left (11:00). 2) A chart in FIG. 114 is shown that covers a wide variety of ammunition (9:30) The base line of this scope is:
10 inch target
Velocity=3000 fps BC=0.9
For the mule deer:
Target size=10=20 base magnification.
My velocity is 3000 fps
My BC=0.7
However we need to compensate for the BC.7
Using the chart of FIG. 114 I yield a −0.3. Final mag=19.7×. The reticle is now true for all PBY1-5.
Caribou=15 inch vital zone=13.3−0.3=10× final magnification. The reticle is now true for all PBY1-5
Moose=20 inch vital zone=10−0.3=9.7× magnification. The reticle is now true for all PBY1-5.
The change my round for the moose and my velocity is 2500 and the BC is 0.4:

10−4.0=6.0×

The scope reticle can be set up for 100 inch targets or greater.
We can estimate the 100 inch target: 2×−0.3=1.7× final mag for all PBY values. The calculation and resulting ratios allow:
1) Booklets.
2) Solving wheels.
3) Electronic calculations.
4) Slide rule type actions.
Any printable or electronic formats that can be used to convey set up of scopes, reticles, turret tops etc. and other devices that can be produced by a person of skill and knowledge.
Which can include but are not limited to:
1. Ballistic watch or calculator with few inputs-Horus, Garmin, etc.
2. Electronic MR where a person could click a button to automatically switch from one target size to another, because a hunter or military is unlikely to have a need to scale for a target size ranging from 5 to 40-inches. With a simple button, a person could switch from say 10" to 20", and this will cover targets.
3. 1st plane systems (ballistic computers) with the same ratio's involved as outputs or inputs.
4. Time of flight correlated to Vertical stacks ballistic solvers.

Figure 115:
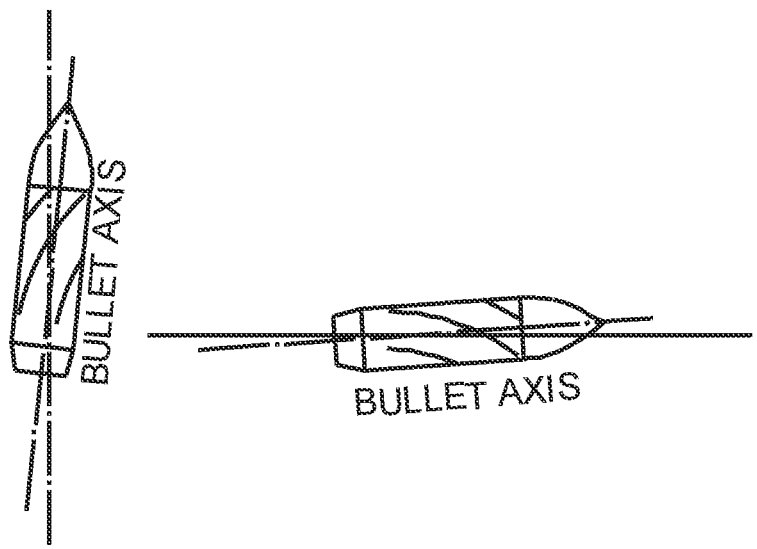
FIG. 115 Illustrates aerodynamic jump.
Figure 116:
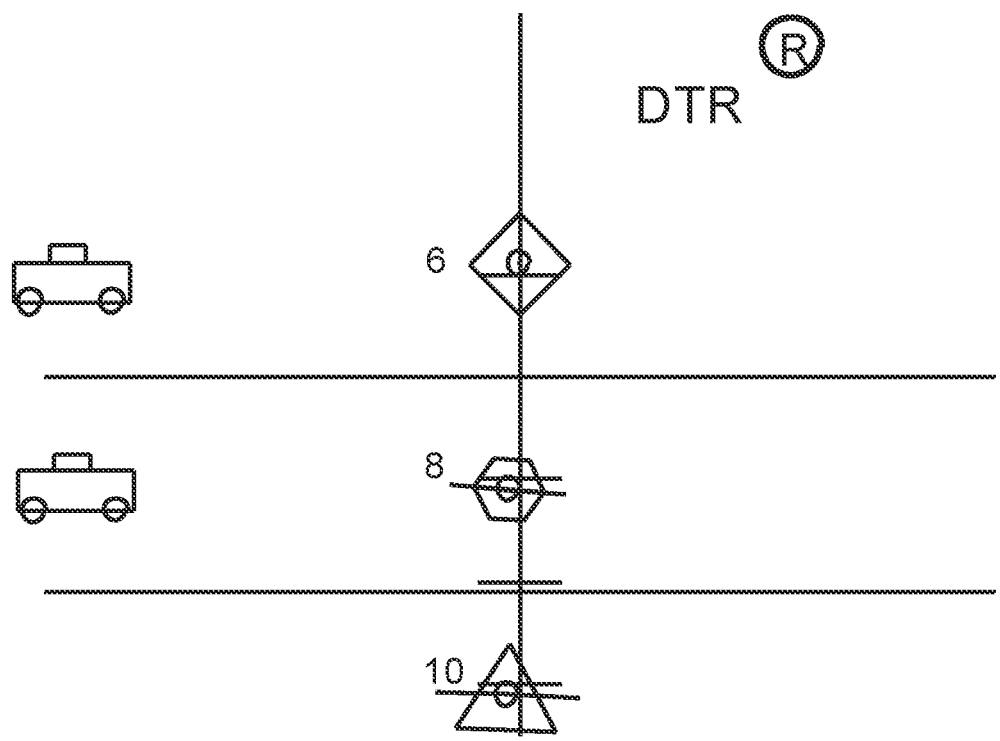
FIG. 116 Illustrates the movement of a bullet as it flies along a ballistic path.

Aerodynamic jump is a phenomenon that occurs during bullet flight as a wind vector opposes the direction of flight vector. As distances increase relative to target size Aerodynamic jump will occur in standard formulations that are applied as velocity and distance. In this case Aerodynamic jump will change for every velocity and range. Applying a time/gravity value to the Aerodynamic Jump drastically simplifies its application over a variety of velocities and bullet types. As described earlier in Section 21 changing the scale of the magnification setting can be used to fit new velocities and the size of target. Since these values are predicated on gravity and time Aerodynamic jump can be applied based on time of flight with a high degree of certainty. Addressing the concern of BC it must be remembered that BC are simple corrections at magnification using this reticle design.
FIG. 3 and F is representative of a gravity/time driven Aerodynamic Jump event noted by Detail 160.
Detail 150 adds time of flight as a potential line of reference in a reticle. Again, this is 100% scalable due to the fact that constants of time and gravity are used.
This example uses David Tubb's reticle design. The detail A shows the concept as applied at a reticle level. As can be noted the aim point is bisected by a "cross". The cross is not set at 90 deg. It has a tilt to it with the left side raising above the horizontal plane. This tilt is specific to (currently) distances. Our use will incorporate this concept based on gravity position and kill zones. The reticle has a design that compensates for Aero Dynamic jump. Since the reticle noted within this patent is designed for rapid engagement with minimum training pairing it with a reticle such as David Tubb's further enhances field use. Another major factor is this reticle reduces the need to ballistic calculations, holds in space, and the reduction in dependence on ballistic programs, devices, electronics, power sources and so on. The application of Aerodynamic Jump becomes of greater importance as the distance increases, per caliber characteristics and flight time. The reticle proposed within this patent could be used (based on caliber capabilities) over distances of a few hundred yards to multi thousand yard shots. Points of PBY are described in 40" increments at a 10× magnification. However, at approximately 700 yd values secondary PBY could be included at 80" (Truck) or 120" (House) in which values extend to 2000 yds (example). At distances described in such values Aerodynamic Jump become critical to obtain impacts. Applying David Tubb designs essentially eliminates the need to take wind and distance into account concerning hold values.
FIG. 21, Incorporates Spin Drift along with Aerodynamic Jump. Spin Drift, noted by Detail 170 and 171 and in a magnified view noted by, Detail FIG. 116, describes the movement of the bullet as it flies along its ballistic path in which the gyroscopic spin of the bullet will pull it in the direction of the twist of the barrel. A right hand twist barrel will potentially cause the bullet to drift right as flight time increases. A left hand twist barrel to the left (not a common barrel). Therefore a compensation must be made within the ballistic calculation to allow for this new impact point.
A second line of thought would be the position of the nose, as is shown in FIG. 115 in which the nose at some point in its flight becomes an aerodynamic foil/component and moves the bullet off path like a rudder on a plane.
A third line of thought is as the bullet traverses its path and spin rate decays the bullet starts to become unstable. The instability will allow the nose to rotate around a center, producing its own procession around a flight axis. As this nose starts to orbit drag increases and once again will "fly"

the bullet on a modified path. This was clearly seen and audibly heard on recent extreme long range shots.

In all potential sources of why a bullet moves off of a perfect single plane ballistic curve they must be compensated for. Applying a bullet procession concept to a reticle was accomplished by David Tubb in his patents.

Showing the results in FIG. 20, FIG. 21, and FIG. 113 a reticle is shown that allows rapid compensation for other input criteria that effects impact. In this case the concepts noted by David Tubb are incorporated into a fully functional reticle. FIG. 113 shows detail describing David Tubb's concepts. The tilt of the horizonal line describes the Aerodynamic Jump and the shape moving to the left (this example a right hand twist barrel) as the distances increase. This reticle now employs direct hold solutions to targets out to 800+meters with corrections for wind and bullet procession.

Figure 117:
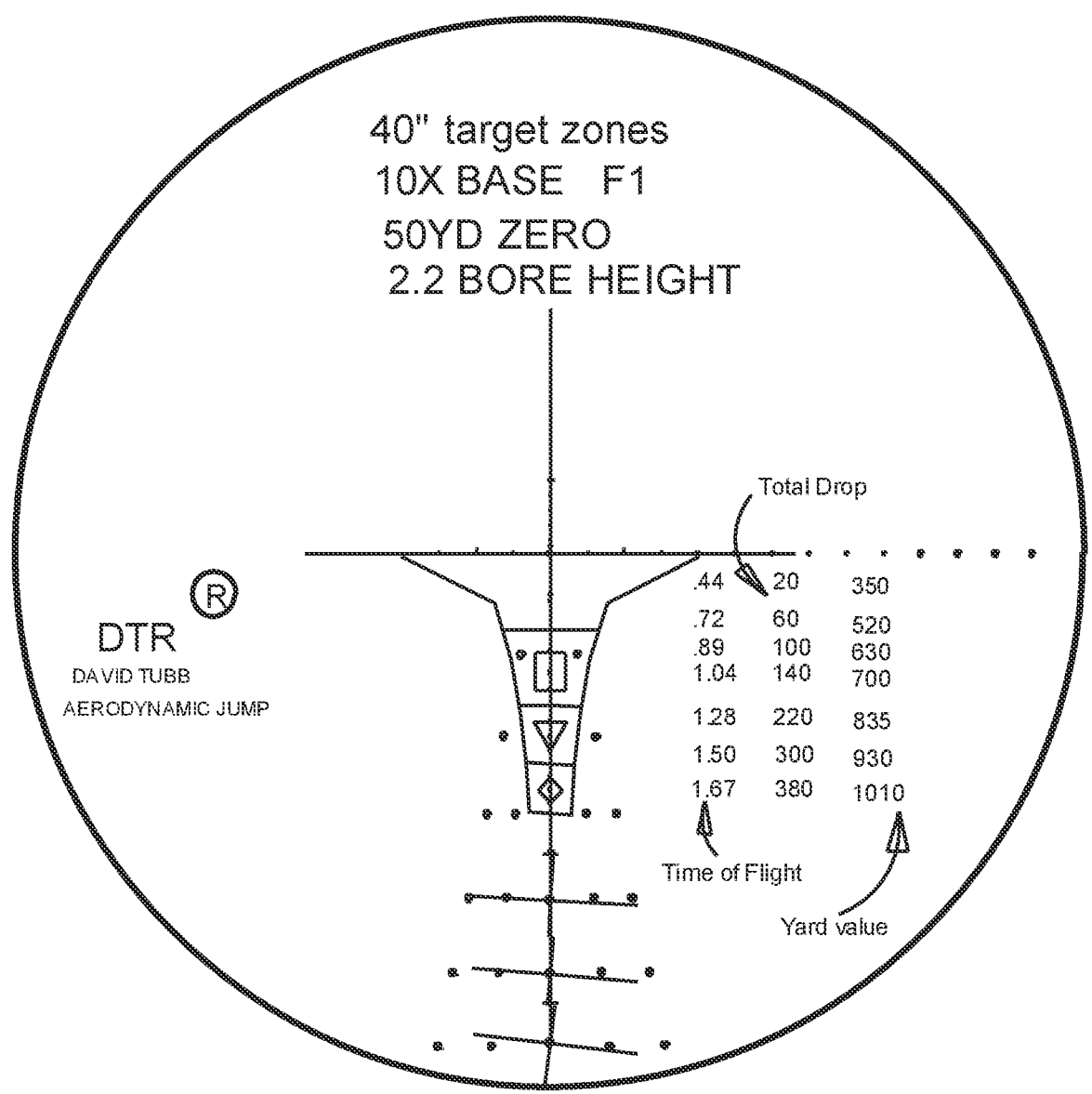
FIG. 117 Illustrates a representative reticle.

In FIG. 117 a time of flight scale, Detail A, has been provided. Since this is still built on gravity and time to distance ballistics allows the reticle to perform with any known round with no changes. While it needs to be more specific with a F1 scope it becomes 100% adaptable to all known rounds and target sizes from a baseball size target to a 2 story house when using a F2 (second focal plane) scope.

Figure 118:
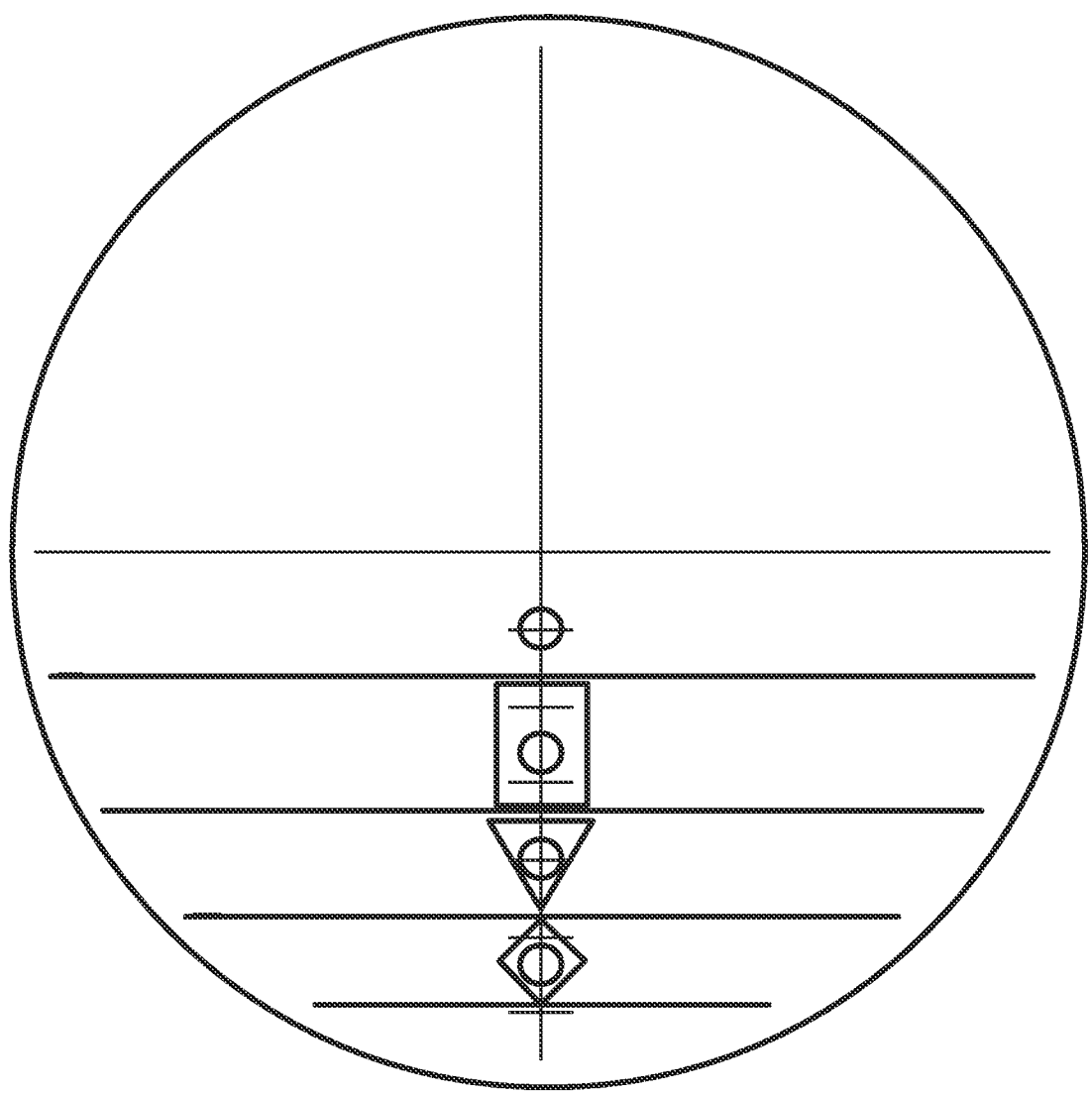
FIG. 118 Illustrates a representative reticle.
Figure 119:
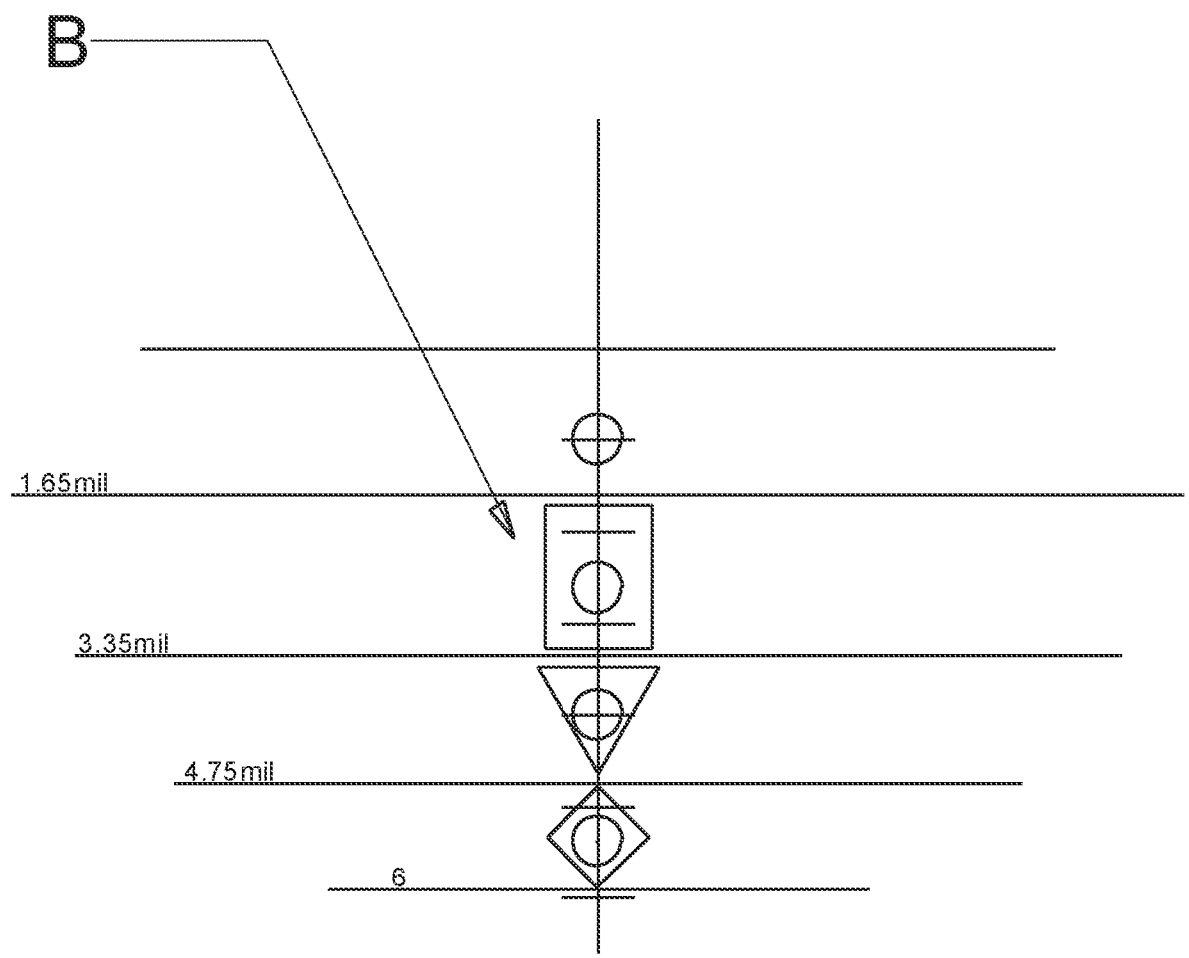
FIG. 119 Illustrates details of a representative reticle.

In FIG. 118 the time increments have been calculated at whole numbers, Detail A, versus fractions as shown in FIG. 117. Use of whole numbers are easier to work with in training. It should be noted that this patent views time as a constant. FIG. 118 appears to show time as an expanding separation between each whole number. It must be remembered that angles are typically compared to a circle, as in milradians. 1 mil radian is approximately 3.47 inches in size at 100 yds. If we make the radius of the circle 100 yds and start to sweep the circle (0 deg towards 90 deg) the milradian increases by one (1) in this example but y decreases. As the radian value approaches a vertical (90 deg value) y changes approaches zero, meets zero, then starts increasing in separation value as it moves towards a horizontal position.

In FIG. 118 Detail time intervals equal to stacked PBY values are shown as shaped symbols, Detail B, with the symbol equal to the PBY's total vertical value. Unique symbols are easier to train to than a simple dot. Distinction is created and memory reflex is instilled.

What is claimed is:

1. A scope for aiming a gun, said scope comprising:
a reticle comprising a plurality of aim points, wherein:
the plurality of aim points are vertically aligned;
each aim point of the plurality of aim points are vertically separated from one another;
the plurality of aim points comprises a first aim point, a second aim point, and a third aim point;
the first aim point is above the second aim point;
the second aim point is above the third aim point; and
the first aim point is further from the second aim point than the second aim point is from the third aim point.

2. The scope of claim 1, wherein:
the scope further comprises a magnification ring configured to adjust a magnification of the scope, wherein the scope is a second focal plane scope.

3. The scope of claim 1, wherein:
the scope further comprises a magnification ring configured to adjust a magnification of the scope, wherein the scope is a second focal plane scope; and
when the magnification ring sets the magnification of the scope to a predetermined magnification corresponding to a target height of a target, the vertical distances between each aim point of the plurality of aim points are set such that if a projectile is fired from the gun with each aim point of the plurality of aim points held over a center of the target, one of the projectiles will necessarily impact the target.

4. An aiming system for a gun, said system comprising:
a reticle comprising a plurality of aim points, wherein:
the plurality of aim points are vertically aligned;
each aim point of the plurality of aim points are vertically separated from one another;
the plurality of aim points comprises a first aim point, a second aim point, and a third aim point;
the first aim point is above the second aim point;
the second aim point is above the third aim point; and
the first aim point is further from the second aim point than the second aim point is from the third aim point.

5. The aiming system of claim 4, wherein:
the aiming system further comprises a magnifier having a predetermined magnification corresponding to a target height of a target, wherein the magnifier is configured to be selectively positioned between the reticle and the target.

6. The scope of claim 4, wherein:
the aiming system further comprises a magnifier having a predetermined magnification corresponding to a target height of a target, wherein the magnifier is configured to be selectively positioned between the reticle and the target; and
when the magnifier is positioned between the reticle and the target, the vertical distances between each aim point of the plurality of aim points are set such that if a projectile is fired from the gun with each aim point of the plurality of aim points held over a center of the target, one of the projectiles will necessarily impact the target.

7. The scope of claim 1, wherein:
the scope is a single power scope.

8. The scope of claim 1, wherein:
the scope is a 1× magnification single power scope.

9. The scope of claim 4, wherein:
the scope is a single power scope.

10. The scope of claim 4, wherein:
the scope is a 1× magnification single power scope.

* * * * *